United States Patent
Affleck-Boldt

(10) Patent No.: US 12,438,995 B1
(45) Date of Patent: Oct. 7, 2025

(54) INTEGRATION OF VIDEO LANGUAGE MODELS WITH AI FOR FILMMAKING

(71) Applicant: FIN BONE, LLC, Los Angeles, CA (US)

(72) Inventor: Benjamin Geza Affleck-Boldt, West Hollywood, CA (US)

(73) Assignee: FIN BONE, LLC, Los Angeles, CA (US)

( * ) Notice: Subject to any disclaimer, the term of this patent is extended or adjusted under 35 U.S.C. 154(b) by 0 days.

(21) Appl. No.: 18/959,339

(22) Filed: Nov. 25, 2024

Related U.S. Application Data

(60) Provisional application No. 63/657,756, filed on Jun. 7, 2024.

(51) Int. Cl.
  *H04N 5/222* (2006.01)
  *G06F 16/783* (2019.01)
  *G06T 7/521* (2017.01)

(52) U.S. Cl.
  CPC ....... *H04N 5/2224* (2013.01); *G06F 16/7837* (2019.01); *G06T 7/521* (2017.01)

(58) Field of Classification Search
  CPC .... H04N 5/2224; G06T 7/521; G06F 16/7837
  See application file for complete search history.

(56) References Cited

U.S. PATENT DOCUMENTS

| | | | |
|---|---|---|---|
| 10,645,356 B1 | 5/2020 | Suhy et al. | |
| 11,288,864 B2 | 3/2022 | George et al. | |
| 11,398,255 B1 | 7/2022 | Mann et al. | |
| 11,450,053 B1 | 9/2022 | Georgis et al. | |
| 11,461,963 B2 | 10/2022 | Manivasagam et al. | |
| 11,570,378 B2 | 1/2023 | Newman | |
| 11,830,159 B1 | 11/2023 | Mann et al. | |
| 11,928,799 B2 | 3/2024 | Chopra et al. | |
| 12,051,205 B1 | 7/2024 | Deutsch et al. | |
| 12,133,030 B2 | 10/2024 | Zink et al. | |
| 12,236,517 B2 | 2/2025 | Bradley et al. | |
| 2015/0286644 A1 | 10/2015 | Turner et al. | |
| 2016/0071544 A1 | 3/2016 | Waterston et al. | |

(Continued)

FOREIGN PATENT DOCUMENTS

| | | |
|---|---|---|
| GB | 2623644 A | 4/2024 |

OTHER PUBLICATIONS

Hong, Wenyi, et al. "Cogvideo: Large-scale pretraining for text-to-video generation via transformers." arXiv preprint arXiv: 2205.15868 (2022). (Year: 2022).*

(Continued)

*Primary Examiner* — Utpal D Shah
(74) *Attorney, Agent, or Firm* — MARSHALL, GERSTEIN & BORUN LLP; Randall G. Rueth

(57) ABSTRACT

A method integrates video LLMs with AI algorithms for filmmaking by processing filmmaking metadata and Lidar data to simulate professional techniques. A system includes processors and memory to process filmmaking metadata, integrate Lidar data, and enhance video LLMs with advanced filmmaking capabilities. A computer-readable medium contains instructions for adapting video LLMs to generate content simulating professional filmmaking techniques using metadata and Lidar data.

19 Claims, 26 Drawing Sheets
(7 of 26 Drawing Sheet(s) Filed in Color)

(56) References Cited

U.S. PATENT DOCUMENTS

| | | |
|---|---|---|
| 2016/0205379 A1* | 7/2016 | Kurihara ............... H04N 7/181 |
| | | 348/47 |
| 2018/0124382 A1* | 5/2018 | Smith ..................... G06T 7/55 |
| 2018/0136332 A1 | 5/2018 | Barfield, Jr. et al. |
| 2020/0082431 A1 | 3/2020 | Rajasekharan et al. |
| 2020/0111447 A1 | 4/2020 | Yaacob et al. |
| 2020/0364877 A1 | 11/2020 | Bradski et al. |
| 2022/0197306 A1 | 6/2022 | Cella et al. |
| 2023/0124190 A1 | 4/2023 | Chui et al. |
| 2023/0281913 A1 | 9/2023 | Rematas et al. |
| 2023/0342481 A1 | 10/2023 | Nikoghossian et al. |
| 2024/0005960 A1 | 1/2024 | Murarka et al. |
| 2024/0105231 A1 | 3/2024 | Ratias |
| 2024/0134926 A1 | 4/2024 | Tunnicliffe et al. |
| 2024/0177412 A1 | 5/2024 | Ranganath et al. |
| 2024/0290119 A1 | 8/2024 | Fashandi et al. |
| 2024/0320918 A1 | 9/2024 | Amador et al. |
| 2024/0346731 A1 | 10/2024 | Graham et al. |
| 2024/0362897 A1* | 10/2024 | Klinghoffer ............. G06T 7/55 |
| 2024/0394511 A1* | 11/2024 | Thevenin ............... G06N 3/088 |
| 2024/0412542 A1 | 12/2024 | O'Neill |
| 2024/0419923 A1* | 12/2024 | Chollampatt Muhammed |
| | | Ashraf ................. G06F 16/345 |
| 2025/0014606 A1* | 1/2025 | Wong ................... G11B 27/031 |
| 2025/0032945 A1 | 1/2025 | Mechlowicz |
| 2025/0148671 A1 | 5/2025 | Sainz-Nieto |
| 2025/0190761 A1 | 6/2025 | Filip et al. |
| 2025/0204987 A1 | 6/2025 | Mohareri et al. |

OTHER PUBLICATIONS

Lin, Han, et al. "Videodirectorgpt: Consistent multi-scene video generation via llm-guided planning." arXiv preprint arXiv:2309.15091 (2023). (Year: 2023).*

Jiang et al., "Example-driven Virtual Cinematography by Learning Camera Behaviors", ACM Trans. Graph. 39:4 (2020).

Roush et al., LLM as an Art Director (LaDi): Using LLM's to improve Text-to-Media Generators, 2023 (Year: 2023).

* cited by examiner

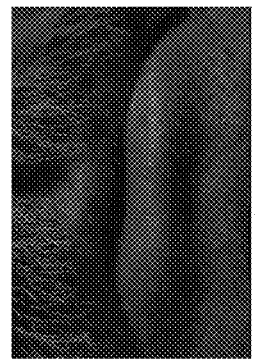
FIG. 1F

300

302 — receiving metadata related to filmmaking techniques, including camera settings, shot composition, and lighting setups 304 — processing the received metadata to generate video content that simulates professional filmmaking techniques 306 — integrating Lidar data with the processed metadata to enhance the generated video content with a three-dimensional understanding of space and object relationships 308 — adjusting the generated video content based on dynamic scene changes documented in the metadata 310 — altering key filmmaking variables in the metadata to simulate the impact of each element on the final video output 312 — simulating camera movements within the generated video content based on the processed metadata 314 — adjusting lighting within the generated video content in post-production based on the processed metadata 316 — determining narrative coherence across generated scenes based on the processed metadata 318 — interfacing with existing large language models for video processing to enhance the generated video content with advanced filmmaking capabilities

402 — generating an exhaustive list of all tasks and shots required, including lens type, camera settings, and shot types 404 — configuring a studio with controlled lighting and equipping cameras with locators for precise spatial mapping 406 — encoding metadata into a format and generating weights corresponding to importance of each type of metadata 408 — embedding video files with metadata and establishing a data management system for organizing video and sensor data 410 — causing a user interface to be displayed, wherein the user interface accepts prompts specifying video characteristics and using metadata-driven weights to influence the generation process 412 — integrating encoded metadata into training datasets for the AI models and implementing specialized artificial neural network layers for metadata interpretation 414 — feeding collected data into the foundational model and using AI training techniques 416 — reviewing generated video against professional standards and adjusting training parameters based on output quality 418 — deploying the model in test environments and evaluating its scalability for broader filmmaking applications

FIG. 4

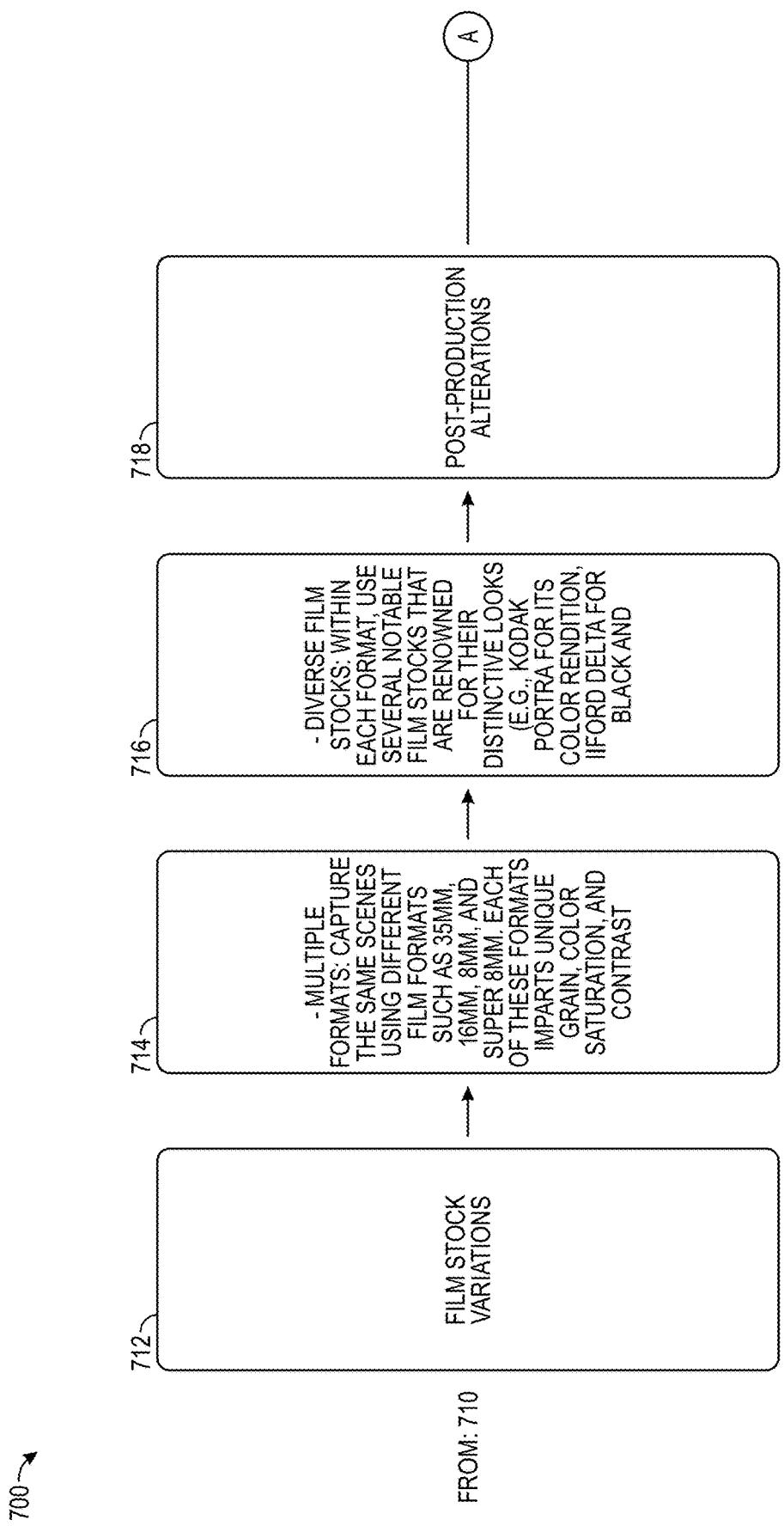

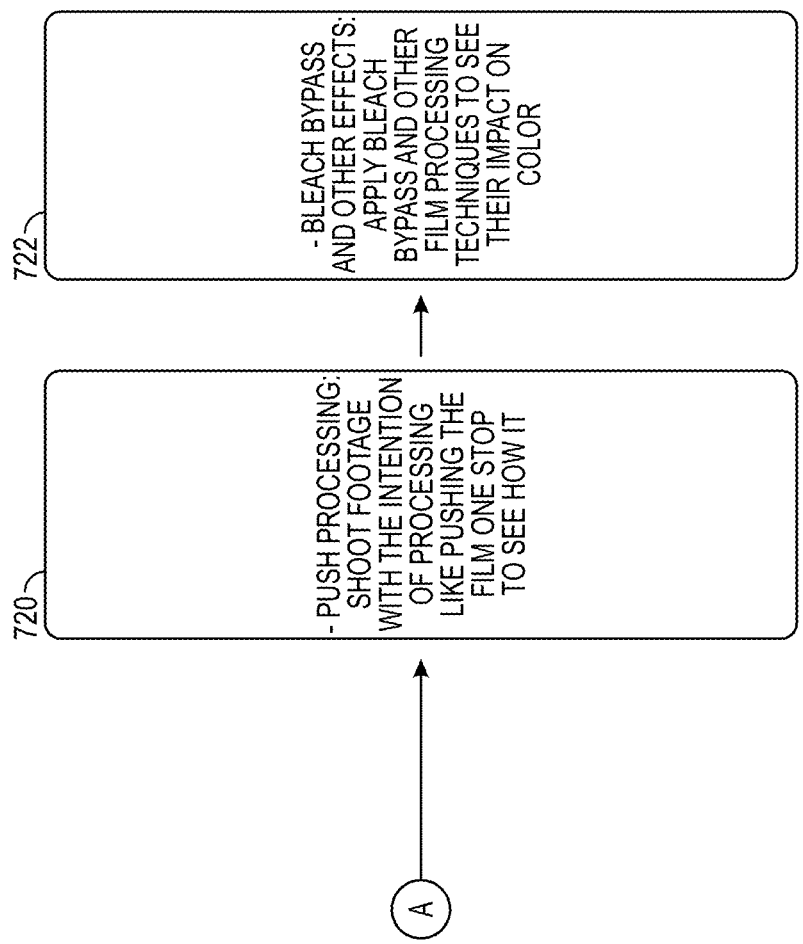

INTEGRATION OF VIDEO LANGUAGE MODELS WITH AI FOR FILMMAKING

CROSS-REFERENCE TO RELATED APPLICATIONS

This application claims the benefit of U.S. Provisional Patent Application No. 63/657,756, filed Jun. 7, 2024, which is incorporated by reference herein in its entirety.

FIELD OF THE INVENTION

The present aspects relate to the field of digital filmmaking and video content generation, and more particularly, to systems, methods, and mediums for enhancing existing video language models with custom AI algorithms.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Within the realm of artificial intelligence (AI), the creation and training of models for video generation have traditionally centered around descriptive metadata, focusing on what appears within the frame rather than delving into the intricate details of how a scene is visually captured or constructed. This approach has led to the development of models capable of producing content that, while semantically relevant, lacks the nuanced understanding necessary to meet professional filmmaking standards. Issues such as the generic nature of outputs, a notable absence of precision in replicating or innovating on professional cinematic techniques, and an inconsistency in the quality of generated content underscore the limitations of current AI models in addressing the demands of professional video production.

These limitations are further compounded by the structural constraints of existing AI architectures, including the reliance on descriptive rather than procedural learning, the challenges of embedding technical filmmaking parameters within vector representations, and the inherent limitations of transformer models that rely on self-attention mechanisms. Despite the impressive capabilities of general-purpose text-to-video AI models, the designers of these models have not given any thought to vital technical filmmaking details that are required to produce professional-quality footage. Thus, these models exhibit a marked inability to generate footage that requires specific camera movements, focal lengths, or depth of field adjustments. As such, they have no utility within the film industry.

Given these prevailing constraints and the growing demand for high-quality video content that adheres to professional standards, there are significant opportunities for the development of improved platforms and technologies that specifically address the noted drawbacks by incorporating detailed, industry-specific data and methodologies, to enhance existing AI models and develop new AI models that can be deployed in professional filmmaking contexts.

BRIEF SUMMARY OF THE INVENTION

In one aspect, a computer-implemented method for integrating existing video large language models (LLMs) with custom AI algorithms for filmmaking includes: interfacing with an existing video LLM; receiving detailed metadata related to professional filmmaking techniques, including camera settings, shot composition, and lighting setups; processing the received metadata to adapt the existing video LLM to generate video content that simulates professional filmmaking techniques; and integrating Lidar data with the processed metadata to enhance the generated video content with a three-dimensional understanding of space and object relationships.

In another aspect, a computing system for enhancing existing video large language models (LLMs) with advanced filmmaking capabilities includes: executed, cause the system to: receive and process metadata related to professional filmmaking techniques; integrate Lidar data with the processed metadata; and interface with an existing video LLM.

In yet another aspect, a computer-readable medium includes instructions that when executed by a processor cause a system to perform: interfacing with an existing video large language model (LLM); receiving detailed metadata related to professional filmmaking techniques; processing the received metadata to adapt the existing video LLM to generate video content that simulates professional filmmaking techniques; and integrating Lidar data with the processed metadata to enhance the generated video content.

Advantages will become more apparent to those of ordinary skill in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The figures described below depict various aspects of the system and methods disclosed herein. It should be understood that each figure depicts an embodiment of a particular aspect of the disclosed system and methods, and that each of the figures is intended to accord with a possible embodiment thereof. There are shown in the drawings arrangements which are presently discussed, it being understood, however, that the present embodiments are not limited to the precise arrangements and instrumentalities shown.

FIG. 1F depicts exemplary desired graphical output corresponding to the text instructions of FIG. 1D, according to some aspects.

FIG. 3 depicts a computer-implemented method for generating video content that simulates professional filmmaking techniques by processing metadata related to filmmaking and integrating Lidar data, according to some aspects.

FIG. 4 depicts a computer-implemented method for generating synthetic data and/or using synthetic data to train a machine learning model, according to some aspects.

DETAILED DESCRIPTION

Figure 1A:
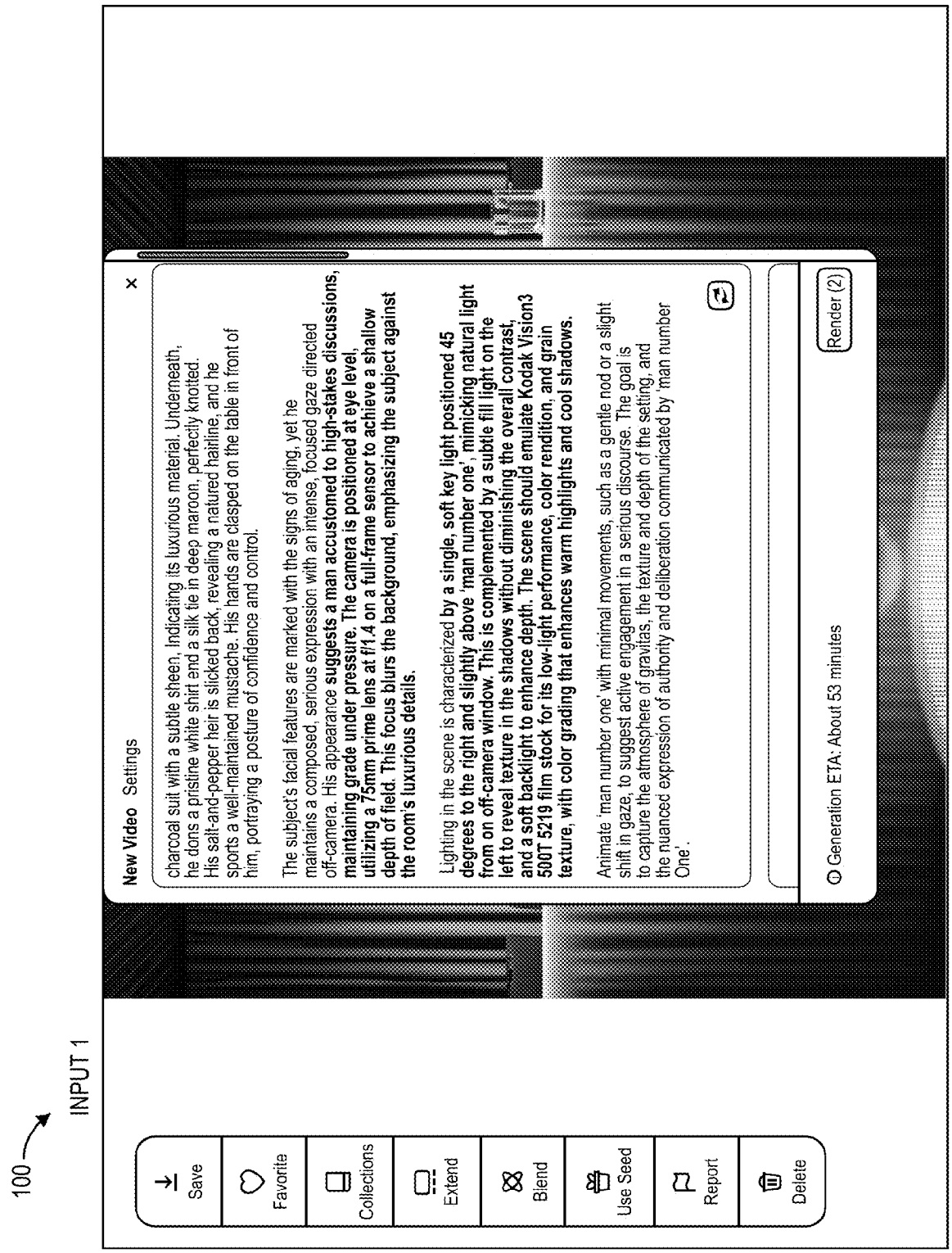
FIG. 1A depicts an exemplary prior art graphical user interface into which cinematographic text instructions (prompts) have been entered, but which have no effect on the generated image, according to some aspects.

In the realm of artificial intelligence (AI) and its application to creative industries, a significant advancement is being made towards revolutionizing the way video content is produced, particularly in the context of filmmaking. The present techniques bridge the gap between traditional filmmaking techniques and the capabilities of AI models, focusing on enhancing AI's understanding of filmmaking principles, including the vocabulary and technology surrounding image capture. In particular, the present techniques address the limitations of existing AI models that struggle with concepts such as generating video from the perspective of an object in space and adjusting shots to achieve desired visual effects like closer, wider, or lower shots. By imbuing AI models with filmmaking knowledge through several model training strategies, the present techniques provide additional capabilities to video production processes, making them more efficient and cost-effective.

Specifically, the present techniques include training AI models by filming scenes in a controlled environment where variables such as lens types, camera settings (including focal length and depth of field), and shot composition are documented as metadata. This detailed metadata may then be used to train one or more AI models to grasp the nuances of professional filmmaking techniques. Further, the integration of Light Detection and Ranging (Lidar) data alongside traditional video footage as training data provides the AI models with a richer understanding of three-dimensional space and the dynamics between objects within that space. Herein, the term "Lidar" is intended to include light detection and ranging technology, in addition to any other suitable form of remote sensing using light, laser or other modalities (e.g., radar techniques, ladar techniques, photogrammetry techniques, etc.). Training with video data, video metadata and/or Lidar data not only enhances the AI model's ability to simulate professional camera movements and adjustments but also significantly improves the spatial awareness of the AI model, contributing to the realism and quality of video content generated using the AI model.

Furthermore, the present techniques may include a user interface (UI) that allows users to specify video characteristics using inputs (e.g., text, images, audio, etc.). In some aspects, the inputs may be the same metadata language the AI was trained on. The UI enables users to perform AI-driven video production in an accessible manner. The UI also enables users to generate video content for films/movies without the need for actual filming, thereby reducing production costs and democratizing access to professional filmmaking techniques. Moreover, the present technique enable consumer applications that empower individuals to apply professional filmmaking techniques to their videos, further expanding the creative possibilities within the realm of video content production.

The present techniques improve upon video processing efficiency. Specifically, by training the AI models with detailed metadata, optionally including spatial information from Lidar data and a detailed list of filmmaking variables, the present techniques can generate video content that adheres to professional filmmaking standards with significantly reduced computational resources. This not only streamlines the video production process but also makes it more sustainable by minimizing the energy consumption typically associated with AI training and video generation.

Another notable improvement is in the area of network bandwidth usage. By integrating with existing large language models (LLMs) for video processing through specialized interface protocols, the present techniques enable efficient transfer of knowledge and capabilities between models. This integration enhances the AI's filmmaking capabilities without the need for extensive retraining, thereby optimizing network resources. Still further, by interpreting detailed metadata during model training, the AI enable a smaller overall memory footprint, making the present techniques more scalable and adaptable to various production needs.

The present techniques may include a computing system and method for generating video content by incorporating advanced filmmaking techniques through the use of metadata, including camera settings, shot composition, and lighting setups. This computing system may include training and operating one or more AI and/or machine learning (ML) models. These models may process metadata, generating video content that not only simulates professional filmmaking techniques but also integrates Lidar data to provide a comprehensive three-dimensional understanding of space and object relationships. This integration allows for an enhanced portrayal of scenes, offering a depth and realism previously not achieved in generated video content.

The present techniques may include adjusting generated video content dynamically based on scene changes documented in the metadata. This adaptability ensures that the video content remains relevant and accurate to the evolving context of the scene, providing a level of detail and precision that significantly enhances the viewer's experience. By systematically altering key filmmaking variables in the metadata, the present techniques may simulate the impact of each element on the final video output, offering insights into the filmmaking process that were previously accessible only through extensive trial and error.

Further, the present techniques enable the simulation of camera movements within the generated video content based on processed metadata. This capability introduces a dynamic element to video content, mimicking the fluidity and perspective shifts characteristic of professional filmmaking. Additionally, the ability to adjust lighting within the generated video content in post-production based on the processed metadata allows for a level of control over the visual aesthetics of the video that can significantly enhance its impact and emotional resonance.

Ensuring narrative coherence across generated scenes based on processed metadata is another improvement offered by the present techniques. This feature ensures that the generated video content maintains a consistent storyline, enhancing the viewer's engagement and immersion. The integration with existing large language models for video processing further enhances the generated video content with advanced filmmaking capabilities, leveraging the vast knowledge and processing power of these models for video content generation.

The training of the AI models may include processing variables such as lens types, camera settings, and shot composition. This detailed approach to training, combined with the integration of Lidar data, provides the AI with a rich understanding of three-dimensional space and the relationship between objects within it. The development of a user interface that allows clients to specify video characteristics using the same metadata language the AI was trained on represents a significant advancement in making professional filmmaking techniques accessible to a broader audience.

The potential for consumer applications of the present techniques is vast, offering users the ability to apply professional filmmaking techniques to their videos. This democratization of filmmaking technology may lead to a new era of video content creation, where advanced techniques are no longer the exclusive domain of professionals with access to expensive equipment and extensive training.

In summary, the present techniques introduce a comprehensive system and method for generating video content that simulates professional filmmaking techniques. By leveraging detailed metadata, integrating Lidar data for a three-dimensional understanding of space, and incorporating advanced AI algorithms, these techniques offer significant improvements in processing efficiency, narrative coherence, and the realism of generated video content. This approach not only enhances the quality of video content but also opens up new possibilities for creative expression and storytelling in the digital age.

Introduction

The present techniques may include a integrating advanced artificial intelligence (AI) with traditional filmmaking techniques to improve upon film production processes and procedures. The present techniques may include filmmaker computing system (Filmmaker) that accesses data inputs derived from professional filmmaking expertise to generate high-quality video content that adheres to the highest standards of the industry. Unlike existing text-to-video models, Filmmaker may embed intricate cinematic knowledge directly into the AI's learning process, ensuring outputs with improved artistic fidelity. Filmmaker may include instructions for performing data collection and AI training strategy, including for parsing detailed cinematic metadata, including camera settings, lens types, lighting techniques, and shot compositions. Filmmaker may further include instructions for embedding collected data within the AI's operational framework, which enables the Filmmaker computing system to execute complex cinematic tasks with the exactitude of seasoned filmmakers, significantly improving upon the capabilities of current AI technologies in the field.

The data collection process may include receiving data via a controlled shooting environment, to ensure consistency and repeatability. This approach may include utilizing multiple cameras and angles to capture a dataset enriched with metadata such as camera settings, positional data from lidar, and manually tagged shot types. This metadata is not merely descriptive; rather, it embeds professional filmmaking techniques directly into the data structure, enabling the AI to learn and apply these techniques effectively.

The present techniques may include instructions for training one or more AI models to recognize and reproduce professional filmmaking techniques and styles. This training may include training the foundational model on an annotated dataset, using feedback loops to refine model accuracy. Part of this feedback loop may include receiving data from one or more film professionals to ensure the generated content meets professional standards. This iterative process may be used as an optional quality control measure via a structured feedback mechanism, to ensure that the AI model continually improves, enhancing its ability to handle diverse filmmaking styles and scenarios.

Exemplary Prior Art Text-to-Video Interfaces vs. Filmmaker Computing System

Figure 1B:
FIG. 1B depicts an exemplary prior art graphical output generated by according to the text instructions of FIG. 1A, but which have no effect on the generated image, according to some aspects.
Figure 1C:
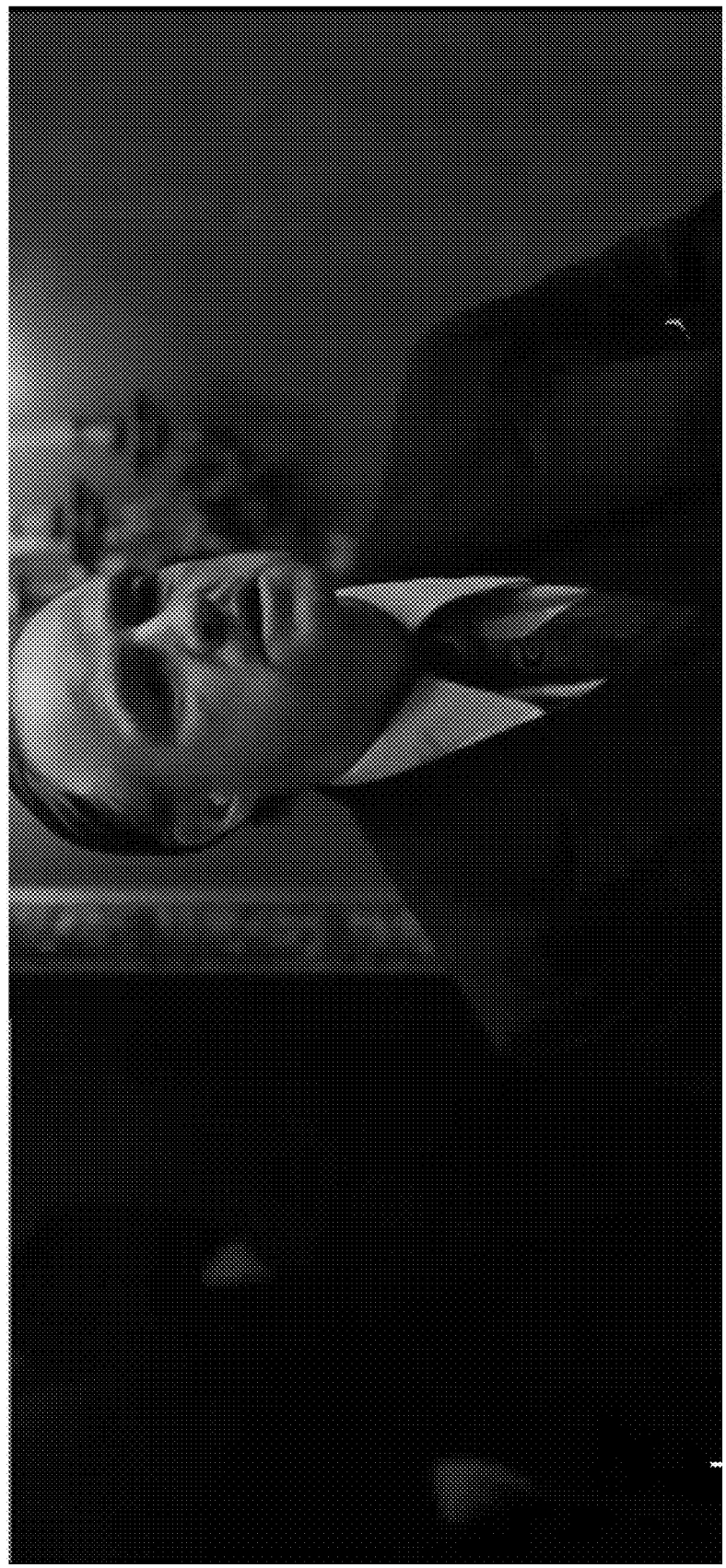
FIG. 1C depicts exemplary desired graphical output corresponding to the text instructions of FIG. 1A, according to some aspects.

FIG. 1A depicts an exemplary prior art graphical user interface 100 into which cinematographic text instructions (prompts) have been entered, but which have no effect on the generated image of FIG. 1B, or have a different effect. Two examples of inputs, conventional outputs, and desired outputs are provided in FIGS. 1A-1F. The limitations of conventional models are evident in text-to-video interfaces where the integration of textual information pertaining to cinematographic attributes or filmmaking technicalities is attempted. The prior art systems do not possess the capability to interpret or utilize such descriptors/properties, resulting in a significant disconnect between the user's input and the generated visual content. This lack of responsiveness to cinematographic details means that these systems are of no practical utility to filmmakers.

The prior art text-to-image systems, as exemplified, fail to take cinematographic attributes into account. This omission means that despite the input of detailed instructions related to camera specifications, movement, or cinematic context, the output does not reflect these specifications. The system's inability to process and integrate these cinematographic details into the generated image or video sequence results in outputs that are visually generic and lack the intended artistic or technical nuances.

Specifically, in the prior art graphical user interface 100, the user has instructed the system via a text prompt that "Lighting in the scene is characterized by a single, soft key light positioned 45 degrees to the right and slightly above" an object in the scene. The resulting generated video completely discards this instruction. The trained model does not have any specific training around scene lighting generally, let alone the meaning of a key light, or how to adjust such a light in generated video via an offset or degree parameter. Thus, even when a prompt such as the one in FIG. 1A is provided, which includes very specific properties (e.g., lens, film and lighting details), the model is unable to generate images or video having the specified properties due to a gap in its semantic training.

Figure 1D:
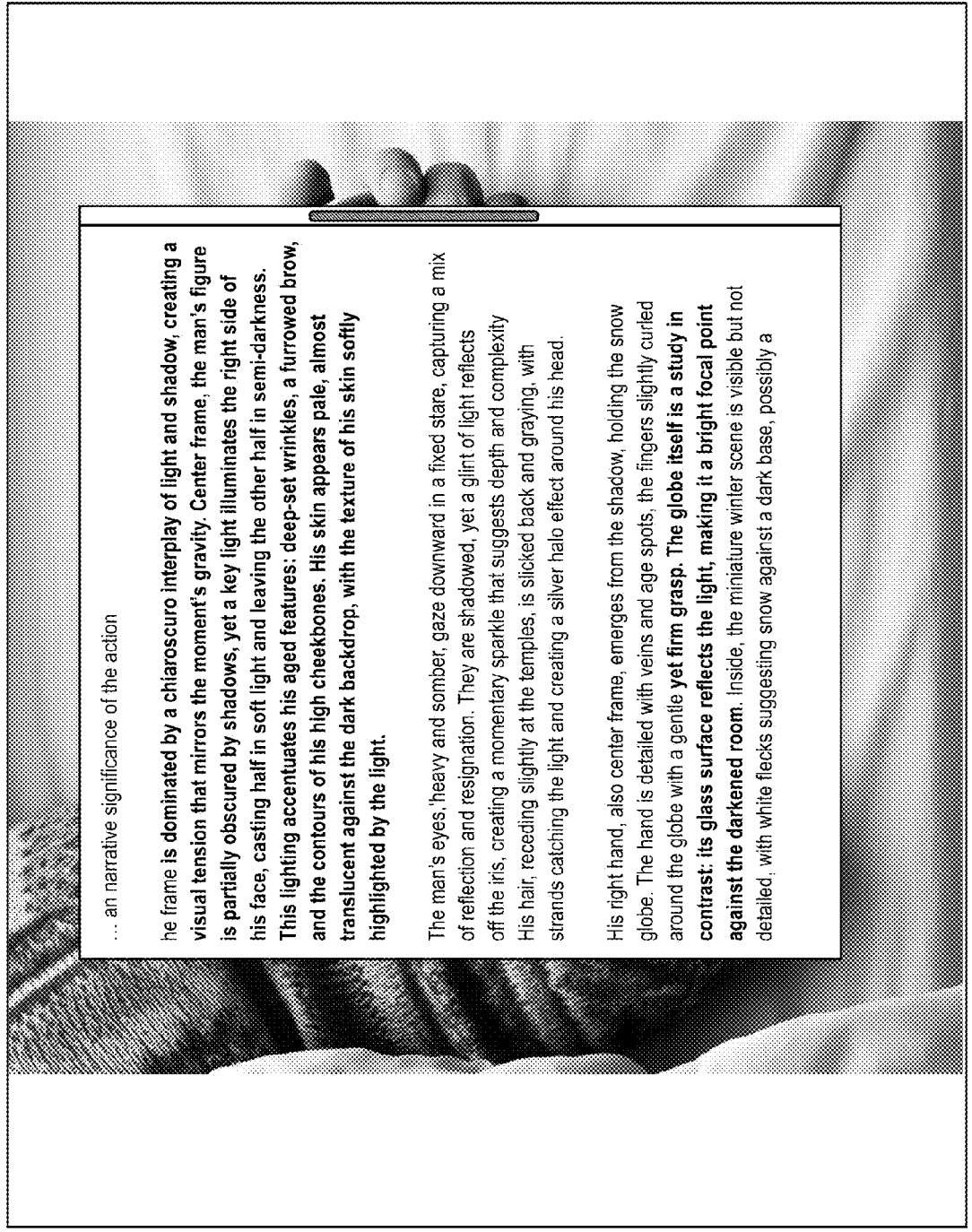
FIG. 1D depicts a further exemplary prior art graphical user interface into which cinematographic text instructions (prompts) have been entered, but which have no effect on the generated image, according to some aspects.
Figure 1E:
FIG. 1E depicts an exemplary prior art graphical output generated by according to the text instructions of FIG. 1D, but which have no effect on the generated image, according to some aspects.

In the FIG. 1D, out of frame, the user has specified the following prompt instructions:
- a key light source from the right side of the frame cases a soft yet distinct light one right of the man's face and has created a pyramid range of highlights and shadings that sculpt his facial features and the contours of the hand and globe;
- the contrast created by this lighting setup accentuates the textures and forms within the frame, with the brightest areas drawing the viewer's eye to the central elements, while the darker areas recede, providing a backdrop that enhances the overall composition's depth.
- This carefully constructed scene uses positioning, lighting and contrast to focus the viewer's attention on the critical moment of the snow globe's release. The central positioning of the man's face and hand, along with the globe's placement slightly in the foreground, emphasizes the emotional and narrative significance of the action.

However, the conventional models, as shown, are totally incapable of following these instructions, due to their noted deficiencies.

Further, prior art models also generate images that violate the laws of physics, such as clouds that rain hot lava, mutated humanoid forms riding motorcycles backwards, flying motorcycles, vehicles that simultaneously drive forwards and backwards, In contrast to prior art techniques, the Filmmaker computing system may include training and operating improved text-to-speech models that take into account prompts that include cinematographic attributes, including: (1) camera specifications (e.g., focal length, sensor size, lens type, etc. and can significantly influence the visual style of the generated image or video, affecting aspects such as the field of view, depth of field, and overall visual aesthetic); (2) movement (e.g., dollying (moving the camera forward or backward), panning (rotating the camera horizontally), and tilting (rotating the camera vertically); incorporating these movements into the generated content can introduce dynamic storytelling elements and enhance the visual narrative); and (3) cinematic context (e.g., composition, depth of field, and the interaction between foreground and background elements; focusing on how these elements are arranged and visualized to convey a particular mood, focus, or story element).

In practice, these attributes can be used to create more nuanced and visually compelling content. For example, a user may specify a model prompt such as, "a close-up shot with a shallow depth of field, using a 50 mm lens, slowly panning across a crowded street scene." The present improved models may be specifically trained to interpret these instructions, taking into account the specified focal length to adjust the depth of field and simulate the panning movement, thereby generating an image or video sequence that closely aligns with the user's creative intent. By incorporating these cinematographic details, the present techniques offer a significant advancement over the prior art, providing users with a tool that better supports creative expression and technical precision in the generation of digital visual content.

Benefits of AI Integration in Film Technology Industries

The present techniques relate to AI technology tailored for the film industry, aimed at significantly reducing (and in some cases, eliminating entirely) the need for extensive principal photography, thereby saving both time and money. This technology allows for the performance of tasks to professional standards, thereby addressing a critical need within the film production process. The AI technology, through its algorithms and data processing capabilities, can generate high-quality video content that adheres to the directorial and cinematographic inputs closely, including nuanced details such as focus pulling and gradual changes in lighting.

One of the key components of this technology is the construction of a high-quality Filmmaker model, encoded with elaborate and rich metadata concerning optics and movement. This model enables the AI technology to function reliably by utilizing existing AI libraries, thus making it a valuable tool for studios and streamers. The technology includes a set of sophisticated tools designed for business-to-business (B2B) applications, with a concurrent development of a product derived for business-to-consumer (B2C) applications. These tools ensure that the generated content meets professional standards, offering a cost-effective solution for content production.

The financial implications of incorporating AI technology into the film production process are substantial. With principal photography savings estimated to range conservatively from 10-20% of total production costs, the financial burden on studios could be significantly reduced. For instance, considering the estimated spending on original films and series in 2022 by major companies, which amounted to a combined content spending of $140.5 billion, a hypothetical reduction of 20% in spending towards original content production could lead to substantial savings. This reduction translates to savings ranging from $8.43 billion to $16.86 billion, based on the estimated range of $56.2 billion to $84.3 billion allocated towards original productions.

Further, AI service providers can generate substantial revenue by charging a fraction of the cost savings as their fee, thereby creating a win-win situation for both the film industry and the technology sector. The technology also presents an opportunity to replace the cost associated with background artists, second or splinter unit aerials, inserts, and reshoots, achieving a day one 20% reduction in schedule and physical production and a 50% reduction in visual effects (VFX) cost.

Furthermore, the present techniques facilitate a paradigm shift in the way films are produced, eliminating the need for filming across far-flung locations to save costs. By making it easier and cheaper to shoot close to home, the Filmmaker computing system and Toolkit (discussed below) offer a practical solution that does not inconvenience production teams.

Lastly, the present techniques aim to codify new revenue streams with studios via agencies, establishing win-win partnerships that show how AI expands the market for intellectual property (IP) exploitation. By demonstrating B2C 'packages' that include actors, writers, and directors' IP, the technology seeks to define a new pay structure that benefits all parties involved.

In sum, the present AI technology advantageously advances the film production process, offering cost savings, efficiency, and new opportunities for revenue generation, thereby benefiting the film industry and the technology sector alike.

Overcoming Industry AI Resistance

The present techniques are intended to bridge the traditional filmmaking community and the rapidly-evolving field of AI technology. In particular, the present techniques seek to address and mitigate the prevalent fear and misunderstanding surrounding the use of AI in video production, which often acts as a significant barrier to the adoption and implementation of such technologies within the film industry. The Filmmaker computing system can be used to integrate AI technologies into filmmaking processes and to foster understanding of AI capabilities among filmmakers and content creators. The Filmmaker computing system does this by being a technical and cultural translator. On the technical front, the Filmmaker computing system is designed to demystify the complexities of AI for those in the filmmaking industry, providing an intuitive interface through which filmmakers can leverage advanced AI functionalities without the need for extensive technical knowledge. This includes, but is not limited to, capabilities such as AI-driven editing, scene composition, and even script analysis, all tailored to enhance the creative process without supplanting the creative vision and direction of human filmmakers.

Culturally, the Filmmaker computing system acts as an ambassador of AI technology within the filmmaking community. It embodies a bridge between two distinct cultures: the tech industry, characterized by rapid innovation and a focus on technological advancement, and the film industry, with its rich history of storytelling and creative expression. By fostering a dialogue between these two worlds, the Filmmaker computing system seeks to dispel misconceptions and build trust, demonstrating how AI can be a powerful tool for creativity rather than a threat to traditional filmmaking practices.

To further facilitate the adoption of the Filmmaker computing system, the invention includes strategies for socializing and demonstrating its capabilities to film studios and content creators. This involves curated demonstrations that showcase the model's potential to enhance storytelling and production efficiency, as well as targeted outreach to influential figures within the industry who can act as credible ambassadors for the technology. These efforts are crucial in overcoming consumer reluctance and mitigating concerns regarding copyright litigation, which have historically posed challenges to the integration of AI in creative industries.

Modeling Overview

The present techniques include a Filmmaker computing system configured to train and operate one or more Filmmaker models. Filmmaker models may be foundational models designed to significantly enhance the capabilities of large-scale artificial neural networks in the realm of professional film production. The filmmaker model may use an implementation of the transformer architecture, with specific modifications to its self-attention mechanisms. These modifications may include prioritizing filmmaking-specific features within the training data. By doing so, the Filmmaker models may be trained to understand and apply a wide range of cinematic techniques and language, thus enabling the models to generate video content that adheres to professional filmmaking standards, as parameterized by user inputs (i.e., prompts). The Filmmaker models may include custom tokenization strategies that capture and use technical filmmaking terms and concepts. These strategies transform complex filmmaking terminologies into actionable data points, which the model can then learn from.

In some aspects, the present modeling techniques may include refining the data processing and output quality of existing AI models by leveraging the capabilities of Filmmaker models. For example, the present techniques may include enabling a text-to-video AI to recalibrate its existing knowledge base, allowing for precise manipulation of video elements in accordance with professional filmmaking standards. This recalibration may be achieved through a structured approach that includes pinpointing core data requirements, teaching selective recognition and manipulation of filmmaking techniques, fine-tuning outputs with detailed prompts, optimizing data collection for key filmmaking techniques, incorporating advanced metadata and labeling, and ensuring integration with existing AI technologies.

In particular, the invention emphasizes the importance of concentrating on data elements that are transformative and defining in professional video production, such as camera settings, lens behavior, spatial relationships, and depth and scale manipulation. By capturing and utilizing data related to these elements via controlled environments, the Filmmaker models are trained to recognize and apply various filmmaking techniques. This training may involve the use of example training sets that include shots captured using multiple lenses at various f-stops and distances, each accompanied by metadata detailing every parameter altered.

The present techniques enable outputs to be fine-tuned using detailed prompts that are designed to be filmmaking-specific, enabling the AI to make nuanced adjustments effectively. For example, the AI models can be instructed to recreate a shot using different camera settings, thereby demonstrating that the Filmmaker model can adhere closely to filmmaker's intentions while generating video content.

To optimize data collection, the present techniques may prioritize key filmmaking techniques and introduce controlled variability to ensure that AI models learn from clear, distinct examples. Advanced metadata and contextual labeling may accompany training data, enhancing the AI's understanding of specific settings and their intended visual outcomes.

The integration of "Filmmaker" with existing AI technologies may be facilitated through the use of standard APIs and data formats. Feedback mechanisms may be implemented for iterative improvements, utilizing professional filmmakers' critiques to refine the model further, in some aspects.

In conclusion, Filmmaker AI models represent a significant advancement in the field of AI-generated video content. By focusing on essential data and techniques related to professional filmmaking, the present modeling techniques not only enhances the capabilities of larger AI models but also allow for precise control over the artistic elements of video production. This approach advantageously reduces computational load and increases the efficiency and specificity of AI-generated video content, thereby contributing to the advancement of the field of AI in professional film production.

Exemplary Computing Environment

Figure 2A:
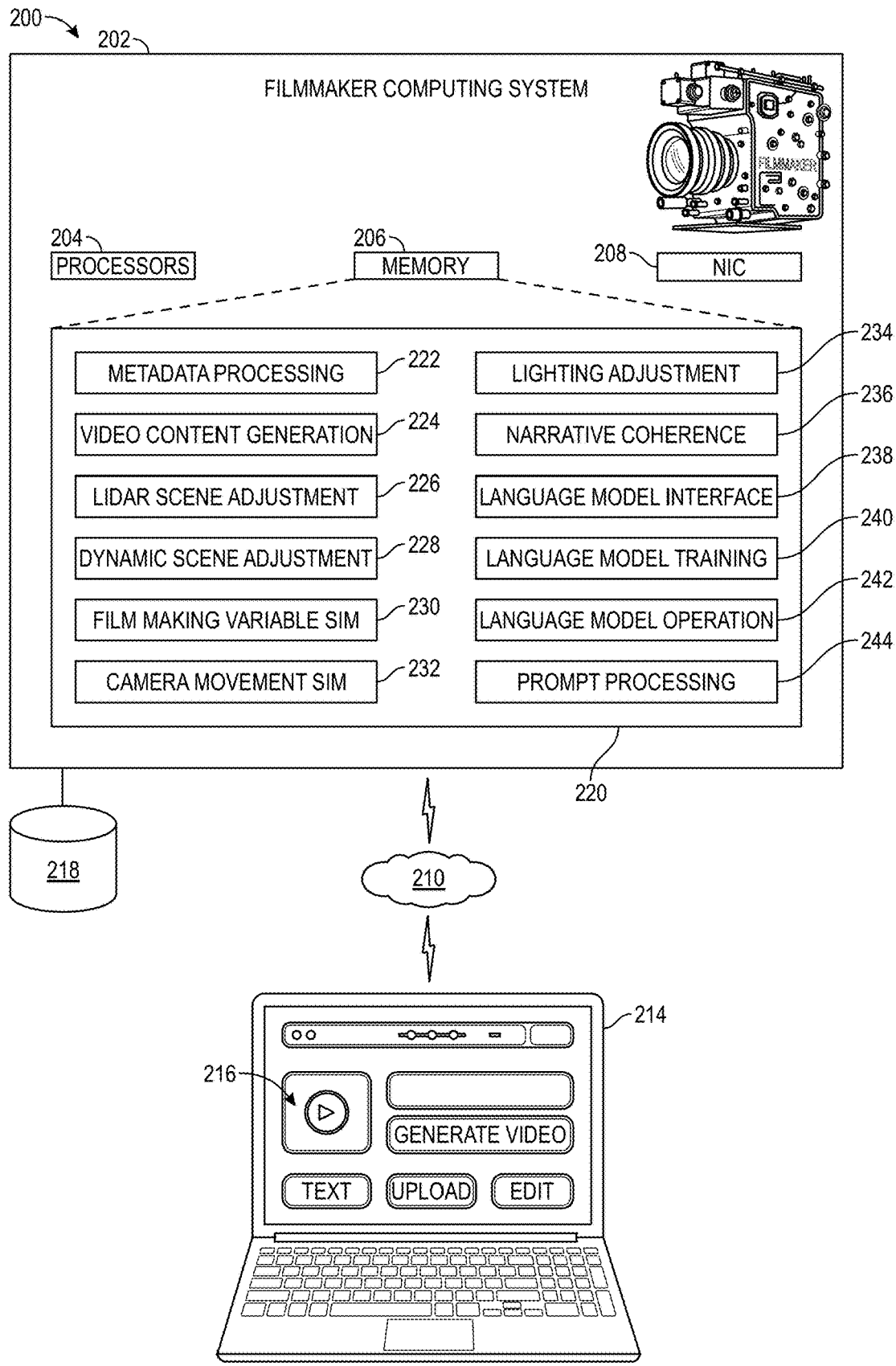
FIG. 2A describes a computing environment for generating video content that simulates professional filmmaking techniques by integrating detailed metadata and/or Lidar data to enhance the three-dimensional understanding of space and object relationships, according to some aspects.

FIG. 2A describes a computing environment 200 for generating video content that simulates professional filmmaking techniques by integrating detailed metadata and/or Lidar data to enhance the three-dimensional understanding of space and object relationships, according to some aspects. The computing environment 200 may include one or more filmmaker computing systems 202. Each of the one or more filmmaker computing systems 202 may, respectively, include one or more processors 204, one or more memories 206, and one or more network interface controllers (NIC) 206. In some aspects, the computing environment 200 may include a plurality of filmmaker computing systems 202 that are linked together, as in a cluster or networked computing environment. In some aspects, the computing environment 200 may be (or be part of) a cloud computing environment (e.g., a public compute cloud, a private compute cloud, a hybrid cloud, etc.). The computing environment 200 may be duplicated across a plurality of instances, and modules in the modules 220 (discussed below) distributed among the plurality of instances, for example for load balancing purposes.

Figure 2B:
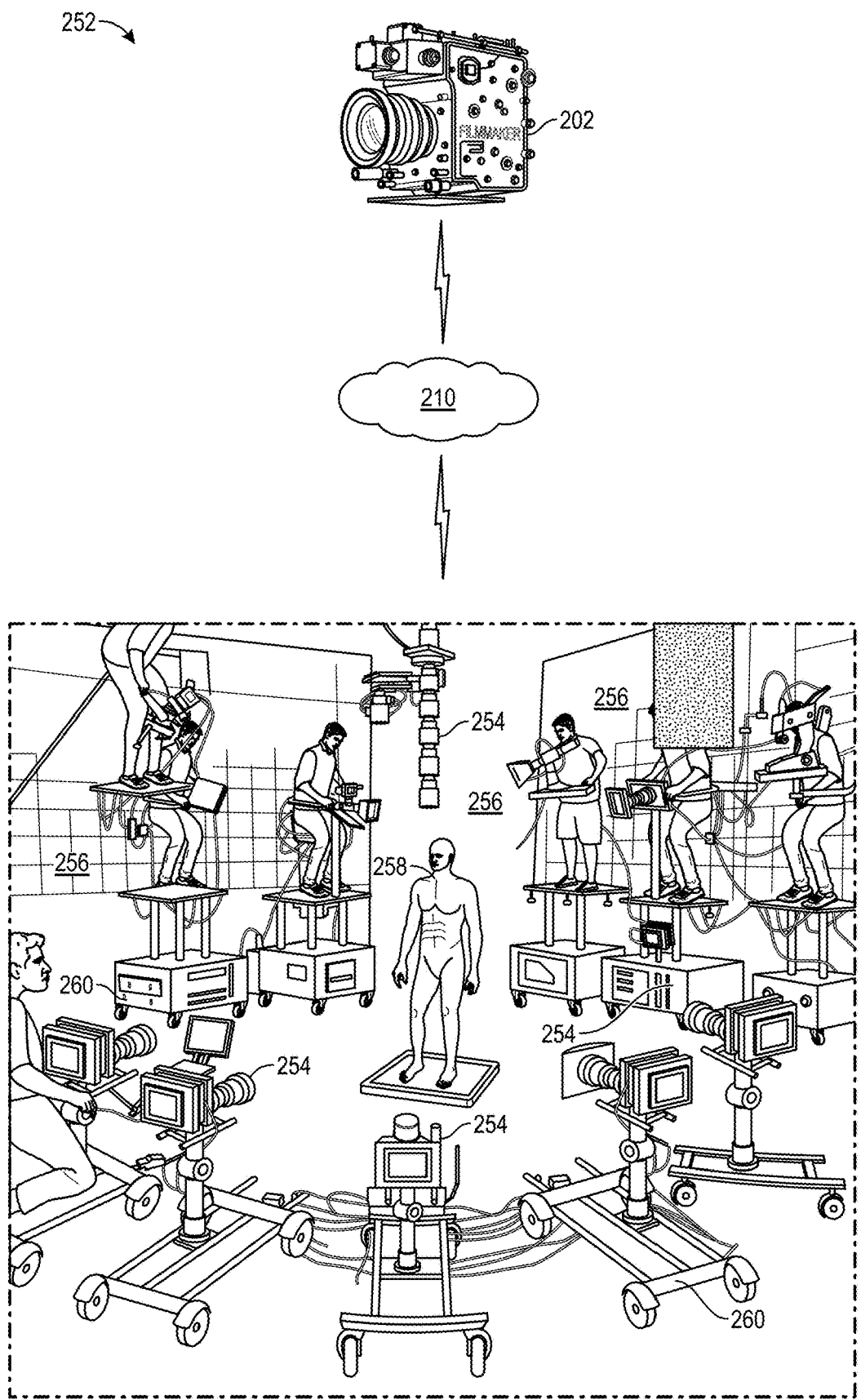
FIG. 2B depicts an exemplary behind-the-scenes environment of a film or video production environment that may be configured to capture data to train an AI model in filmmaking techniques, according to some aspects.
Figure 2C:
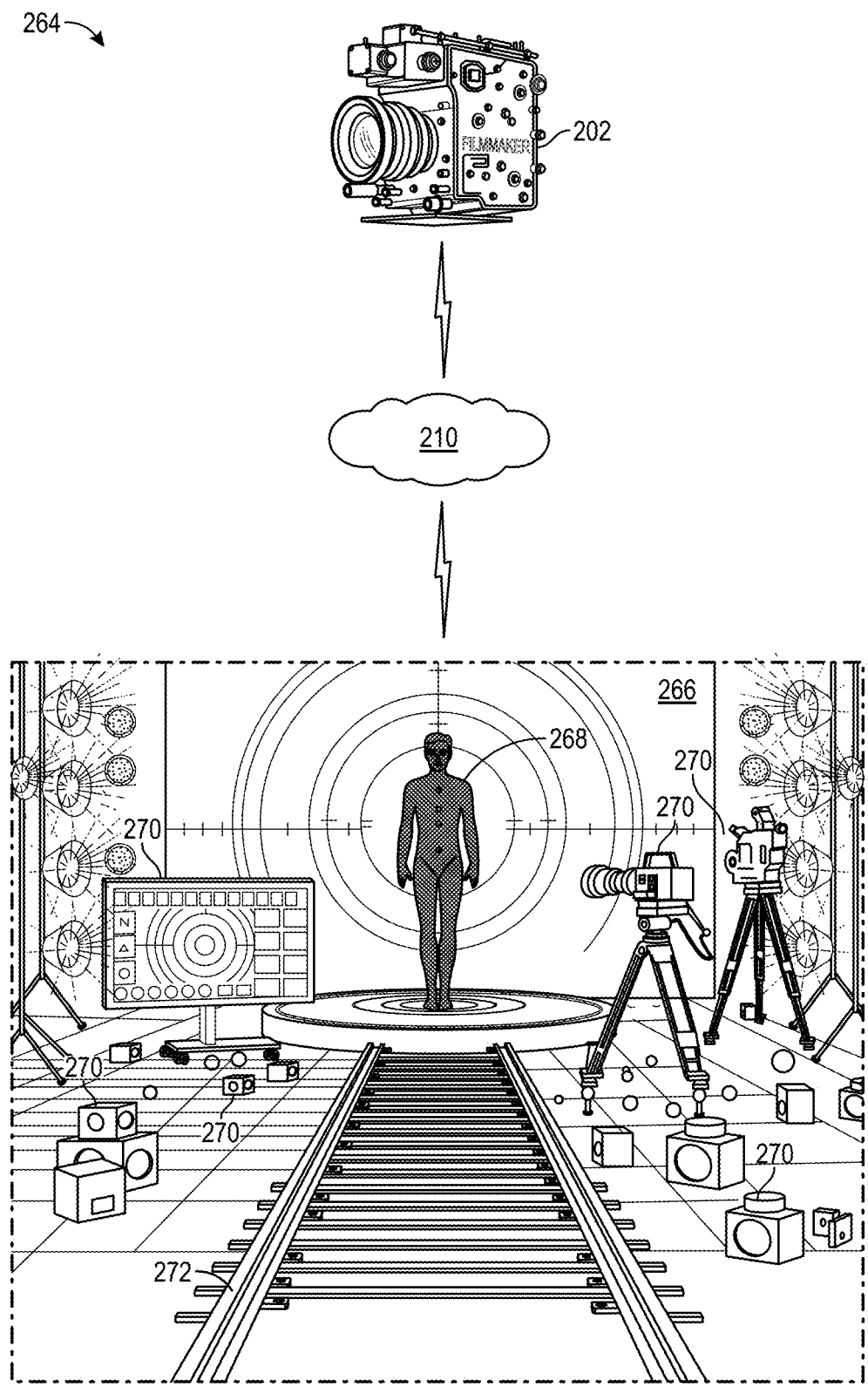
FIG. 2C depicts a simulation environment for training AI in filmmaking, according to some aspects.
Figure 2D:
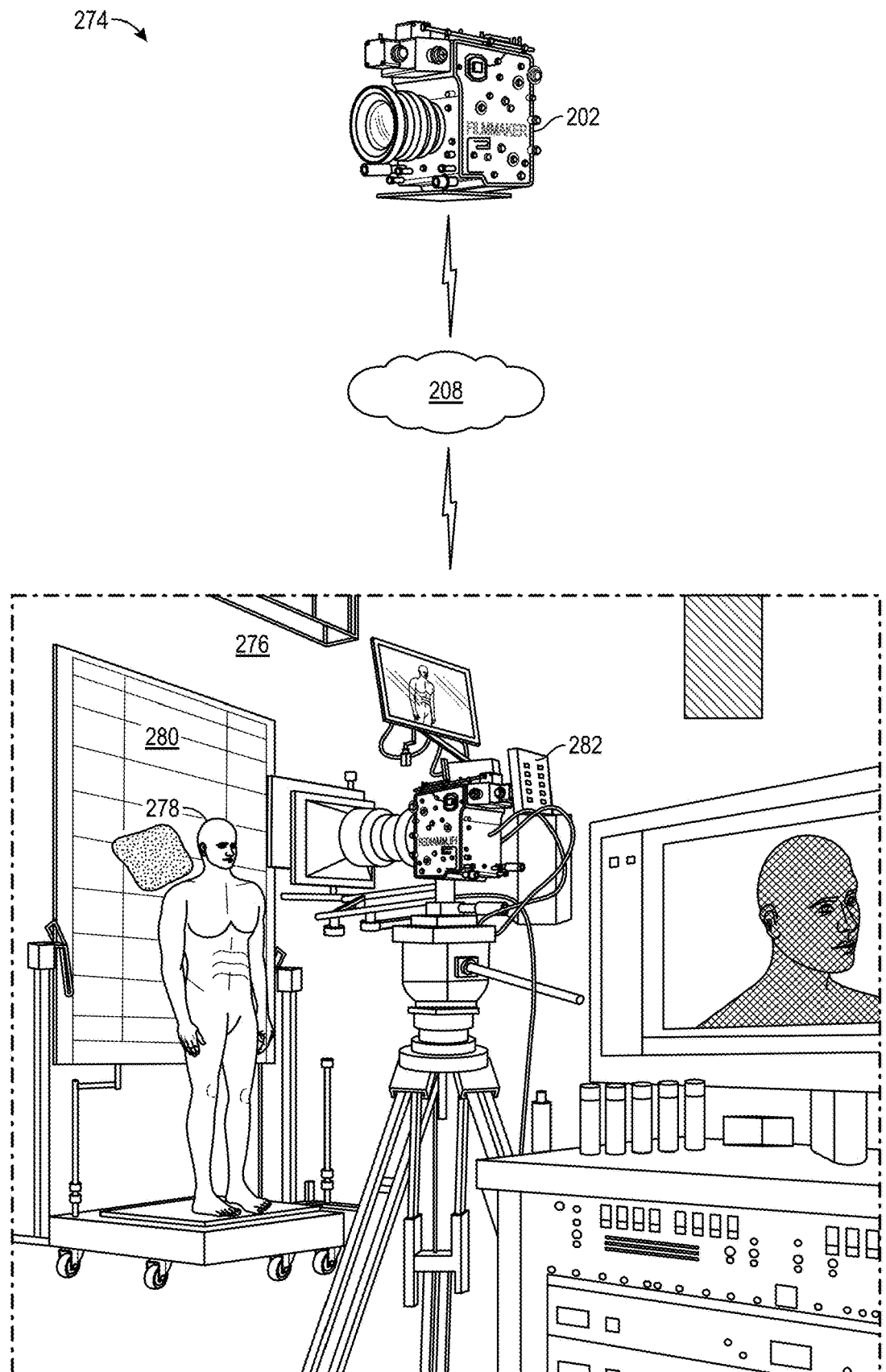
FIG. 2D depicts a filmmaking environment having a green screen for separating foreground subjects from the background for compositing in post-production.

The processors 204 may include any number of processors and/or processor types, such as central processing units (CPUs), graphics processing units (GPUs), tensor processing units (TPUs) and/or others, configured to execute software instructions stored in the memories 206. The memories 206 may include volatile and/or non-volatile memory, such as read-only memory (ROM), random access memory (RAM), and/or others. The NICs 208 may include any suitable network interface controller(s), facilitating networking over the network between the computing environment 200 and other components. In some aspects, the computing environment 200 may be accessible to other components, such as one or more cameras, one or more film dollies, one or more overhead laser devices, etc. as shown in FIG. 2B-FIG. 2D. The computing environment 200 may be communicatively coupled to an electronic network 210, to one or more devices 214 having user interfaces (UIs) 212, and/or to one or more electronic databases 218, in some aspects.

The memories 206 may have stored thereon a plurality of modules 220, each being a respective set of computer-executable instructions. These modules may include a metadata processing module 222, a video content generation module 224, a Lidar data integration module 226, a dynamic scene adjustment module 228, a filmmaking variable simulation module 230, a camera movement simulation module 232, a lighting adjustment module 234, a narrative coherence module 236, a language model interface module 238, a language model training module 240, a language model operation module 242, and a prompt processing module 244. In some aspects, more or fewer modules may be included (e.g., depending upon specific deployment requirements and/or task-specific configurations).

The training and operation of AI models in the present techniques by the language model training module 240 and language model operation module 242, respectively, may be performed by GPUs or other specialized hardware designed to accelerate machine learning tasks. For example, Tensor Processing Units (TPUs) are generally optimized for the high-volume matrix operations that are common in artificial neural network training and inference, making them highly efficient for training the complex models involved in the language model training module 240. GPUs, while more general-purpose, also provide significant acceleration for both training and operational tasks due to their parallel processing capabilities.

High-speed interconnects may also be included in the computing environment 200, (including the network 210, in some aspects) to facilitate fast data transfer between TPUs, GPUs, and other components of the computing environment. These interconnects generally ensure that data flows efficiently through the system, minimizing bottlenecks and enabling the modules to operate at peak performance. This is especially important in a distributed computing setup, where tasks are spread across multiple machines to accelerate the training and operation processes. Distributed computing allows for the parallelization of tasks, significantly reducing the time required to train the AI models on large datasets. By leveraging these advanced computational resources, the computing environment can efficiently train and operate the AI models, enabling the rapid generation of professional-quality video content.

The metadata processing module 222 may process received metadata related to filmmaking techniques, including camera settings, shot composition, and lighting setups.

The video content generation module 224 may generate video content that simulates professional filmmaking techniques based on the processed metadata.

The Lidar data integration module 226 enhances the generated video content with a three-dimensional understanding of space and object relationships by integrating Lidar data with the processed metadata. For example, the integration of Lidar data is discussed below with respect to FIG. 2B-FIG. 2D.

The dynamic scene adjustment module 228 adjusts the generated video content based on dynamic scene changes documented in the metadata. For example, dynamic scene changes are discussed below with respect to FIG. 2B-FIG. 2D.

The filmmaking variable simulation module 230 systematically alters key filmmaking variables in the metadata to simulate the impact of each element on the final video output. For example, simulation is discussed below with respect to FIG. 2B-FIG. 2D.

The camera movement simulation module 232 simulates camera movements within the generated video content based on the processed metadata. For example, camera movement is discussed below with respect to FIG. 2B-FIG. 2D.

The lighting adjustment module 234 adjusts lighting within the generated video content in post-production based on the processed metadata. For example, lighting adjustments are discussed below with respect to FIG. 2B-FIG. 2D.

The narrative coherence module 234 ensures narrative coherence across generated scenes based on the processed metadata. Specifically, the narrative coherence module 236 may work with the language model operation module 242 and video content generation module 224 to ensure that the generated video content maintains a coherent narrative structure. By understanding the narrative elements from the training process, the AI can apply this knowledge to create content that flows logically and engagingly from one scene to the next.

The LM interface module 238 interfaces with existing large language models for video processing to enhance the generated video content with advanced filmmaking capabilities. For example, the LM interface module 238 may include a set of computer-executable instructions for accessing a pre-trained model (e.g., an OpenAI model).

The training module 240 may refine the capabilities of AI models in understanding and generating text-based inputs and outputs relevant to filmmaking. The language model training module 240 may include instructions (i.e., software) for training one or more AI models to interpret and generate descriptive metadata, scripts, and other text-based filmmaking elements. The training process may include using transformer models, which are a type of artificial neural network architecture designed to handle sequential data, such as text, with high efficiency. The training process may further include variational autoencoder models (encoder-decoder architecture). The training process may further include attention mechanisms (including multi-attention mechanisms), deep learning, feed-forward networks and/or convolutional neural networks. The training process may include diffusion models. In some aspects, the diffusion models may be conditioned to generate video frames based on combined training vectors that include both video data and descriptors including cinematographic attributes. The language model training module 240 may train using vast amounts of data, allowing them to learn the structure and nuances of film. In the context of filmmaking and the Filmmaker computing system, these models may be trained on a dataset comprising video data, scripts, cinematographic descriptions, and metadata related to filmmaking techniques. This training may enable the AI to understand the intricacies of language as it pertains to the creation and description of video content.

The language model training module 240 may integrate Generative Adversarial Networks (GANs) into the training process. The GAN may include two artificial neural networks, a generator and as discriminator, that compete against each other. The generator may generate video content based on the learned filmmaking techniques, while the discriminator may evaluates this content against professional standards. Through this adversarial process, the AI model may refine its ability to generate video content that closely mimics professional filmmaking quality. The use of GANs in this context ensures that the generated content is not only technically accurate but also aesthetically pleasing and true to the intended artistic vision.

Further, the language model training module 240 may use transfer learning to enhance the capabilities of a language model (LM) such as a large language models (LLMs) in generating film content. Transfer learning may include fine-tuning a pre-trained model (e.g., an OpenAI model, a Google model, a proprietary model, an open source model such as Meta Llama) with a specific dataset, in this case, data related to filmmaking. This approach allows the LM to apply its extensive understanding of language to the specific domain of filmmaking, enabling it to generate coherent and contextually relevant video content based on cinematographic attributes provided via a prompt interface. Once trained, by inputting prompts that describe desired camera angles, lighting conditions, and narrative elements, users can guide the AI in producing video content that aligns with professional filmmaking standards. Advantageously, this training technique significantly accelerates the training process and enhances the model's ability to generate high-quality video content, making it a powerful tool for filmmakers and content creators seeking to apply professional filmmaking techniques to their work.

The language model training module 240, while initially described in the context of processing and generating text-based inputs and outputs, may be additionally (or alternatively) trained using video data to enhance its understanding and generation of film content. This training may involve a process where the language model training module 230 processes one or more libraries of video content, including films, documentaries, and other video materials that exemplify professional filmmaking techniques. These libraries may be extensive, and may include, data not typically available to technology companies, such as the vast troves of dailies, which are the raw, unedited footage shot during a day of filming. Training with dailies is discussed below.

The language model training module 230 may annotate video with detailed metadata that describes various aspects of the content, such as camera angles, lighting conditions, scene composition, and narrative elements. This metadata may enable the AI to learn correlations between textual descriptions and their visual representations in video content. The language model training module 240 may use deep learning techniques to enable the module to recognize patterns and learn from the visual and textual data. By processing both the video content and the associated metadata, the AI models within the module learn to understand the nuances of filmmaking, such as how specific camera settings affect the visual outcome or how lighting setups contribute to the mood of a scene. In some aspects, a dual approach of learning from both video and text allows the AI to generate video content that not only adheres to professional standards but also aligns with specific cinematographic attributes provided by users. The language model training module 240 may use one or more convolutional neural networks (CNNs) for analyzing visual data and/or one or more recurrent neural networks (RNNs) and/or transformer models for processing sequential data, such as metadata and scripts. The combination of these neural network architectures enable the one or more models to learn from both the visual and textual aspects of filmmaking.

Additionally, the language model training module 240 may incorporate reinforcement learning, where the AI receives feedback on the generated content. This feedback loop allows the AI to iteratively improve its content generation capabilities, ensuring that the output closely matches the intended filmmaking techniques and narrative goals. Through iterative training, the language model training module 240 becomes proficient in generating video content that reflects the complexity and nuance of professional filmmaking, based on both the rich video data and detailed metadata it has been trained on. The language model training module 240 may also integrate training data from alternative sources.

For example, training with dailies advantageously refines the capabilities of the AI models within the language model training module 240, because dailies represent a rich source of real-world filmmaking data, capturing the nuances of camera work, lighting, actor performances, and scene composition. Training on this data allows the AI to learn from actual film production environments, providing insights into how professional filmmakers execute their vision and how various cinematographic attributes are applied in practice. This is also a large source of video training data that, when licensed from a film studio, is reliably free from copyright issues that may plague other training data sources (data ingestion and sourcing are discussed further below). In general, the language model training module 240 may train one or more models using dailies by collecting dailies from film sets, ensuring a wide variety of scenes, lighting conditions, and camera movements are represented. Each piece of footage may be annotated with detailed metadata that describes the cinematographic techniques used, such as camera settings, lighting setups, and the intention behind certain shots. This metadata acts as a label that enables the one or more AI models to understand the context and purpose of each filmmaking decision.

Given the raw nature of dailies, preprocessing may be performed in some aspects to make the data more suitable for training. This may involve segmenting the footage into manageable clips, normalizing audio levels, and encoding the video in a standard format. The language model training module 240 may process the preprocessed dailies to extract features related to cinematography, narrative structure, and visual storytelling. This may include using one or more separately trained convolutional neural networks (CNNs) to recognize visual patterns and/or one or more transformer models and/or recurrent neural networks (RNNs) to process sequential data, such as the progression of shots or the unfolding of a scene. The language model training module 240 may include instructions for training one or more AI models to learn from the extracted features, correlating specific cinematographic techniques with their visual and emotional impacts. This learning process may be enhanced by reinforcement learning, where the AI receives feedback on its interpretations and adjustments are made to improve accuracy and relevance. The insights and capabilities developed from training on dailies may be integrated into the video content generation process. This enables the AI to apply practical, real-world filmmaking techniques to the content it generates, ensuring that the output closely mimics the quality and style of professionally produced films, and giving the AI much more data for training.

The language model training module 240 may interact with the other modules within the computing environment 200 to enhance the overall video content generation process. For example, the language model training module 240 may receive metadata from the metadata processing module 222. The language model operation module 242 may load one or more trained models stored within the computing environment 200 and use them to process and generate content, in conjunction with the video content generation module 224. The language model operation module 242 may act as the execution arm of the computing environment 200, applying the trained models to real-world filmmaking tasks. The language model operation module 242 may interpret user inputs, such as cinematographic attributes provided via a prompt interface, and use the trained models to generate video content that meets these specifications. For example, such a prompt interface may be the UI 216.

The prompt processing module 244 may include instructions for processing user inputs, specifically prompts that dictate the desired cinematographic attributes for video content generation. The prompt processing module 244 may receive prompts from users via the one or more devices 214. The one or more devices 214 may be any user interface devices such as a computer, tablet, smartphone, wearable device, etc. For example, the prompt may be entered into the UI 216 by a user, and the UI 216 may include instructions for transmitting the prompt to the computing environment 200, and ultimately, to the prompt processing module 244 (e.g., after sanitization).

In operation, filmmakers and/or content creators (e.g., a film studio employee, a consumer, etc.) may use the computing environment 200 to specify video characteristics using metadata language. In some aspects, the computing environment 200 may process this metadata, simulate professional filmmaking techniques, and integrate Lidar data to produce high-quality video content. This process may reduce production costs and allow for the application of professional filmmaking techniques to generated videos.

The process of generating content with varying cinematographic attributes based on user prompts may be performed by the language model operation module 242 with trained models from the language model training module 240. When a user inputs a prompt specifying certain cinematographic attributes—such as desired camera angles, lighting conditions, mood, or narrative elements—the language model operation module 242 may interpret these prompts and communicate the requirements to the appropriate AI models. By this time, the AI models, trained on a vast dataset of video content and associated metadata, have already learned to correlate specific cinematographic attributes with their visual and narrative impacts. For example, the models, by processing training data, have learned weights for generating outputs based on patterns in the data they have been trained on. This reflects the ability of the models to process and generate coherent and contextually appropriate responses based on training data. For instance, the models can understand how a low-angle shot can make a character appear more dominant or imposing, or how warm lighting can create a cozy and intimate atmosphere. When the user's prompt specifies a particular mood or visual style, the AI models draw on this learned knowledge to select and apply the filmmaking techniques that achieve the desired effect. Of course, as discussed herein, the models may be trained further (e.g., using structured feedback).

For instance, upon receiving a prompt, the prompt processing module 244 may process the content of the prompt to determine the specific requirements or attributes the user desires in the generated video content. This analysis may include parsing the text for keywords and phrases that indicate cinematographic preferences, such as camera angles, lighting conditions, narrative themes, or specific actions. The prompt processing module 244 may further normalize and standardize the prompt data by, for example, converting variations of terms or phrases to a standard format recognized by the system and resolving ambiguities that may arise from natural language usage. The prompt processing module 244 may categorize inputs based on the standardization and normalization, according to the type of request they represent-whether they pertain to visual style, narrative content, or specific filmmaking techniques. In some aspects, this categorization may be used to direct the prompts to one or more models for processing. The prompt processing module 244 may further prepare the analyzed and categorized prompts for processing by the language model operation module 242. In some aspects, this preparation may include formatting the prompts into a structure or format that is interpretable by the AI models. The prompt processing module 244 may transmit the prompts to the language model operation module 242, which then utilizes the trained AI models to generate video content that aligns with the user's specified cinematographic attributes.

For example, the user may input a prompt such as: "Create a suspenseful scene with low lighting and a slow zoom on the protagonist's face." The prompt processing module 244 may identify keywords such as "suspenseful scene," "low lighting," and "slow zoom" and categorize this prompt under visual style and mood. The prompt processing module 244 may standardize the terms for consistency and prepare the prompt for the AI models to generate a scene with the specified attributes.

In another example, the user may input a prompt such as "Generate a dialogue scene in a rainy urban setting with a melancholic mood." Here, the prompt processing module 244 may parse the prompt for setting ("rainy urban"), mood ("melancholic"), and scene type ("dialogue scene"). The prompt processing module 244 may normalize the descriptions and categorize the prompt for content generation that requires integration of weather effects, urban environment, and specific emotional tone.

In yet another example, the user may input a prompt such as "Show a high-energy chase sequence with fast cuts and dynamic camera angles." The prompt processing module 244 may process the prompt for action type ("chase sequence"), editing style ("fast cuts"), and camera work ("dynamic camera angles"). The prompt processing module 244 may prepare this information, ensuring the AI models understand the request for a high-adrenaline content generation with specific editing and cinematography techniques.

Through these operations, the prompt processing module 244 may act as a translation layer from user inputs into actionable directives for the AI models. In some aspects, the language model operation module 242 may, based on the interpreted prompt, select a plurality of models and/or model parameters that are known to produce results consistent with the prompt's requirements, to determine how to best generate content that aligns with the specified attributes. In other instances, a default model may be used, without any selection process.

Once the one or more model or models are selected, the prompt may be input into the AI models via the language model operation module 242. The AI models then generate the video content, applying the cinematographic techniques that match the user's specifications. The language model operation module 242 may access the video content generation module 224 to directly generate video content. The computing environment 200 may perform one or more post-processing steps on the output video to generate final video output. The final video content may then be outputted from the computing environment 200, reflecting the specified cinematographic attributes and adhering to professional filmmaking standards. The outputting of video content may include storing the video (e.g., in the one or more electronic databases 218), transmitting the video content via the electronic network 210, allowing a user to directly stream or playback the video (e.g., via a web server interface (not depicted)), etc.

Throughout this process, the computing environment computing environment 200 may use TPUs, GPUs, and distributed computing resources to handle the intensive computational tasks involved in video content generation. The high-speed interconnects ensure that data flows efficiently between modules and computational resources, enabling the system to generate content quickly and in response to user prompts. This approach allows filmmakers and content creators to produce videos with customized cinematographic attributes, significantly enhancing the creative possibilities and reducing the time and cost associated with traditional filmmaking.

The network 210 may include multiple communication networks, such as wired and/or wireless local area networks (LANs) and/or wide area networks (WANs) like the Internet, connecting the computing environment 200 to data sources, user interfaces, and other systems involved in the video production process.

The database 218 may be designed to store and manage large volumes of data essential for the operation of the various modules and the overall video content generation process. Given the extensive data requirements, including video data, metadata, user prompts, and AI model parameters, the database 218 is generally designed to be robust, scalable, and efficient in handling diverse data types. For storing large amounts of video data and associated metadata, database software and storage solutions such as Google Cloud Bigtable, Amazon DynamoDB, or Apache Cassandra may be used. These NoSQL databases are designed for high scalability and performance, capable of handling vast datasets and supporting the high read and write throughput required by the system. They are particularly suited for storing unstructured or semi-structured data, making them ideal for video content and metadata. In addition to NoSQL solutions, traditional relational database management systems (RDBMS) like PostgreSQL or MySQL may be employed for organizing application data that requires structured storage and complex queries. These databases offer robust transaction support, data integrity, and security features, making them suitable for storing user accounts, access permissions, and other structured application data. For user data, which may include user profiles, preferences, and history of prompts, a document-oriented database like MongoDB or Couchbase may be utilized. These databases store data in JSON-like documents and are designed for flexibility and ease of use, allowing for the efficient storage and retrieval of data that varies in structure. This is particularly useful for personalizing the user experience and managing user-specific information. Furthermore, for real-time data processing and analytics, time-series databases such as InfluxDB or TimescaleDB can be employed. These databases are optimized for storing and querying time-stamped data, enabling the system to analyze user interactions, system performance metrics, and video content generation trends over time. Lastly, for enhanced performance and scalability, especially in distributed computing environments, the use of distributed file systems like Apache Hadoop HDFS or cloud storage solutions such as Amazon S3 for bulk storage of video files and other large datasets may be used. These solutions offer high durability, availability, and scalability, ensuring that the one or more filmmaker computing systems 202 can efficiently manage and access large volumes of data as required. By leveraging a combination of these database and storage solutions, the computing environment 200 can effectively support the diverse data storage needs of the video content generation process, from handling large-scale video and metadata storage to managing application and user-specific data.

Training Data Sources and Ingestion

Data for training models utilizing the present techniques may be sourced from various collaborations and structured data utilization methods. For example, collaborations with entities like ShareGrid and CineFlares may provide access to specialized data on lens tests and insights into replicating lenses and optical effects realistically in AI-generated video. This data, including detailed descriptions and technical data from metadata, may be used as a direct input into present AI models, saving substantial preprocessing time and effort. The uniform format of this digitized and labeled may enhance the AI model learning efficiency and accuracy, as training with high-quality, professionally produced content may improve model output quality.

The ingestion process may include a labeling system that categorizes footage based on the type of shot, camera movement, and other metadata, including lens used, aperture setting, ISO level, shutter angle, and camera movement type. This metadata may enable the model to learn the correlation between these settings and the resulting video characteristics. Multi-camera setups may capture various angles simultaneously, enriching the dataset. Legal access to extensive archives of professional film and television production content enables ingestion with detailed metadata of high quality volumes of data. For example, legal checks and licensing involve ensuring legal clearance to access and use extensive archives of professional content. Negotiations with studios, independent filmmakers, and content libraries may be undertaken to license footage and associated metadata.

Targeted data collection may be used to exhaustively film the most common shots used in motion pictures in a controlled environment (e.g., one of the environments depicted in FIG. 2B-FIG. 2D, below). This may include capturing footage using different lenses, camera settings, and movement types under identical settings to isolate various visual impacts. Each shot generated during this process may be labeled with metadata, including all variable parameters, ensuring each data point is easy to retrieve and understand.

The present techniques may include performing high-resolution data collection, which may include implementing data compression and optimization techniques to manage large datasets without compromising quality. The choice between 4K, 6K, and 8K resolutions may be made based on the scene's requirements and the balance between capturing detailed data and managing storage and processing resources efficiently. Strategies for implementing selective high-resolution filming may include identifying key scenarios for high-resolution, adopting hybrid resolution filming, optimizing data storage and processing, and continuously evaluating the impact of higher resolution footage on the AI's performance.

Video formats used in the present techniques may include higher quality codecs like ProRes, XAVC, or various RAW formats, chosen for their high-quality output and compatibility with professional video production workflows. These formats offer benefits such as less compression artifacts, high resolution and frame rates, and maximum quality and flexibility in post-production. However, considerations for file size and storage, system compatibility, data transfer and streaming, and long-term storage and archiving are taken into account to ensure smooth integration and operation within the intended infrastructure. In some aspects, lower-quality codecs may be used.

Exemplary Data Collection and Simulation Environments

FIG. 2B depicts an exemplary behind-the-scenes environment 252 of a film or video production environment that may be configured to capture data to train an AI model in filmmaking techniques, according to some aspects. For example, the environment 252 includes a plurality of cameras and other devices 254 (each of which may be different) for capturing video data that will be provided to the language model operation module 242 via the network 210. The environment 252 includes a green screen background 256, which allows for the addition of various backgrounds in post-production through chroma key techniques. At the center of the image stands a FIG. 258, that represents a placeholder for human actors or objects in space, around which the devices 254 are arrayed, to capture data from multiple angles and distances. The devices 254 include multiple camera rigs, some of which are mounted on wheeled, mobile dollies 260.

These camera rigs include setups with arms and supports extending in various directions, for stability and precision in capturing footage. The cameras may be high-quality equipment with monitors attached, enabling real-time viewing of video data (i.e., viewing of data as it is captured). In some instances, inexpensive or low-fidelity camera equipment may be used. Crew members are actively involved with this equipment-some on elevated platforms actively operating the devices 254, while others are stationed on the ground level, adjusting the devices 254 or monitoring the scene.

The devices 254 may be configured to transmit capture data and metadata such as lens types, camera settings, and shot composition. These metadata may be transmitted via the network 210 to the one or more filmmaker computing systems 202 for processing (e.g., for model training). The devices 254 may be positioned at different heights and angles, to capture a plurality of different shots, including close-ups, wide angles, and mid-shots. This plurality of viewpoints provides a rich dataset that may be used to teach the AI about perspective and shot selection. The presence of cables running across the floor to each camera dolly 260 signifies the complex interconnectivity of the equipment, which may include data connectivity for transferring the captured data and metadata to secondary storage (e.g., local storage) in addition to the data transmitted via network 210. The environment 252 may include Lidar technology, which enables depth and spatial data associated with the shoot to be collected and used to train the AI models (e.g., via the lidar data integration module 226) to understand three-dimensional space within a filmmaking context. The environment 252 may be used in a training and feedback mechanism as discussed herein to enable one or more AI models to learn and adapt from synthetic and real-world filmmaking data, such as the dynamic changes in a scene, the visual impact of different camera operations, and different lighting setups. Using the environment 252, the one or more filmmaker computing systems 202 may perform data collection that can be used to develop AI-driven video production methods that understand and replicate professional film and video production techniques.

FIG. 2C depicts a simulation environment 264 for training AI in filmmaking, according to some aspects. In the center background, there is a green screen 266 with a human FIG. 268. The FIG. 268 is aligned with circles and crosshairs used as a focal point for calibration. Below the FIG. 268 is a platform where an object of for filming may stand or rest. The environment 264 may include adjustable studio lights for illumination. This lighting setup mimics that of professional filmmaking setups and enables a controlled environment where variables can be documented. An array of devices 270 are depicted as surrounding dolly tracks 272 that extends towards the platform with the FIG. 268. The devices 270 and tracks 272 enable movement and dynamic angle changes that are common in professional cinematography to be applied to the environment. The presence of multiple cameras in the devices 270 enables different angles and different lenses to capture a variety of shots. The devices 270 may include a screen displaying a user interface with various readouts and controls. The devices 270 may monitor spatial relationships, and may simulate camera settings like focal length and depth of field.

The devices 270 may include Lidar technology for capturing spatial data. The combination of traditional video data with these spatial data points may be used during training to enhance the AI's understanding of three-dimensional space, as discussed herein. The simulation environment 264 may be used for simulating different filmmaking scenarios. For example, the simulation environment 264 may enable a methodology wherein an AI model is trained using Lidar data and detailed metadata from controlled filming scenarios, enabling the AI model to replicate or innovate on professional filmmaking techniques without constant dependence on new real-world footage. With the captured data, the AI model may be taught (e.g., by the computing environment 200) to understand camera movement, shot composition, and spatial relations, aligning its outputs with professional standards.

FIG. 2D depicts a filmmaking environment 274 having a green screen 276 for separating foreground subjects from the background for compositing in post-production. In the foreground, there is a human FIG. 278 standing on a platform with a grid chart 280 behind the FIG. 278. The grid chart 280 may be used for calibration and/or for tracking motions in post-production. The human FIG. 278 may serve as a placeholder or reference object in the scene. In some aspects, the human figures depicted in FIGS. 2B-2D may be mannequins or inanimate humanoid objects.

To the right of the FIG. 278, a professional film camera 282 is mounted on a tripod, equipped with a lens and various attachments, including a follow focus for adjusting the lens and a matte box which helps to block stray light. A monitor on top of the camera 282 may display a live feed that is also shown on a screen 284 to the right, allowing camera operators and directors to see the shot in real-time (i.e., as the shot is being filmed). The screen 284 may be a video assist monitor, showing the FIG. 278 with the grid overlay 280, enabling tracking of the positioning of the FIG. 278 in the scene. The overlay on the monitor 284 depicts matching of real-world images with digital grid references, to enable realistic visual effects to be generated that match the live-action footage.

The environment 274 enables training artificial intelligence for filmmaking purposes. The green screen 276, the FIG. 278, the grid chart 280, and the professional film camera 282 are all sources of metadata that can be used for teaching AI models about spatial relationships, camera angles, movement, and other cinematic techniques. Thus, the filmmaking environment 274 enables the collection of detailed metadata across different variables such as camera settings, lens types, composition, and movement. When paired with lidar data, this setup provides the one or more filmmaker computing systems 202 with information that can be used to train the AI models to understand three-dimensional space and how that translates to a two-dimensional video image.

Specifically, by documenting and systematically altering variables in the environment 274, the metadata can be used for training of AI models in filmmaking. This includes utilizing custom AI algorithms for processing this detailed metadata to simulate camera movements and narrative coherence and to adjust lighting virtually, to generate realistic and professional-looking video content. Integration with existing video LLMs and simulation-driven learning environments (e.g., the simulation environment 264) may further enhance training efficiency and effectiveness. The filmmaking environment 274 may collect and process cinematic data to inform AI-driven video production, advantageously reducing the need for traditional filming and potentially opening up these advanced techniques to consumer-level applications.

Tracking, Staging and Physics Engines

The present techniques relate to a method and system for generating video content that simulates professional filmmaking techniques by integrating detailed metadata and Lidar data to enhance the three-dimensional understanding of space and object relationships. In some aspects, these techniques draw upon the power of advanced camera systems, precise tracking and calibration technologies, and physics engine (e.g., Unreal Engine) real-time rendering capabilities to create visually stunning environments that respond dynamically to camera movements, as depicted for example in FIG. 2D, above.

For example, in some aspects, the present techniques may be configured to utilize a combination of Arriflex, Sony, and Red camera systems to capture scenes from multiple angles, allowing for a comprehensive understanding of spatial relationships within the frame. These camera systems are chosen for their distinct chip designs and color spaces, enabling subtle differences in color grading and the blending of complementary visual elements. Precise tracking and calibration of the cameras may be achieved through the integration of geo-tagging lasers and Lidar technology. This precise data input allows the physics engine to accurately project the captured images onto an LED background, creating a cohesive environment that enhances the cinematic experience.

Staging the scene may be conducted using Lidar technology to ensure precision placement of objects within the soundstage. A diverse range of objects, including solid, reflective, dull, mirrored, and lifelike human figures, may be strategically positioned to challenge the camera's capabilities and push the boundaries of visual realism. The depth and focus of the scene may be carefully controlled by placing objects at varying distances and employing out-of-focus elements to create a sense of dimensionality. Laser-assisted tracking may be employed to track the z-axis movement of objects, enabling the physics engine to maintain seamless integration of virtual and physical elements.

The physics engine may use geolocation data from the laser systems of one or more cameras to track movements accurately. This allows for real-time projection of the captured images onto the LED background, creating an immersive virtual world. The engine may integrates lighting conditions within the soundstage, ensuring harmony between virtual and physical elements. The result is a visually stunning cinematic experience that transports the audience into a fully immersive virtual world.

Filmmaker: Lidar and Laser Tracking

The present techniques relate to an advanced system for generating video content that simulates professional filmmaking techniques, utilizing detailed metadata and integrating Lidar data to enhance the three-dimensional understanding of space and object relationships. This system is designed to significantly improve the realism and quality of generated video content by leveraging the precision of Lidar technology and the rich detail provided by comprehensive metadata related to filmmaking techniques.

In some aspects, Lidar may be used to enable precise 3D positioning of objects within a soundstage. This precision advantageously ensures accurate integration of physical elements into the virtual environment, enhancing the realism of the cinematic experience. Further, laser tracking, achieved through invisible laser pointers mounted on cameras, tracks the z-axis movement of objects. This tracking allows the physics engine to maintain seamless alignment between physical and virtual elements, thereby preserving the integrity of the visual experience.

The present techniques may include depth perception strategies where the strategic placement of foreground, background, and out-of-focus objects creates a sense of depth and dimensionality. This approach significantly enhances the overall realism and immersion of the cinematic experience. Additionally, multi-camera synchronization may be achieved through the simultaneous use of three different camera systems, each with distinct color spaces. This synchronization allows for a more nuanced and compelling visual representation.

Integration of Lidar technology with traditional camera recording is exemplified through setups used in film production, particularly for complex visual effects sequences requiring precise depth mapping. Examples include ARRI and Lidar technology integration, RED cameras with third-party Lidar systems, Blackmagic Design with third-party Lidar, custom rigged systems, and consumer-level applications such as smartphones and cameras equipped with Lidar scanners. These integrated systems are used in the film industry to ensure that visual effects are as realistic as possible, aiding in the creation of accurate 3D models and environments.

Timecode synchronization across different types of recording devices, including Lidar, may also be performed, to enhance the precision and efficiency of production workflows. This synchronization is achieved through timecode integration, system setup, jam sync, continuous synchronization, and post-production alignment. These steps ensure that every frame scanned by the Lidar is tagged with the same timecode as the frames captured by the video cameras, enabling accurate and realistic VFX compositions.

The Lidar-based techniques herein may be performed by the computing environment 200. Specifically, the metadata processing module 222, the video content generation module 224, the lidar data integration module 226, and the dynamic scene adjustment module 228 of the modules 220 may work in concert to process metadata, generate video content that simulates professional filmmaking techniques, integrate Lidar data for enhanced 3D understanding, and adjust generated content based on dynamic scene changes and key filmmaking variables.

Exemplary Cameras

As discussed, the present techniques relate to the field of artificial intelligence (AI) in video production, specifically to systems and methods for training one or more AI models to understand and replicate professional filmmaking techniques using a comprehensive set of variables. These variables encompass a wide range of cinematographic attributes, including but not limited to camera specifications, movement, cinematic context, and metadata related to filmmaking techniques.

The invention aims to bridge the gap identified in prior art systems, such as the one depicted in FIG. 1, where there is a significant disconnect between user input related to cinematographic attributes and the generated visual content. Unlike these systems, the present invention incorporates a detailed dataset and training regimen that covers essential aspects of filmmaking, thereby enabling the AI model to produce video content that closely aligns with professional standards, as outlined in the method depicted in FIG. 2A.

As discussed, the computing environment 200 enables generating video content that simulates professional filmmaking techniques, thereby addressing limitations of prior art systems. The present techniques may include providing a structured approach to training AI models on a large set of filmmaking variables. This approach ensures that the AI model can interpret and utilize detailed metadata related to camera settings, shot composition, and lighting setups, thereby producing video content that adheres to professional filmmaking standards.

For example, a number of variables may be used to train the present models, including (1) focal length, (2) aperture (f-stop), (3) shutter speed/shutter angle, (4) ISO sensitivity, (5) sensor size, (6) focus, (7) color temperature and white balance and (8) resolution and bit depth.

Focal length impacts the perception of depth and space in an image. Thus, training the AI model may involve exposing the model to training data filmed at various focal lengths (e.g., 27 mm, 35 mm, 50 mm, 85 mm, and 100 mm) to enable the model to learn the influence of focal length on the angle of view and magnification. Aperture, or f-stop, and depth of field (DoF) affect the exposure and overall sharpness of the image. Thus, these values may be used as training data for the present AI models. Shutter speed and shutter angle control motion blur and exposure in the generated content. ISO sensitivity generally involves a trade-off between light and noise; for example, a higher ISO may allow shooting in lower light conditions at the expense of increased noise. Sensor size training covers the effects of sensor size on field of view, depth of field, and image quality, with a focus on full-frame sensors and comparisons with Super 35 sensors. Regarding focus, the AI model may be trained on selective focus techniques and their creative applications in directing viewer attention and enhancing depth perception. The present techniques may include training AI models on color temperature and white balance adjustments, ensuring the AI model can produce images with natural-looking colors. Finally, the present techniques may include training the AI model on resolution and bit depth to achieve high-quality production and post-production flexibility.

In addition to the primary cameras used for capturing the scene from various angles, the system may integrates Lidar devices affixed to each camera. These devices provide augmented, complex dimensional metadata, enriching the dataset with precise spatial information. This integration may be facilitated by lidar data integration module 226, for example, which includes instructions for Lidar data capture and integration.

Security-type cameras may also deployed around the set to capture the overall setup and interactions of the primary cameras with the scene, in some aspects. This additional context is valuable for later stages of AI training, where understanding the physical dynamics of filmmaking becomes crucial. The metadata processing module 222 may include instructions for handling capture and integration of this contextual data.

Exemplary Computer-Implemented Video Content Generation Method

FIG. 3 depicts a computer-implemented method 300 for generating video content that simulates professional filmmaking techniques by processing metadata related to filmmaking and integrating Lidar data, according to some aspects. The method 300 aims to imbue AI models with a nuanced understanding of filmmaking, leveraging detailed metadata and Lidar data to produce video content that adheres to professional standards. The method 300 is designed to address the challenges existing foundation models face in generating video content that accurately reflects the complexity of professional filmmaking. For example, the method 300 may be performed by the one or more filmmaker computing systems 202 of the computing environment 200.

The method 300 may include receiving metadata related to filmmaking techniques, including camera settings, shot composition, and lighting setups (block 302). This step may include collecting detailed metadata that describes various aspects of professional filmmaking. The metadata may serve as a foundational dataset for training AI models, providing them with the necessary information to understand and replicate professional filmmaking techniques. This metadata may include specifics about lens types, camera settings such as focal length and depth of field, and the composition of shots, which are captured and documented during controlled filming environments.

The method 300 may include processing the received metadata to generate video content that simulates professional filmmaking techniques (block 304). In this step, custom AI algorithms process the collected metadata to generate video content. These algorithms are specifically designed to interpret the detailed metadata, enabling the AI to replicate or innovate on professional filmmaking techniques in its generated content. The processing involves understanding the technical aspects of filmmaking and camera operation, as outlined in the training variables provided during the AI model's training phase.

The method 300 may include integrating Lidar data with the processed metadata to enhance the generated video content with a three-dimensional understanding of space and object relationships (block 306). The integration of Lidar data provides the AI with a richer understanding of three-dimensional space and the relationships between objects within it. This step may include accurately simulating professional camera techniques and enhancing the realism and quality of the generated video content. By correlating two-dimensional video data with three-dimensional spatial data, the AI advantageously learns to accurately simulate professional camera movements and techniques, thereby improving the overall quality and realism of the generated video content.

The method 300 may include adjusting the generated video content based on dynamic scene changes documented in the metadata (block 308). This step may include dynamically adjusting the generated video content to reflect changes in the scene, as documented in the metadata. This may be cause video content to remain consistent with the evolving nature of the scene, adapting to changes in camera settings, shot composition, and lighting setups. This capability may enable maintaining narrative coherence and ensuring that the generated video content accurately reflects the intended filmmaking techniques.

The method 300 may include systematically altering key filmmaking variables in the metadata to simulate the impact of each element on the final video output (block 310). This step may include automatically training the AI models with different filmmaking variables to understand their impact on the final video output. By systematically altering variables such as camera settings, shot composition, and lighting setups, the AI models learn how each element contributes to the overall quality and style of the video content. This process enables the trained AI models to generate video content that adheres to professional filmmaking standards.

The method 300 may include simulating camera movements within the generated video content based on the processed metadata (block 312). This step may include simulating professional camera movements within the generated video content. By leveraging detailed metadata and Lidar data, the trained AI models can simulate various camera movements, such as pans, tilts, and dolly shots, enhancing the dynamic nature of the video content. This capability is advantageous for replicating the visual storytelling techniques used in professional filmmaking.

The method 300 may include adjusting lighting within the generated video content in post-production based on the processed metadata (block 314). In this step, the AI model may adjust lighting within the generated video content during post-production, based on the processed metadata. This capability allows the trained AI models to fine-tune the lighting conditions to match the intended mood and atmosphere of the scene, replicating professional lighting techniques used in filmmaking. By adjusting lighting in post-production, the AI can enhance the visual appeal and emotional impact of the generated video content.

The method 300 may include determining narrative coherence across generated scenes based on the processed metadata (block 316). This step involves ensuring that the generated video content maintains narrative coherence across different scenes. By processing the detailed metadata, the AI can understand the narrative structure of the video content and ensure that each scene contributes cohesively to the overall story. This capability is advantageous for creating video content that engages the audience and effectively communicates the intended message.

The method 300 may include interfacing with existing large language models for video processing to enhance the generated video content with advanced filmmaking capabilities (block 318). In this step, the trained AI models may interface with existing language models for video processing, enhancing the generated video content with advanced filmmaking capabilities. Through specialized interface protocols, the AI can leverage the strengths of LMs to produce content that adheres to professional filmmaking standards. These techniques may include transfer learning and/or fine-tuning of existing models (e.g., to incorporate the detailed metadata and Lidar data, enabling the AI to generate video content that reflects the complexity and nuance of professional filmmaking).

Exemplary Computer-Implemented Synthetic Data Creation

In some aspects, the present techniques may include generating synthetic data for training. In general, this process may include capturing and utilize detailed filmmaking metadata to train a larger LLM. Specifically, generating synthetic data may include project planning and management, data collection setup, metadata encoding and weighting system design, metadata and data management, precise generation based on detailed prompts, integrative training with one or more Filmmaker AI model, AI model development and training, quality control and iteration, and implementation and scaling. These steps are designed to ensure the collection of high-quality data that is rich in filmmaking metadata, thereby enabling the AI to learn and replicate professional filmmaking techniques.

FIG. 4 depicts a computer-implemented method 400 for generating synthetic data and/or using synthetic data to train a machine learning model, according to some aspects. The method 400 may be performed by the one or more filmmaker computing systems 202 of FIG. 2A, for example.

The method 400 may include generating an exhaustive list of all tasks and shots required, including lens type, camera settings, and shot types (block 402). This step may be performed by the filmmaking variable simulation module 230, in some aspects.

The method 400 may include configuring a studio with controlled lighting and equipping cameras with locators for precise spatial mapping (block 404). This step may be executed by the metadata processing module 222, in some aspects, and may include receiving data from both hardware (cameras, sensors) and software components for environment control and data capture, for example, as discussed above with respect to FIG. 2B-FIG. 2D.

The method 400 may include performing metadata encoding and weighting, in some aspects. For example, the method 400 may encode each piece of metadata into a format that the AI model (e.g., an LM, an LLM, etc.) can process and generating weights corresponding to importance of each type of metadata (block 406). This weighting may be managed by the metadata processing module 222, which includes software instructions and algorithms for encoding and weighting.

The method 400 may include metadata and data management, in some aspects. For example, the method 400 may include embedding video files with metadata and establishing a data management system for organizing video and sensor data (block 408). This step may include both the metadata management and data storage systems within the software architecture, including storing the video files on the one or more electronic databases 218, for example.

The method 400 may include causing a user interface to be displayed, wherein the user interface accepts prompts specifying video characteristics and using metadata-driven weights to influence the generation process (block 410). This function may be performed by the prompt processing module 244 in conjunction with the UI 216, which may interpret user inputs and generate synthetic data accordingly.

The method 400 may include performing integrative training with the Filmmaker AI models. For example, the method 400 may include integrating encoded metadata into training datasets for the AI models and implementing specialized artificial neural network layers for metadata interpretation (block 412). This integration, au be performed by the language model training module 240 and language model operation module 242 of one or more filmmaker computing systems 202, and may include incorporating synthetic data into the learning process.

The method 400 may include AI model development and training. For example, the method 400 may include feeding collected data into the foundational model and using AI training techniques (block 414). This step may be executed by the language model training module 240, focusing on model training and optimization.

The method 400 may include quality control and Iteration. For example, the method 400 may include continuously (e.g., hourly, daily, or more or less frequently) reviewing generated video against professional standards and adjusting training parameters based on output quality (block 416). This process may be managed by a quality control module in FIG. 2A (not depicted), which assesses generated content and provides feedback for improvement.

The method 400 may include implementation and scaling. For example, the method 400 may include deploying the model in test environments and evaluating its scalability for broader filmmaking applications (block 418). This step may be performed by the language model operation module 242, in some aspects, and may focus on real-world application and expansion of the technology. This step may include collecting structured feedback from users.

Exemplary Foundation Model Training

Figure 5:
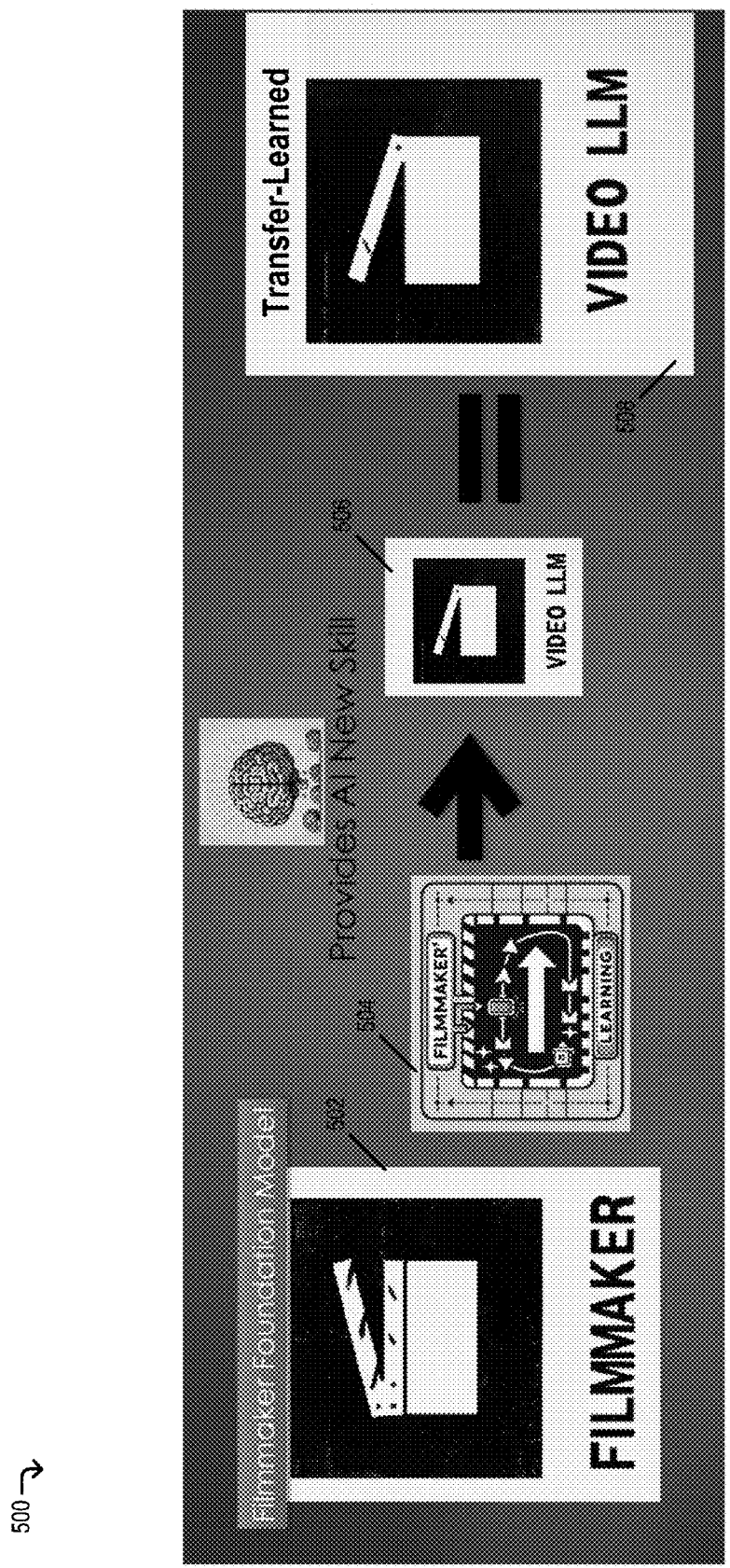
FIG. 5 depicts a block flow diagram for training a foundation model, according to some aspects.

FIG. 5 depicts a computer-implemented method 500 for training a foundation model, according to some aspects.

The method 500 may include introducing new tokens and dataset specifically for camera settings, shooting techniques, and spatial configurations (block 502). This step may be performed by the metadata processing module 222 of FIG. 2A, which processes and encodes technical metadata related to filmmaking into a format that can be understood by the foundation model.

The method 500 may include integrating physics-based rendering tokens to enable the model to understand and generate visuals adhering to real-world physics (block 504). This integration may be performed by the language model training module 240 of FIG. 2A, which may include instructions for integrating geographic and physical properties into the training data.

The method 500 may include focusing the dataset on a set number of commonly used shots and moves in filmmaking (block 506). The dynamic scene adjustment module 228 may curate and refine the dataset to include only those elements that are essential for understanding fundamental cinematic techniques.

The method 500 may include generating a control image to help the AI recognize the effect of each incremental change (block 508). This function may be performed by the language model training module 240 of FIG. 2A, in some aspects, which may include instructions for systematically varying cinematic parameters under controlled conditions.

The method 500 may include training a plurality of attention mechanisms within a transformer machine learning model that prioritize and weigh technical tokens more heavily when generating video content (block 510). The language model training module 240 of FIG. 2A may modify the architecture of one or more AI model to enhance its focus on technical filmmaking aspects.

The method 500 represents a structured approach to training a foundation model, focusing on the nuances of professional filmmaking. By systematically incorporating detailed technical metadata and controlled variability into the training process, the model is advantageously equipped to generate content that aligns closely with professional standards.

Instead of relying on scraped internet data, the present techniques may use professionally-created content shot under controlled conditions to ensure consistency and accuracy in data. This approach may be preferable as it provides a cleaner, more reliable dataset for training. The controlled environment allows for the systematic variation of cinematic parameters, such as camera angles and motion, under consistent lighting and spatial conditions. This method helps the model to learn the precise impact of each variable on the visual outcome, leading to more accurate and realistic video generation capabilities. The use of professionally created content also advantageously mitigates the risk of incorporating inaccurate or inappropriate data into the training set, further enhancing the model's reliability and effectiveness.

By focusing on the detailed aspects of filmmaking, including camera settings, movement, and cinematic context, AI models are trained using the present techniques to understand and replicate the intricacies of professional video content. This training may include the use of a controlled dataset that documents technical filmmaking variables, enriched with lidar data to provide a three-dimensional understanding of space. The development of a user interface that allows for the specification of video characteristics using the same metadata language ensures that users can generate content that adheres to professional standards, potentially revolutionizing the filmmaking process by reducing production costs and making high-quality filmmaking more accessible.

Exemplary Computer-Implemented Transfer Learning Environment

As noted, transfer learning may be used to enhance the capabilities of the present Filmmaker AI models. For example, by leveraging the detailed metadata and cinematic techniques introduced by the Filmmaker AI models, existing large language models (LLMs) can be re-trained to understand and generate content that closely aligns with specific cinematic prompts. This process may include integrating knowledge from the foundational model into the larger LLM, enabling the LLM to interpret complex prompts that use professional filmmaking jargon and translate these into specific video generation tasks. For example, a conventional AI system such as the one depicted in FIG. 1 may be improved via transfer learning, to be able to take into account the instructions included in the prompt that it previously ignored. The use of transfer learning techniques allows for the generalization of learned cinematic techniques to broader applications within the LLM, significantly enhancing its video understanding and generation capabilities. This strategic approach ensures that the outputs of the LLM are not only technically competent but also creatively fulfilling, meeting the precise needs of professional filmmakers.

Transfer Learning: Teaching Cinema to AI

FIG. 5 illustrates an environment 500 for enhancing an existing large language model (LLM) with advanced filmmaking capabilities through transfer learning. This system comprises four primary components: a filmmaker foundation model (block 502), a filmmaker transfer learning process (block 504), a video LLM (block 506), and a transfer-learned model (block 508). The environment can be used to imbue a LM (e.g., an LLM) with a nuanced understanding of filmmaking techniques, thereby enabling the generation of video content that adheres to professional filmmaking standards.

At block 502, one or more Filmmaker foundation model is trained on a dataset that includes detailed metadata about filmmaking techniques, such as camera settings (e.g., focal length, depth of field), shot composition, lighting setups, and dynamic scene changes. This model also incorporates data from controlled filming environments and integrates Lidar data to enhance its understanding of three-dimensional space and object relationships. The foundation model is designed to grasp the intricacies of filmmaking vocabulary and technology, addressing the existing gap in AI models' understanding of generating video content with specific cinematographic attributes. Block 502 may be performed by the language model training module 240 of FIG. 2A and/or the metadata processing module 222 and lidar data integration module 226 of FIG. 2A, for example.

At block 504, a Filmmaker model transfer learning process may perform transfer learning, wherein the knowledge acquired by the Filmmaker foundation model is integrated into another model (e.g., a larger, pre-existing video LLM, a smaller open source model, etc.). The transfer learning process at block 504 may utilize output examples and metadata from the foundation model to train the other model, enabling it to recognize and replicate filmmaking techniques when provided with appropriate prompts. This process does not necessitate the creation of a new library of training data, as the other model may re-learns to interpret its existing training library in the context of filmmaking.

At block 506, the video model may be an existing large language model, such as OpenAI SORA or a Google AI model, which has been primarily designed for processing and generating video content. Prior to the transfer learning process, these models lack the capability to accurately interpret and implement cinematographic details in their outputs, as exemplified in FIG. 1. The video LLM serves as the base model that is enhanced through transfer learning to acquire the advanced filmmaking capabilities developed in the filmmaker foundation model.

At block 508, the outcome of the transfer learning process is a transfer-learned model that combines the general video processing capabilities of the video LLM with the specialized filmmaking knowledge of the filmmaker foundation model. This enhanced model is capable of generating video content that not only meets the technical requirements of professional filmmaking but also adheres to the creative and artistic standards of the industry. The transfer-learned model can be used to provide professional video production services to studios and has the potential for both B2B and B2C applications, including the development of user interfaces that allow clients to specify video characteristics using the filmmaking metadata language, such as the UI 216 discussed in FIG. 2A.

In summary, FIG. 5 demonstrates a system for enhancing an existing video LLM with advanced filmmaking capabilities through a structured transfer learning process. By integrating detailed metadata and leveraging both synthetic and real-world filmmaking data, this system enables the creation of AI-generated video content that closely aligns with professional filmmaking standards.

Exemplary Computer-Implemented Single-Parameter Variation Method

Figure 6:
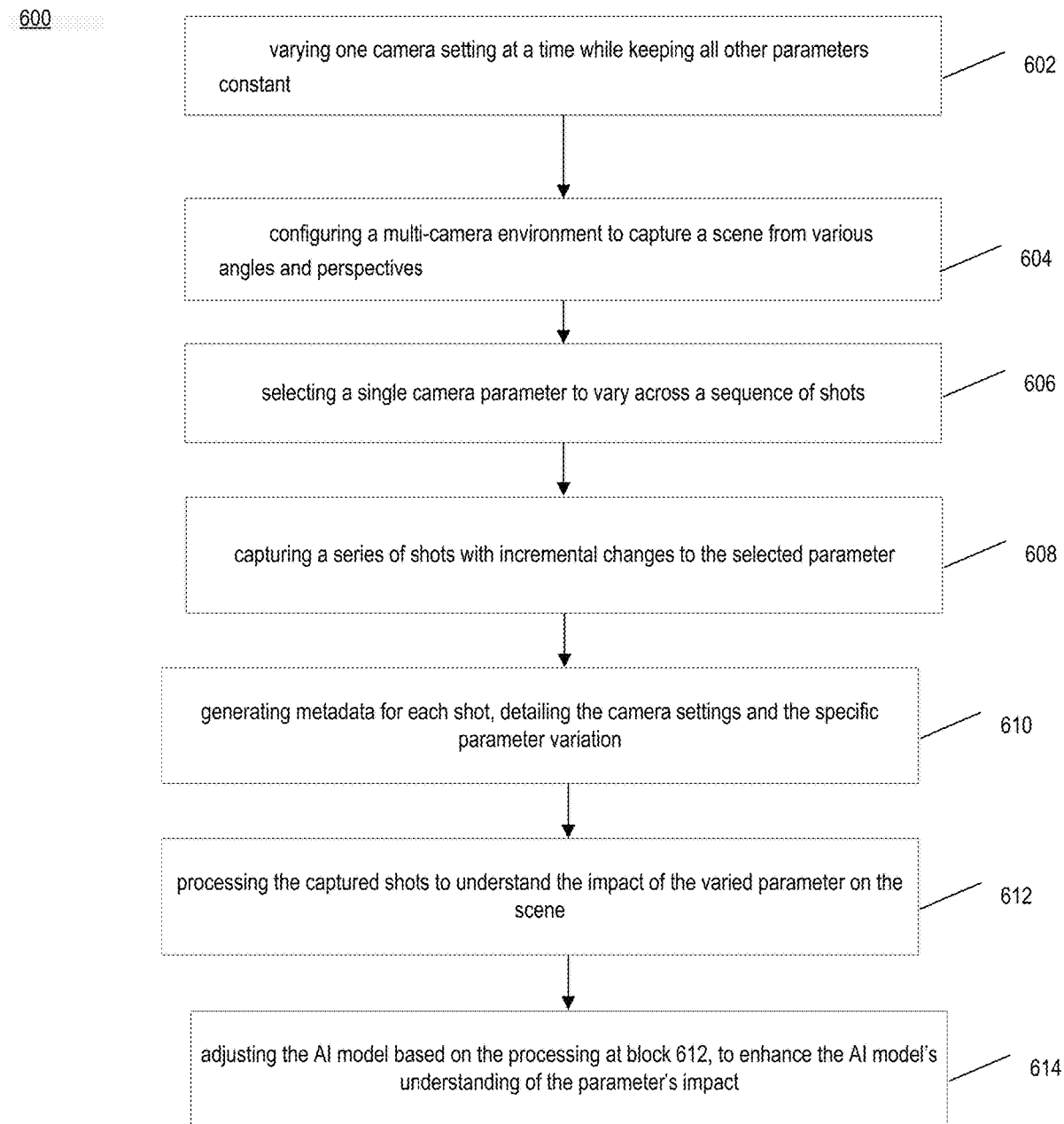
FIG. 6 depicts a computer-implemented method for performing single-parameter variation, according to some aspects.

FIG. 6 depicts a computer-implemented method 600 for performing single-parameter variation, according to some aspects. This method may include systematically varying one camera setting at a time while keeping all other parameters constant, thereby enabling an AI to understand the impact of each setting in isolation. The method 600 may be performed by the one or more filmmaker computing systems 202 of FIG. 2A, for example.

The method 600 may include configuring a multi-camera environment to capture a scene from various angles and perspectives, ensuring comprehensive coverage and data diversity (block 602). This step may be performed by the metadata processing module 222 of FIG. 2A, for example.

The method 600 may include selecting a single camera parameter to vary across a sequence of shots (block 604). The dynamic scene adjustment module 228 may perform this function, in some aspects. Shot examples are discussed in the next section, below.

The method 600 may include maintaining all other camera parameters constant to isolate the effects of the varied parameter (block 606). This may also be managed by the dynamic scene adjustment module 228, ensuring that only the selected parameter is varied.

The method 600 may include capturing a series of shots with incremental changes to the selected parameter (block 608). This may be performed by the metadata processing module 222 of FIG. 2A, in some aspects, which includes instructions for data capture and storage, including for capturing and storing each shot in a shot sequence.

The method 600 may include generating metadata for each shot, detailing the camera settings and the specific parameter variation (block 610). This step is executed by the metadata processing module 222, which includes instructions for handling metadata generation and association with the captured data.

The method 600 may include processing the captured shots to understand the impact of the varied parameter on the scene (block 612). The language model training module 240 may include instructions for data analysis and learning, utilizing the generated metadata to correlate changes in the parameter with changes in the captured shots.

The method 600 may include adjusting the AI model based on the processing at block 612, to enhance the AI model's understanding of the parameter's impact (block 614). This adjustment may be performed by the language model training module 240, which includes instructions for AI model training and refinement.

Exemplary Shot Scripts

The present techniques may include capturing datasets in a controlled environments, such as those depicted in FIG. 2B-FIG. 2D, with documentation of variables such as lens types, camera settings, and shot composition. As noted, in addition to traditional video data, Lidar data may be used to enhance the AI model's understanding of three-dimensional space and the relationships between objects within that space. To facilitate this training, one or more detailed shooting script may be employed, outlining the logistics and technical specifications required for each scene or shot. These scripts may include variations for AI training, focusing on typical filmmaking techniques and scenarios. Each scene may be crafted to provide diverse data, from lighting and lens settings to actor positioning and camera movement. This approach advantageously enables the AI models to learn to handle various cinematic techniques and styles effectively.

Example shot scripts are shown below:
Example Shooting Script for AI Model Training
Project Title: AI Cinematography Training Series
Date: [Insert Date]
Location: Controlled Soundstage
Director: [Name]
Director of Photography: [Name]
AI Technical Advisor: [Name]
Script Supervisor: [Name]
- - -
Scene 1: Static Close-Up
  Objective: Train AI on static close-up shots using 85 mm lens.
  Description: Close-up of an actor's face, expressing a range of emotions from sadness to joy.
  Lens/Focal Length: 85 mm
  Camera Settings: ISO 800, f/2.8, 24 fps
  Lighting Setup: Soft key light left, fill light right, back light behind actor.
  Props/Background: Minimalist background to avoid distraction.
  Actor Instructions: Begin with a somber expression, slowly transitioning to a smile.
  Special Instructions: Record each expression change at every aperture setting from f/1.4 to f/16 to capture depth of field variations.
- - -
Scene 2: Dolly Shot
  Objective: Demonstrate camera movement's effect using a dolly.
  Description: Dolly in from a medium shot to a close-up of an object on a table.
  Lens/Focal Length: 50 mm
  Camera Settings: ISO 400, f/4, 24 fps
  Lighting Setup: High contrast to emphasize texture and detail.
  Props/Background: A book on a table with a lamp beside it.
  Dolly Track Setup: Set up a track from 6 feet away to 2 feet from the object.
  Special Instructions: Execute the shot at various speeds; normal, fast, and slow.
- - -
Scene 3: Over the Shoulder Shot
  Objective: Train AI on framing and focus depth for over-the-shoulder shots.
  Description: Over-the-shoulder shot of an actor looking at a computer screen.
  Lens/Focal Length: 35 mm
  Camera Settings: ISO 800, f/2, 24 fps
  Lighting Setup: Ambient office lighting with practical desk lamp.
  Props/Background: Office setup with computer monitor displaying graphs.
  Actor Instructions: Actor A (foreground) typing, Actor B (background) discussing points on the screen.
  Special Instructions: Include variations where Actor A is in focus versus Actor B is in focus, plus a version with both in soft focus.
- - -
Scene 4: Handheld Dynamic Shot
  Objective: Capture the effect of handheld camera movement.
  Description: Handheld shot following an actor walking through a busy cafe.
  Lens/Focal Length: 24 mm to 75 mm range
  Camera Settings: ISO 1600, f/4, 24 fps
  Lighting Setup: Natural light augmented with bounce from windows.
  Props/Background: Cafe interior with patrons.
  Movement Instructions: Follow the actor from entrance to table, weaving slightly to mimic natural movement.
  Special Instructions: Perform multiple takes with varying degrees of handheld stability to simulate different levels of action intensity.
- - -
Notes and Metadata Collection
  Metadata to Record: For each take, record exact lens settings, camera position (XYZ coordinates), and lighting levels, along with LiDAR data and any notable environmental variables.
  Post-Shoot Review: Each day's footage to be reviewed for completeness and quality. Adjustments to be made as per feedback.
- - -

The above shooting script is designed to capture a comprehensive dataset for AI training, with specific focus on typical filmmaking techniques and scenarios. Each scene is carefully crafted to provide diverse data, from lighting and lens settings to actor positioning and camera movement. This approach ensures that the AI model learns to handle various cinematic techniques and styles effectively. In some aspects, the approach may be categorized by each lens a camera is using, and this categorization used as a reliable shorthand for training an AI model trained using the present techniques. Specifically, this categorization may be used to provide a hint to the AI regarding frame size and focal length, which are the two important aspects in creating an image. The present techniques may include a tool, once the setting for sensor size has been entered (for which there are a few basic variants, Spherical Full Frame, Spherical Super 35, Anamorphic, Spherical 16 mm, Spherical 8 mm) for choosing between 15 focal length lenses (14, 21, 24, 27, 35, 40, 50, 65, 75, 85, 100, 135, 150, 185, 200, 235).

A further sample shooting script for an 85 mm lens is detailed below.

Example Shooting Script for AI Model Training
Project Title: AI Cinematography Training Series
Date: [Insert Date]
Location: Controlled Soundstage
Director: [Name]
Director of Photography: [Name]
AI Technical Advisor: [Name]
Script Supervisor: [Name]
- - -

Scene 1: Static Close-Up
  Objective: Train AI on static close-up shots using 85 mm lens.
  Description: "Close-Up"
  Lens/Focal Length: 85 mm
  Camera Settings: ISO 800, f/2.8, 24 fps
  Lighting Setup: Soft key light left, fill light right, back light behind actor.
  Props/Background: Minimalist background to avoid distraction.
  Objects in frame—human model in focus foreground, same others tagged BG.
  Special Instructions: change at every aperture setting from f/1.4 to f/16 to capture depth of field variations.
- - -
Scene 2: Dolly Shot
  Objective: Demonstrate camera movement's effect using a dolly.
  Description: Dolly in from a medium shot to a close-up of an object on a table.
  Lens/Focal Length: 50 mm
  Camera Settings: ISO 400, f/4, 24 fps
  Lighting Setup: High contrast to emphasize texture and detail.
  Props/Background: Multiple objects of different reflective qualities
  Dolly Track Setup: Set up a track from 6 feet away to 2 feet from the object.
  Special Instructions: Execute the shot at various speeds; normal, fast, and slow.
- - -
Scene 3: Over the Shoulder Shot
  Objective: Train AI on framing and focus depth for over-the-shoulder shots.
  Description: Over-the-shoulder shot of an actor looking at a computer screen.
  Lens/Focal Length: 35 mm
  Camera Settings: ISO 800, f/2, 24 fps
  Lighting Setup: Ambient office lighting with practical desk lamp.
  Props/Background: Office setup with computer monitor displaying graphs.
  Actor Instructions: Actor A (foreground) typing, Actor B (background) discussing points on the screen.
  Special Instructions: Include variations where Actor A is in focus versus Actor B is in focus, plus a version with both in soft focus.
- - -
Scene 4: Handheld Dynamic Shot
  Objective: Capture the effect of handheld camera movement.
  Description: Handheld shot following an actor walking through a busy cafe.
  Lens/Focal Length: 24 mm to 75 mm range
  Camera Settings: ISO 1600, f/4, 24 fps
  Lighting Setup: Natural light augmented with bounce from windows.
  Props/Background: Cafe interior with patrons.
  Movement Instructions: Follow the actor from entrance to table, weaving slightly to mimic natural movement.
  Special Instructions: Perform multiple takes with varying degrees of handheld stability to simulate different levels of action intensity.
- - -
Notes and Metadata Collection
  Metadata to Record: For each take, record exact lens settings, camera position (XYZ coordinates), and lighting levels, along with LiDAR data and any notable environmental variables.
  Post-Shoot Review: Each day's footage to be reviewed for completeness and quality. Adjustments to be made as per feedback.
- - -

The above 85-mm shooting script is designed to capture a comprehensive dataset for AI training, with specific focus on typical filmmaking techniques and scenarios. Each scene is carefully crafted to provide diverse data, from lighting and lens settings to object/model positioning and camera movement. This approach ensures that the AI model learns to handle various cinematic techniques and styles effectively.

To give a more specific idea of the work entailed in the creation of the Filmmaker model, the work would be broken down even further. A more specific script may including instructions for each lens on each camera, for example an 85 mm lens, quite commonly used for close ups, may be as follows:

85 mm shot list
1. Static Close-Up Shots
  Subject Focus: Close up Model/Clean
  Settings Variations: Shoot at every aperture available on the lens (e.g., from f/1.4 to f/16) to document the depth of field changes.
  Lighting Conditions:
    Luminance level/neutral/no shadow/color temp
    Studio lighting with a three-point setup (key light, fill light, back light).
    Low light condition to check noise levels and focus accuracy.
2. Close-Up with Emotional Variations
  Subject: Actor delivering a monologue with varying emotions.
  Objective: Capture the impact of facial expressions and subtle movements on depth perception and emotional conveyance with the 85 mm lens.
  Instructions: Record the scene multiple times, adjusting the lighting to emphasize different moods.
3. Close-Up on Textured Objects
  Subject: Objects with detailed textures (e.g., a weathered book, intricate fabric, or a detailed sculpture).
  Objective: Illustrate how the 85 mm lens can capture texture and detail in close-up.
  Lighting: Side lighting to enhance texture visibility.
4. Close-Up with Movement
  Subject: Hands performing tasks such as typing, drawing, or playing a musical instrument.
  Objective: Show how the 85 mm lens handles slight movements within a confined frame.
  Movement Type: Minimal to moderate to maintain focus while showing the effect of movement blur at different apertures.
5. Rack Focus Close-Up
  Subject: Two objects or subjects at slightly different distances within the scene.
  Objective: Practice rack focusing to shift attention between foreground and background, showcasing the bokeh and depth of field capabilities of the 85 mm lens.
  Instructions: Start focus on the nearer object, then smoothly transition to the farther object.

6. Close-Up with Varied Backgrounds
   Subject: Same object or face shot against different backgrounds (e.g., a plain wall, a busy street, a park).
   Objective: Explore how background complexity affects the perception of the subject with the 85 mm lens.
   Background Considerations: Include both simple and complex backgrounds to demonstrate how the lens isolates subjects.
7. Low Light Close-Up
   Subject: Faces or objects under low ambient lighting.
   Objective: Test the lens's performance in low light, focusing on noise, focus accuracy, and how lens aperture affects light intake and depth of field.
   Lighting Setup: Minimal lighting, potentially using only a single soft light source.
8. High-Speed Close-Up (if applicable)
   Subject: Fast-moving subjects at close range, like a popping balloon or a shaking wet dog.
   Objective: Capture the sharpness and clarity of quick movements when shot with an 85 mm lens.
   Settings: High shutter speed to freeze motion, with adequate lighting to compensate.
9. Outdoor Close-Up
   Subject: Natural elements like flowers, insects, or water droplets.
   Objective: Utilize natural light and outdoor settings to capture vibrant, real-world colors and fine details.
   Time of Day: Early morning or late afternoon for optimal natural lighting.

The above shot script examples are designed to challenge and explore the capabilities of an 85 mm lens in close-up scenarios, providing a rich dataset for AI training. The variety among the above scripts ensures that the AI learns to handle different aspects of close-up cinematography, from technical settings adjustments to artistic expression and narrative depth. In some aspects, the above scripts may be performed manually by film technicians. In some aspects, the above scripts may be computer-readable scripts that are performed by an automated filming environment, to generate AI model training data without human intervention.

Exemplary Computer-Implemented Method for Generating Film Looks and Post-Process Emulation The system's approach to training the AI model involves documentation of variables such as lens types, camera settings, and shot composition. This process is supported by the integration of Lidar data, providing a rich, three-dimensional understanding of space. The development of a user interface allows clients to specify video characteristics using the same metadata language the AI was trained on, facilitating the generation of professional-quality video content without actual filming. In some aspects, the present techniques may enable users to apply professional filmmaking techniques to their videos, possibly in collaboration with filmmakers to replicate unique styles.

Figure 7:
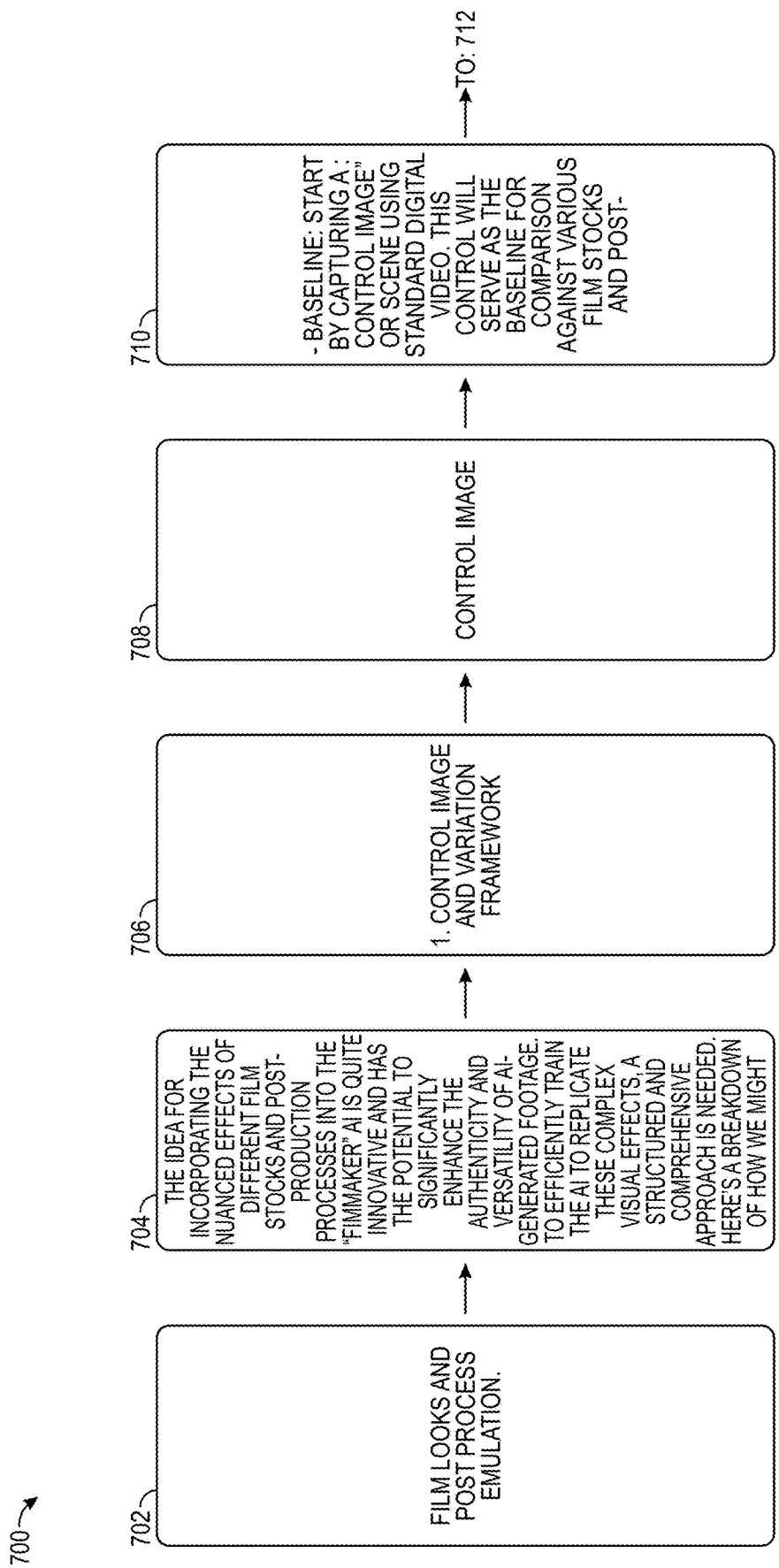
FIG. 7 depicts a computer-implemented method for generating video having a predetermined style, according to some aspects.

FIG. 7 depicts a computer-implemented method 700 for generating video having a predetermined style, according to some aspects. The method 700 may enhance the authenticity and versatility of AI-generated footage by incorporating the nuanced effects of different film stocks and post-production processes. The method 700 is designed to efficiently train one or more Filmmaker AI models to replicate complex visual effects, thereby significantly improving the quality and realism of AI-generated video content.

The method 700 may include capturing a control image or scene using standard digital video as a baseline for comparison against various film stocks and post-production alterations (blocks 702-710). These steps advantageously establishes a reference point from which the AI can learn the specific visual signatures associated with each film stock and processing technique. The control image serves as the foundation for the training dataset construction, enabling the AI to recognize and replicate the unique characteristics imparted by different film formats and stocks.

The method 700 may include capturing the same scenes using different film formats such as 35 mm, 16 mm, 8 mm, and Super 8 mm, each imparting unique grain, color saturation, and contrast characteristics (blocks 712-716). These steps may include documenting the visual effects of diverse film stocks renowned for their distinctive looks, such as Kodak Portra and Ilford Delta. By training the AI with footage captured in multiple formats and film stocks, the system gains a comprehensive understanding of how these elements affect images across different compositions and lighting conditions.

The method 700 may include applying post-production alterations like push processing and bleach bypass to the captured footage to observe their impact on color and contrast (blocks 720-724). This step allows the AI to learn the visual effects of various film processing techniques, further enhancing its ability to replicate professional filmmaking techniques in AI-generated video content. The method 700 may include constructing a training dataset that includes a variety of shots (tight face shots, medium shots, wide shots) captured under varied lighting conditions. This dataset provides the AI with a broad spectrum of examples, enabling it to learn how film stocks and processes affect images in different scenarios. The inclusion of varied lighting conditions ensures that the AI can accurately replicate these effects under diverse environmental settings. The method 700 may include training the AI with paired comparisons (control vs. modified footage) to enable it to learn the specific visual signatures associated with each film stock and processing technique. This step teaches the AI to recognize and apply the nuanced effects of different film stocks and post-production processes to new footage, thereby improving the authenticity and versatility of AI-generated video content. The method 700 may include reviewing the AI-generated footage to assess its authenticity and adherence to expected filmic qualities and using feedback to refine the model. This iterative process of testing and refinement ensures that the AI model improves over time, aligning more closely with professional filmmaking standards and practices. The method 700 may include optimizing learning cycles to enhance the efficiency of the training process, focusing on areas needing improvement based on professional feedback. This step involves scaling down data acquisition as the AI shows proficiency in applying learned effects, thereby maintaining an efficient and effective training process.

The method 700 may be performed by various modules within the one or more filmmaker computing systems 202 of FIG. 2A, for example. For instance, the capturing of control images and scenes (block 702) can be facilitated by a module designed for initial data acquisition and baseline establishment. The processing of film stock variations and post-production alterations (blocks 704 and 706) may be executed by a module specialized in data processing and analysis, which interprets the visual effects of different film stocks and processing techniques. The construction of the training dataset (block 708) and the training of the AI (block 710) may be managed by the language model training module 240, which includes instructions for utilizing the detailed metadata and visual comparisons to teach the AI. The review and refinement process (block 712) mayu be overseen by a quality assurance module, which assesses the AI-generated footage and implements feedback for continuous improvement. Lastly, the optimization of learning cycles (block 714) may be conducted by a module focused on training efficiency, which adjusts the training process based on the AI's performance and feedback received.

The process of method 700 represents a technical improvement over prior art by enabling the AI to accurately replicate the complex visual effects of different film stocks and post-production processes, thereby significantly enhancing the quality and realism of AI-generated video content.

Exemplary Alternative Computer-Implemented Method

Figure 8:
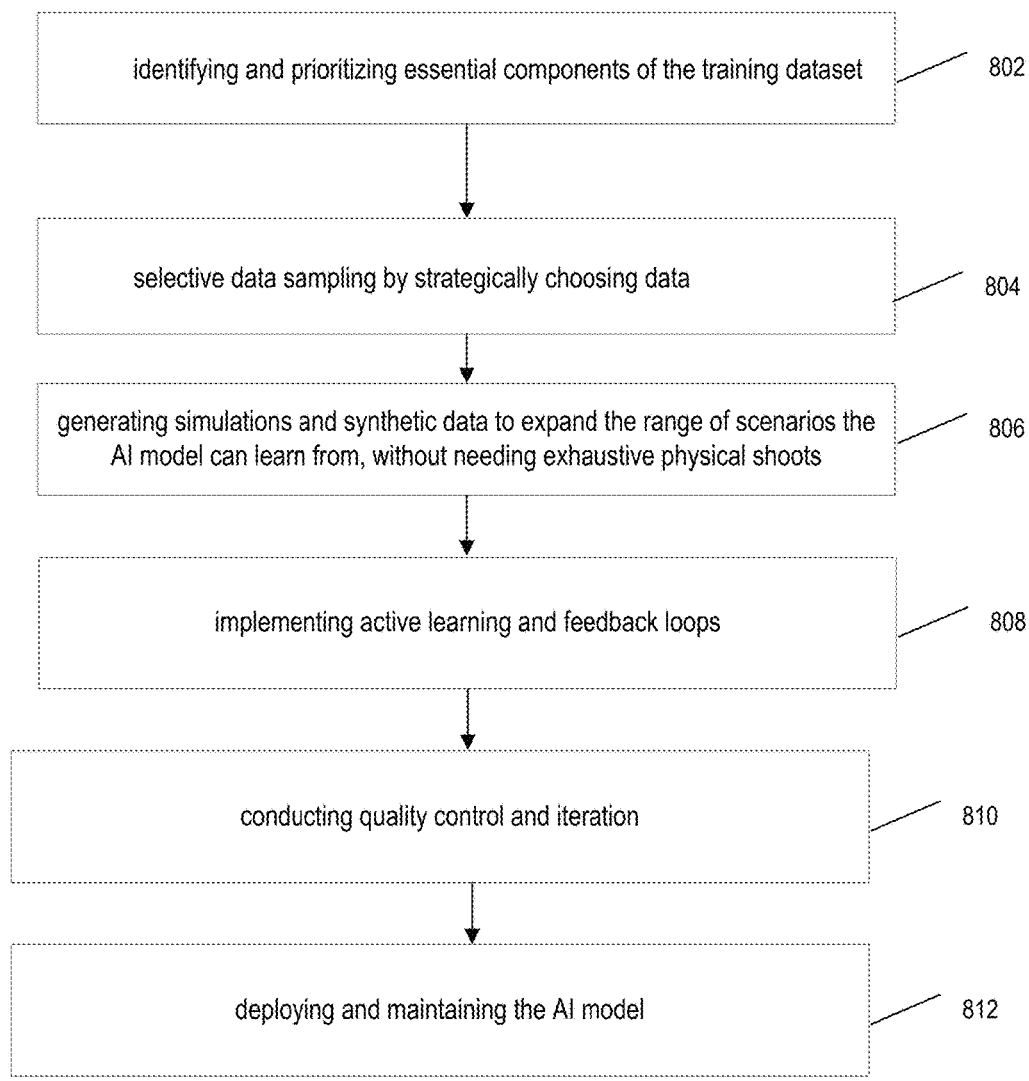
FIG. 8 depicts a block flow diagram for generating video content that adheres to professional film standards, according to some aspects.

FIG. 8 depicts a block flow diagram 800 for generating video content that adheres to professional film standards, according to some aspects of the present techniques. The method 800 aims to enhance AI-driven video production by focusing on core elements of professional filmmaking, selective data sampling, utilizing simulations and synthetic data, active learning and feedback loops, quality control and iteration, implementation and scaling, and finally, monitoring, evaluation, and future projections. Each step of the method 800 may systematically improve the AI's understanding and execution of professional filmmaking techniques, ensuring high-quality video content generation that adheres to industry standards.

The method 800 may include focusing on core elements by identifying and prioritizing essential components of the training dataset foundational to understanding and generating professional-quality video content (block 802). This step is performed by the metadata processing module 222 of FIG. 2A, which includes instructions for receiving and prioritizes data based on focal lengths, camera settings, and shot types.

The method 800 may include selective data sampling by strategically choosing data that is most representative and essential for the foundational learning of the AI model (block 804). The metadata processing module 222 may perform this function, focusing on common filmmaking scenarios and standard camera configurations.

The method 800 may include generating simulations and synthetic data to expand the range of scenarios the AI model can learn from, without needing exhaustive physical shoots (block 806). The filmmaking variable simulation module 230 may perform this step, and may include instructions for creating virtual environments and actors to generate a wide range of data points.

The method 800 may include implementing active learning and feedback loops, where the model iteratively improves through the direct incorporation of user feedback and real-world application insights (block 808). This step may be performed by the language model training module 240, in some aspects, which may include instructions for querying users and incorporating their responses into the learning process.

The method 800 may include conducting quality control and iteration to ensure the AI model meets high standards of quality and professionalism expected in the film industry (block 810).

The method 800 may include implementation and scaling, focusing on deploying and maintaining the AI model in practical, real-world filmmaking environments, and scaling the model to accommodate broader applications (block 812). The one or more filmmaker computing systems 202 may include instructions for automatically deploying one or more trained models.

The method 800 may include monitoring, evaluation, and future projections to sustain the long-term success and relevance of the AI model in the dynamic field of filmmaking.

Filmmaker Toolkit

The present techniques describe a system and method for generating video content that simulates professional filmmaking techniques, leveraging a unique toolkit designed to interact with an AI model specifically trained in the intricacies of cinematography. This toolkit employs a series of prompts, or "knobs and switches," allowing users to specify the exact requirements for high-quality video content. These prompts facilitate communication with the AI, directing it to produce content that meets professional standards and is suitable for sale to studios and streaming services. The toolkit may be included in a proprietary software interface (i.e., the UI 216) that utilizes metadata language, which the AI was trained on, to interpret and execute the filmmaking commands.

An example of how this toolkit operates can be seen in the detailed prompt: "Recreate the previous shot using a 50 mm lens instead of 85 mm, increase exposure by one stop, move the subject six inches further from the camera, and slow the camera move by half so that the camera travels 4.3 feet on the Z axis at a continuous rate over the 7 second shot." This prompt demonstrates the toolkit's capability to specify intricate details about camera settings, positioning, and movement to achieve a desired visual effect. The AI, having been trained on a dataset that includes such parameters, can interpret this prompt and generate video content that matches these specifications.

The AI model's training may include receiving variables such as lens types, camera settings, and shot composition via a controlled environment, as discussed with respect to FIG. 2B-FIG. 2D. Unlike conventional models that rely on internet-scraped data, Filmmaker may use professionally created content shot under controlled conditions. Advantageously, using such content for training results in more consistent and accurate models. The inclusion of Lidar data alongside traditional video further enriches the model's comprehension of three-dimensional space, enhancing its ability to accurately simulate professional camera techniques.

The toolkit offers significant benefits, particularly in terms of access to video content. When studio partners allow the ingestion and analysis of their footage, the present Filmmaker AI models are enabled to model existing backgrounds, sets, costumes, and actors. This access is akin to practices in VFX work and is justified by the cost savings delivered through the use of AI-generated footage. Moreover, by facilitating agreements that grant Filmmaker the right to learn from copyrighted material without re-using that content (e.g., by creating derivative works), the system stands to receive a wealth of professionally made and labeled video library content. This arrangement not only benefits the tech partners with high-quality training data but also positions Filmmaker to profit from the creation of proprietary models. Thus, in some aspects, Filmmaker models are not used with existing foundation models.

Merger of Hollywood & Silicon Valley

The present techniques describe methods and systems designed to integrate the realms of Hollywood and Silicon Valley through the development and implementation of foundational Filmmaker AI language models. These model aims to serve as a mutually beneficial interlocutor between tech companies specializing in text-to-video AI technologies and the artistic and technological prowess of Hollywood companies. The essence of this integration is to foster a partnership that leverages the strengths of both industries to enhance the quality, efficiency, and cost-effectiveness of film production.

As discussed above, for example, with respect to FIG. 1, conventional AI models have a significant gaps, particularly in their understanding of filmmaking nuances such as generating video from specific perspectives and adjusting shots based on cinematographic needs. The Filmmaker AI models are designed to imbue AI models with a full understanding of filmmaking, incorporating the vocabulary and technology used in capturing images. This is achieved through training that involves filming in controlled environments, where variables such as lens types, camera settings (including focal length and depth of field), shot composition, and the use of Lidar data are rigorously documented. This data, in turn, provides the AI with a richer understanding of three-dimensional space and the dynamics of object relationships within it.

To facilitate this process, the development of a user interface (UI) is proposed (e.g., the UI 216 of FIG. 2A), allowing the user to specify video characteristics using the same metadata language employed during the AI training phase. This UI is envisioned not only to streamline the video content generation process for professional movie production but also to open avenues for consumer applications. Such applications could enable users to leverage professional filmmaking techniques in their video productions, potentially in collaboration with filmmakers to replicate unique styles.

The training variables encompass a broad range of technical aspects of filmmaking and camera operation, ensuring that the AI model gains a deep understanding of cinematic data processing. This is further enhanced, in some aspects, by integrating Lidar data, which, when combined with traditional video data, significantly improves the AI model's comprehension of spatial relationships and focus.

A noteworthy aspect of the present techniques involves the method and system for advanced cinematic data collection and processing. This includes a metadata framework that injects detailed information about filmmaking techniques directly into the AI's learning process. Such information covers camera settings, shot composition, lighting setups, and dynamic scene changes, equipping the AI with the knowledge needed to contribute meaningfully to the final video output. The training process may also involve systematic alteration of key variables to teach the AI the impact of each filmmaking element on the overall production.

Custom AI algorithms are developed for processing complex cinematic data. These algorithms are tailored to interpret detailed metadata, allowing the AI to replicate or innovate on professional filmmaking techniques. This includes simulating camera movements, adjusting lighting in post-production, and ensuring narrative coherence across generated scenes, thereby improving the AI's video generation capabilities while reducing the computational resources required for training.

The present techniques also enable integration techniques for existing video LLMs. This allows the Filmmaker AI models to enhance standard LLM outputs with advanced filmmaking capabilities, teaching these models to produce content that adheres to professional standards through transfer learning and/or fine-tuning, for example, as discussed herein.

In some aspects, the Filmmaker model incorporates a system for training its AI using both synthetic and real-world filmmaking data, featuring continuous learning mechanisms that adjust model parameters based on feedback from actual film production use. This ensures that the AI remains aligned with current filmmaking practices and technologies. Further, a simulation-driven learning environment may be employed, generating virtual scenes with adjustable parameters to allow the AI to learn from a wide range of hypothetical filmmaking scenarios without the logistical challenges of physical shoots.

In conclusion, the present techniques represent an improvement to synthesizing professional-quality video content by leveraging the Filmmaker AI models to enhance the capabilities of a other models for video generation. Through a well-structured, highly annotated, and organized professional video library, the LLM can be trained not just to mimic, but to deeply understand and replicate the nuanced art of filmmaking, bridging a significant gap between traditional film production techniques and modern AI-driven processes.

Exemplary Consumer Applications

The present techniques include methods and systems for empowering consumers to create high-quality cinematic content using advanced artificial intelligence (AI) algorithms. Using the Filmmaker AI models, users, including non-professionals, may apply sophisticated filmmaking techniques to their home videos or text-to-video projects, transforming ordinary footage into cinematic works that resemble professional film production qualities. As noted, in some aspects, multiple instances of the one or more filmmaker computing systems 202 of FIG. 2A can operate independently or be networked together, potentially within a cloud computing framework, to distribute tasks for efficiency and scalability. Thus, it is envisioned that multiple filmmaker computing systems 202 may be deployed for different user groups. For example, one for studio engineers, and another for at-home consumers. The latter group may be able to download components of and/or access the one or more filmmaker computing systems 202, for example, from a mobile application store (e.g., the Apple Store, the Google Play Store, etc.).

For consumer applications, the one or more filmmaker computing systems 202 advantageously enable users to generate video content for movies without actual filming, significantly reducing production costs while applying professional filmmaking techniques. Users can interact with the system through a user interface that allows them to specify video characteristics using the same metadata language the AI was trained on, in some aspects. This interface may facilitate the direct-to-consumer application by enabling users to apply "packages" or advanced "filters" to their videos, transforming them into high-quality cinematic productions. Examples of these transformations include turning home videos into "Classic 70's mob movies," "Sci-Fi fantasy 90's tech paranoia thrillers," or "WW2 epic action movies." The present techniques integrate with consumer video platforms, enabling users to easily share their enhanced videos. By offering packages tailored for consumer use, the one or more filmmaker computing systems 202 scales up to meet consumer market demand, empowering users to create blockbuster-quality home videos with ease and creativity. This system not only democratizes professional filmmaking techniques for the consumer market but also ensures technical excellence, protection of artist rights, and preservation of the human role in cinema.

Figure 9:
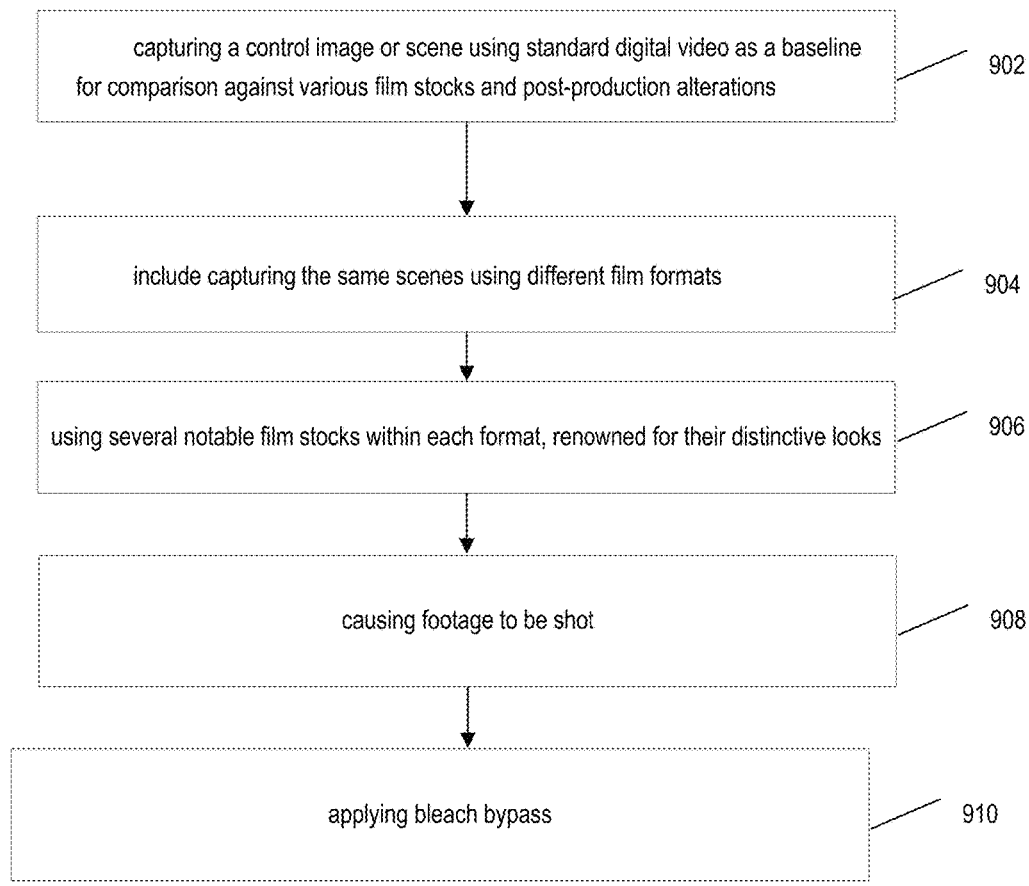
FIG. 9 depicts a computer-implemented method for delivery of AI-based filmmaking tools to consumers, according to some aspects.
Figure 10:
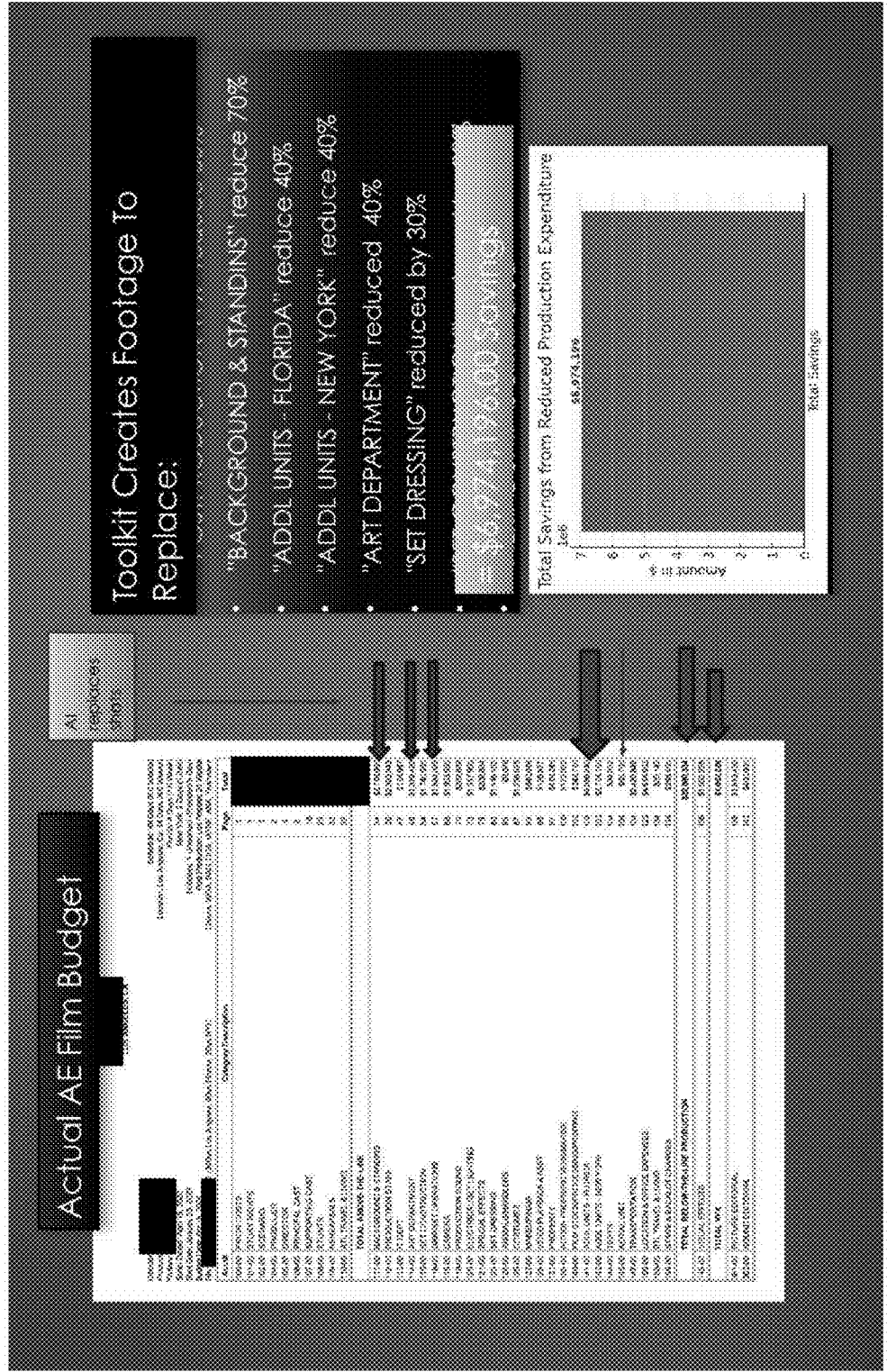
FIG. 10 depicts a block diagram demonstrating cost savings by applying the present AI-based techniques in reference to an existing film budget, according to some aspects.

Exemplary Computer-Implemented Method of Delivering AI-Based Filmmaking Tools to Consumers FIG. 9 depicts a computer-implemented method 900 for delivery of AI-based filmmaking tools to consumers, elaborating on the algorithm described in the provided blocks and relating to the system diagram of FIG. 2A.

The method 900 may include capturing a control image or scene using standard digital video as a baseline for comparison against various film stocks and post-production alterations (block 902). This step may be performed by the metadata processing module 222 of FIG. 2A, which includes focal length, sensor size, and lens type, significantly influencing the visual style of the generated image or video.

The method 900 may include capturing the same scenes using different film formats such as 35 mm, 16 mm, 8 mm, and Super 8 mm, each imparting unique grain, color saturation, and contrast (block 904). This function is facilitated by the camera movement module camera movement simulation module 232 includes instructions for performing camera movements such as dollying, panning, and tilting, incorporating these movements into the generated content.

The method 900 may include using several notable film stocks within each format, renowned for their distinctive looks, such as Kodak Portra for its color rendition and Ilford Delta for black and white photography (block 906). This step may be performed by the filmmaking variable simulation module 230 of FIG. 2A, focusing on composition, depth of field, and the interaction between foreground and background elements.

The method 900 may include causing footage to be shot with the intention of processing it with techniques like pushing the film one stop to see how it affects the visual outcome (block 908). This is managed by the camera movement simulation module 232 of FIG. 2A, which includes instructions for adjusting model parameters based on feedback from actual film production use.

The method 900 may include applying bleach bypass and other film processing techniques to see their impact on color and texture (block 910). This process may be conducted by the language model operation module 242, which may have stored thereon custom AI algorithms for processing filmmaking data in including interpreting detailed metadata, enabling the AI to replicate or innovate on professional filmmaking techniques in its generated content.

In addition to these steps, the method 900 may use integration techniques for existing video LLMs and the simulation-driven learning environments discussed above. This includes the ability to integrate seamlessly with existing large language models for video processing and employing a simulation environment to generate virtual scenes with adjustable parameters, allowing the AI to learn from a wide range of hypothetical filmmaking scenarios.

The method 900 represents a structured and comprehensive approach to training an AI in replicating complex visual effects associated with different film stocks and post-production processes. By systematically capturing and processing scenes across various formats and conditions, and applying detailed metadata and transfer learning, the AI model is trained to understand and replicate the nuanced effects of traditional filmmaking techniques, thereby enhancing the authenticity and versatility of AI-generated footage. This approach not only improves the AI's video generation capabilities but also significantly reduces the computational resources required for training, representing a technical improvement over the prior art.

Additional Exemplary Computer-Implemented Methods

Figure 11:
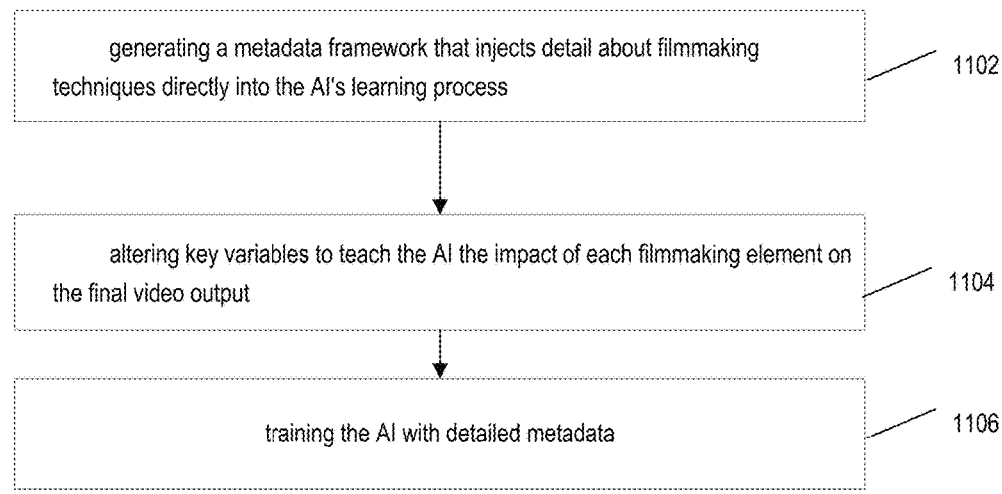
FIG. 11 depicts a flow diagram illustrating a computer-implemented method for advanced cinematic data collection and processing for AI-driven video production, according to some aspects.

FIG. 11 depicts a flow diagram illustrating a computer-implemented method 1100 for advanced cinematic data collection and processing for AI-driven video production, according to some aspects. The method 1100 includes generating a metadata framework that injects detail about filmmaking techniques directly into the AI's learning process, including information on camera settings, shot composition, lighting setups, and dynamic scene changes by (block 1102). The method 1100 may include systematically altering key variables to teach the AI the impact of each filmmaking element on the final video output (block 1104). The method 1000 may include training the AI with detailed metadata, including spatial information from Lidar data and filmmaking variables, to generate video content that adheres to professional filmmaking standards (block 1106). The method 1100 may include simulating camera movements within the generated video content based on the processed metadata. The metadata framework enables the AI to replicate or innovate on professional filmmaking techniques in the generated content. The method 1100 may include adjusting lighting within the generated video content in post-production based on the processed metadata. The method 1100 may include determining narrative coherence across generated scenes based on the processed metadata.

The method 1100 may be implemented in a computing environment that includes one or more filmmaker computing systems, each comprising one or more processors, memories, and network interface controllers (e.g., the environment 200). The computing environment may be part of a cloud computing environment and is accessible to other components such as cameras, film dollies, and overhead laser devices. The memories of the filmmaker computing systems store a plurality of modules, each being a respective set of computer-executable instructions for processing metadata, generating video content, integrating Lidar data, adjusting generated content based on dynamic scene changes, and ensuring narrative coherence across generated scenes.

Figure 12:
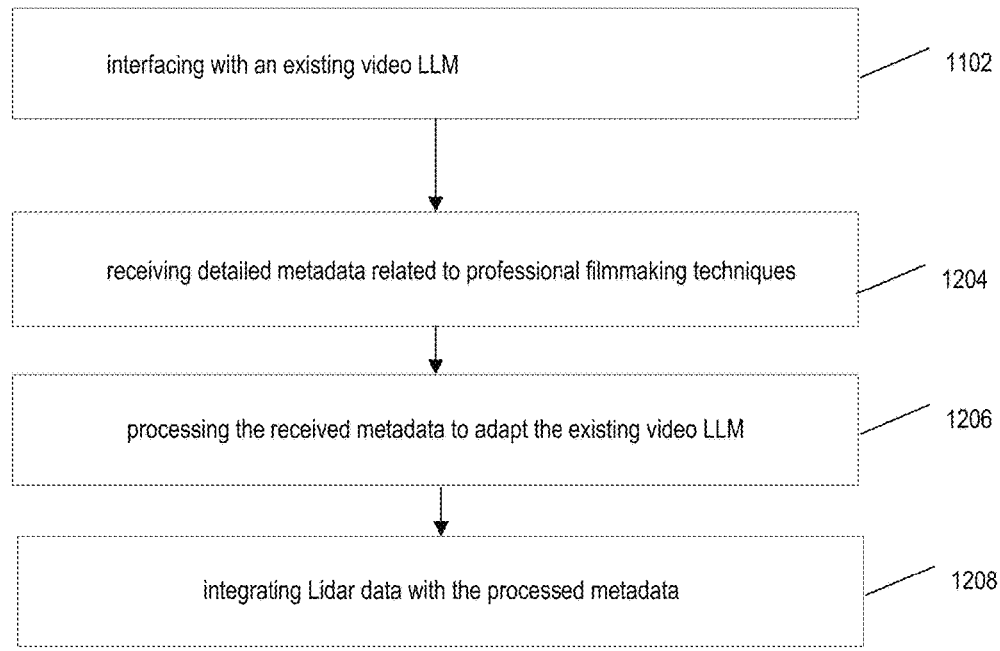
FIG. 12 illustrates a computer-implemented method for integrating existing video large language models (LLMs) with custom AI algorithms for filmmaking, according to some aspects.

FIG. 12 illustrates a computer-implemented method 1200 for integrating existing video large language models (LLMs) with custom AI algorithms for filmmaking, according to some aspects. The method aims to enhance the capabilities of existing video LLMs by interfacing them with custom AI algorithms designed to simulate professional filmmaking techniques, thereby generating video content that adheres to professional standards. This integration is achieved through a series of steps that leverage detailed metadata related to filmmaking, Lidar data for a three-dimensional understanding of space, and transfer learning techniques to refine the video content generation capabilities of the video LLM.

The method 1200 may include interfacing with an existing video LLM (block 1202). This step establishes a connection between the custom AI algorithms and the video LLM, enabling efficient knowledge transfer and collaboration between the two systems. The interface protocols used in this step are specialized to ensure that the video LLM can receive and process inputs from the custom AI algorithms effectively. The method 1200 may include receiving detailed metadata related to professional filmmaking techniques, including camera settings, shot composition, and lighting setups (block 1204). This metadata may serve as an input for adapting the existing video LLM, providing it with the necessary information to simulate professional filmmaking techniques accurately.

The method 1200 may include processing the received metadata to adapt the existing video LLM (block 1206). The custom AI algorithms process the detailed metadata to generate video content that simulates professional filmmaking techniques. This step may include analyzing the metadata to understand the nuances of professional filmmaking and applying this knowledge to the video generation process.

The method 1200 may include integrating Lidar data with the processed metadata (block 1208). This integration enhances the generated video content with a three-dimensional understanding of space and object relationships. The Lidar data provides additional spatial information that complements the metadata, allowing for more accurate and realistic simulation of professional filmmaking techniques. The method 1200 may include applying transfer learning techniques to the existing video LLM based on the processed metadata and Lidar data. This step refines the video content generation capabilities of the video LLM, enabling it to produce video content that more closely adheres to professional filmmaking standards. Transfer learning allows the video LLM to leverage its existing knowledge base while incorporating new insights from the custom AI algorithms and the detailed metadata. The method 1200 may include fine-tuning the existing video LLM with a dataset enriched with detailed filmmaking metadata and Lidar data. This fine-tuning improves the video LLM's understanding of professional filmmaking standards, enhancing its ability to generate video content that simulates professional filmmaking techniques accurately. The method 1200 may include using specialized interface protocols to enable efficient knowledge transfer between the custom AI algorithms and the existing video LLM. These protocols ensure that the integration between the two systems is seamless and that the video LLM can effectively incorporate the insights provided by the custom AI algorithms. The method 1200 may include simulating professional filmmaking techniques within the generated video content based on the processed metadata and integrated Lidar data. This simulation allows the video LLM to produce video content that closely mimics the quality and style of professional filmmaking, leveraging the detailed metadata and spatial information provided by the Lidar data. The method 1200 may include dynamically adjusting the generated video content based on scene changes documented in the metadata. This adjustment ensures that the video content remains consistent with the evolving context of the scene, adhering to professional filmmaking standards and maintaining narrative coherence. The method 1200 may include systematically altering key filmmaking variables in the metadata to simulate the impact of each element on the final video output. This systematic alteration teaches the existing video LLM to apply these variables effectively, enhancing its ability to generate video content that adheres to professional filmmaking standards.

Figure 13:
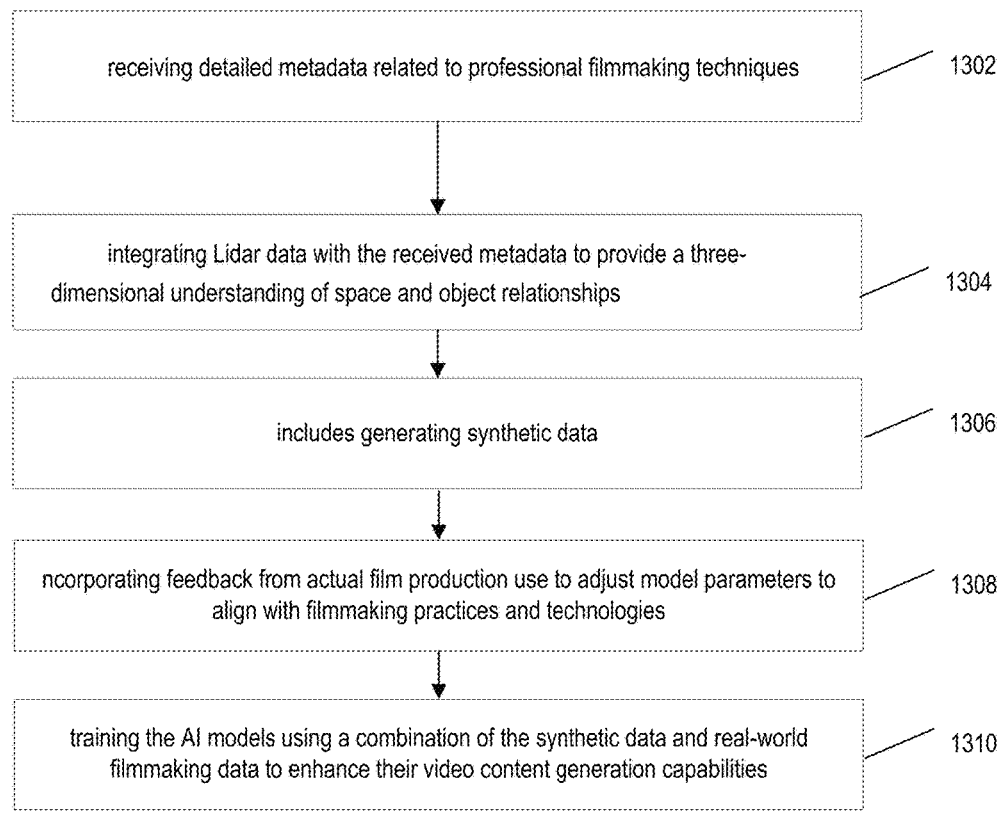
FIG. 13 is a flow diagram illustrating a computer-implemented method for training artificial intelligence (AI) models using both synthetic and real-world filmmaking data, according to some aspects.

FIG. 13 is a flow diagram illustrating a computer-implemented method 1300 for training artificial intelligence (AI) models using both synthetic and real-world filmmaking data, according to some aspects. The method 1300 is designed to enhance the capabilities of AI models in generating video content that simulates professional filmmaking techniques, leveraging detailed metadata, Lidar data, and incorporating feedback from actual film production use.

The method 1300 begins with receiving detailed metadata related to professional filmmaking techniques, including camera settings, shot composition, and lighting setups (block 1302). This step involves collecting information that describes various aspects of professional filmmaking, serving as a foundational dataset for training AI models.

Next, the method 1300 involves integrating Lidar data with the received metadata to provide a three-dimensional understanding of space and object relationships (block 1304). This integration enriches the AI models' comprehension of spatial dynamics within a scene, contributing to the realism and depth of the generated video content.

The method 1300 then includes generating synthetic data based on the processed metadata and Lidar data to simulate professional filmmaking techniques (block 1306). This step allows the creation of a wide range of hypothetical filmmaking scenarios without the logistical challenges of physical shoots, expanding the AI models' learning opportunities.

Furthermore, the method 1300 includes incorporating feedback from actual film production use to adjust model parameters to align with filmmaking practices and technologies (block 1308). This step ensures that the AI models remain relevant and accurate to current filmmaking standards, enabling iterative improvements in video content generation.

Additionally, the method 1300 involves training the AI models using a combination of the synthetic data and real-world filmmaking data to enhance their video content generation capabilities (block 1310). This comprehensive training approach leverages both controlled synthetic scenarios and authentic filmmaking data, ensuring a well-rounded understanding of professional filmmaking techniques.

The method 1300 may also include leveraging dailies as a source of real-world filmmaking data, wherein the dailies are annotated with detailed metadata and used to refine the AI models' understanding of professional filmmaking standards (block 1312). This step utilizes the rich source of real-world filmmaking data captured during actual film production, providing valuable insights into professional filmmaking practices.

Additionally, the method 1300 may involve implementing continuous learning mechanisms that dynamically adjust the AI models based on structured feedback mechanisms, enabling iterative improvements in video content generation (block 1314). This step fosters ongoing refinement of the AI models, ensuring their capabilities evolve in response to feedback and new data.

Lastly, the method 1300 may include simulating dynamic scene changes and systematically altering key filmmaking variables in the metadata to teach the AI models the impact of each filmmaking element on the final video output (block 1316). This step enhances the AI models' ability to understand and replicate the nuanced effects of different filmmaking techniques, further improving the quality and authenticity of AI-generated video content.

Figure 14:
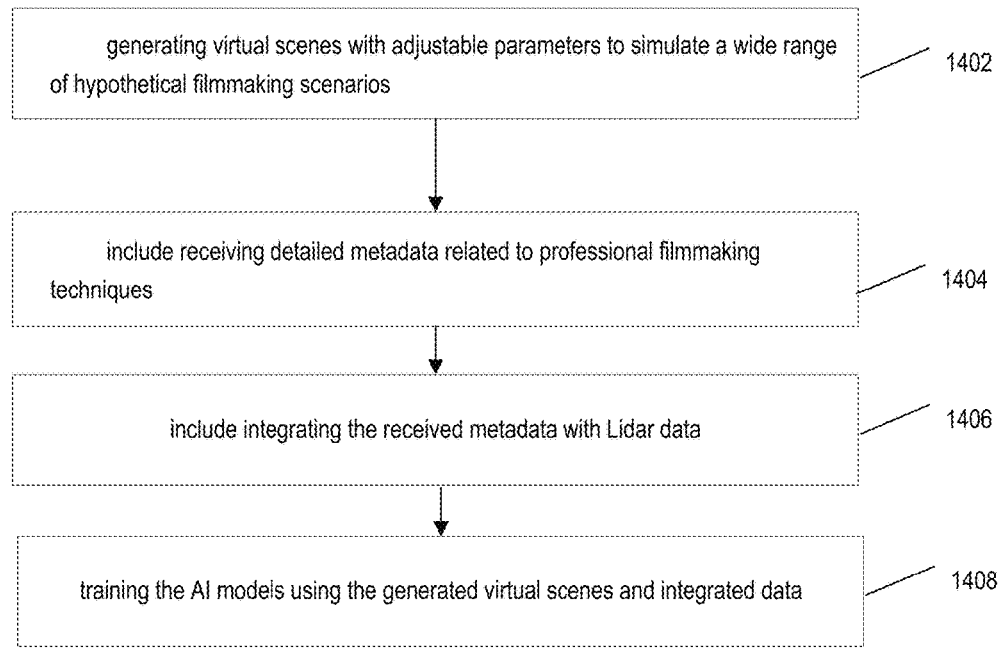
FIG. 14 is a flow diagram illustrating a computer-implemented method for employing a simulation-driven learning environment for artificial intelligence (AI) model training in filmmaking, according to some aspects.

FIG. 14 is a flow diagram illustrating a computer-implemented method 1400 for employing a simulation-driven learning environment for artificial intelligence (AI) model training in filmmaking, according to some aspects. The method 1400 is designed to use the present techniques to access trained AI models fir generating video content that simulates professional filmmaking techniques without the constant need for new real-world video data. The method 1400 utilizes detailed metadata, Lidar data, and virtual scenes with adjustable parameters to provide an efficient training environment.

The method 1400 begins with generating virtual scenes with adjustable parameters to simulate a wide range of hypothetical filmmaking scenarios (block 1402). This step may include creating diverse virtual environments that can be manipulated to represent various filmmaking conditions, allowing AI models to learn from a broad spectrum of scenarios.

The method 1400 may include receiving detailed metadata related to professional filmmaking techniques, including camera settings, shot composition, and lighting setups (block 1404). This metadata provides information that describes the technical aspects of professional filmmaking, serving as a foundational dataset for training AI models.

The method may include integrating the received metadata with Lidar data to provide a comprehensive three-dimensional understanding of space and object relationships within the virtual scenes (block 1406). This integration enriches the AI models' comprehension of spatial dynamics and the relationships between objects within a scene, contributing to the realism and depth of the generated video content.

The method 1400 may include training the AI models using the generated virtual scenes and integrated data to enhance their video content generation capabilities without the need for constant new real-world video data (block 1408). This step may use the virtual scenes and detailed metadata to provide a controlled and efficient training environment, enabling AI models to learn and replicate professional filmmaking techniques effectively.

Figure 15:
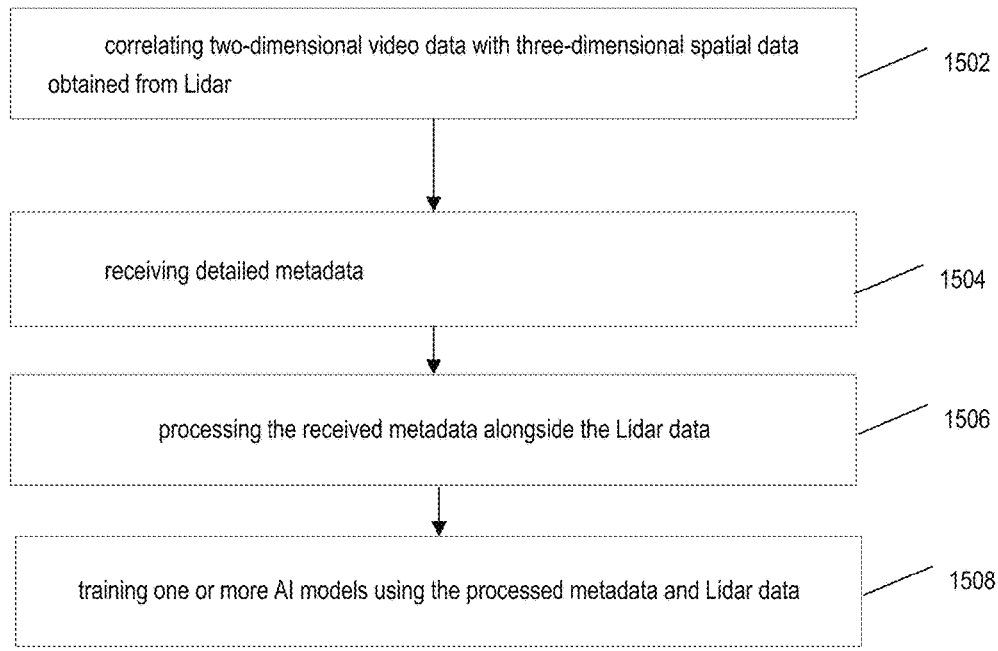
FIG. 15 is a flow diagram illustrating a computer-implemented method 1500 for enhancing artificial intelligence (AI) model training in filmmaking through the use of Lidar data.

FIG. 15 is a flow diagram illustrating a computer-implemented method 1500 for enhancing artificial intelligence (AI) model training in filmmaking through the use of Lidar data. The method 1500 begins with two-dimensional video data being correlated with three-dimensional spatial data obtained from Lidar to simulate professional camera techniques (block 1502). For example, this process is performed by the video content generation module 224 of FIG. 2A, which integrates detailed metadata and/or Lidar data to enhance the three-dimensional understanding of space and object relationships.

The method 1500 may include receiving detailed metadata related to professional filmmaking techniques, including camera settings, shot composition, and lighting setups (block 1504). This step may be executed by the metadata processing module 222, which processes the received metadata to provide the AI with a granular understanding of spatial relationships and the physics of camera movement.

The method 1500 may include processing the received metadata alongside the Lidar data (block 1506). This step may be performed by the Lidar data integration module 226. This integration enhances the generated video content with a comprehensive three-dimensional understanding of space and object relationships, allowing for an enhanced portrayal of scenes.

The method 1500 may include training one or more AI models using the processed metadata and Lidar data to accurately simulate professional filmmaking techniques (block 1508). This training is conducted by the language model training module 240, which refines the capabilities of AI models in understanding and generating text-based inputs and outputs relevant to filmmaking. Synthetic data may is generated based on the processed metadata and Lidar data. This step, executed by the video content generation module 224, provides the AI with diverse scenarios for training without the need for new real-world video data. Finally, continuous learning mechanisms are implemented that dynamically adjust the AI models based on structured feedback mechanisms. This adjustment is facilitated by the language model operation module 242, enabling iterative improvements in video content generation. Through these steps, the method systematically enhances the realism and quality of generated video content, leveraging the integration of Lidar data and detailed metadata to train AI models in replicating professional filmmaking techniques.

Exemplary Model Architectures

Figure 16A:
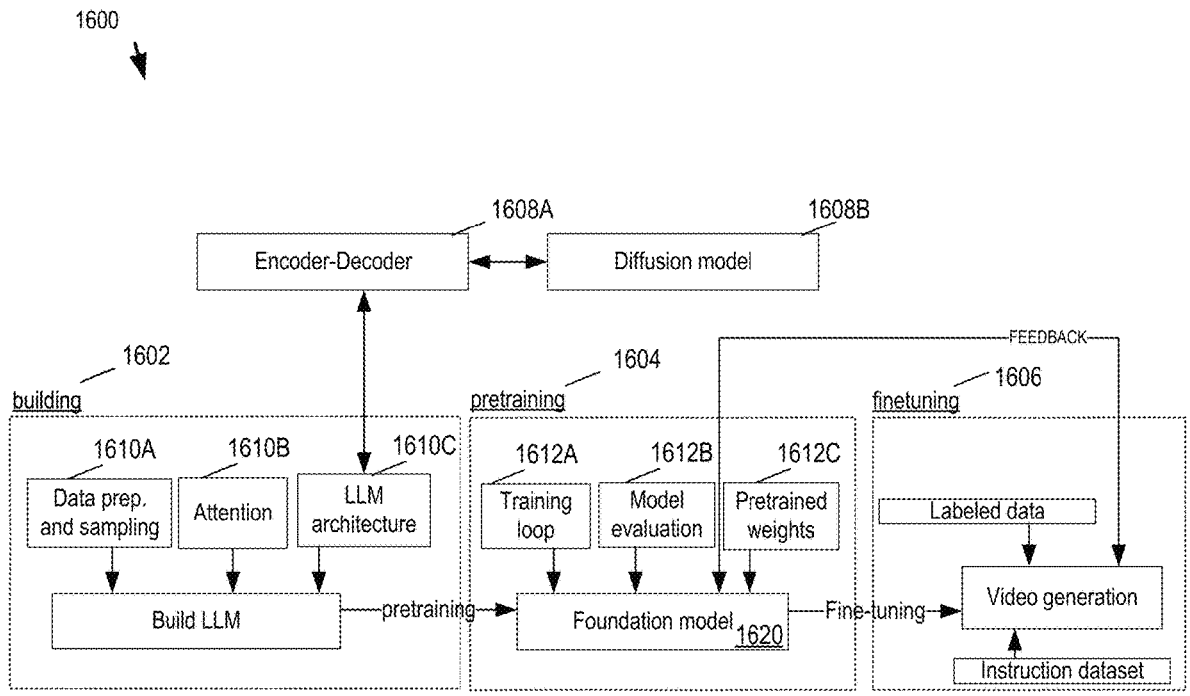
FIG. 16A is a block diagram depicting training an artificial intelligence model, according to some aspects.

FIG. 16A depicts a block diagram of an exemplary artificial intelligence architecture 1600, according to some aspects. The architecture 1600 may train and/or operate one or more AI models, such as the filmmaker model discussed herein. The architecture 1600 may include a three-stage process for developing and fine-tuning a Large Language Model (LLM). In general, components of the computing environment 200 may perform the training and other operations described with respect to the architecture 1600.

The architecture 1600 is divided into three main blocks: a building block 1602, a pretraining block 1604, and a finetuning block 1606.

The building block 1602 may include three blocks, specifically a data preparation & sampling block 1610A, where data is prepared and sampled for training; an attention mechanism block 1610B, wherein an attention mechanism is implemented; and an LLM architecture block 1610C, the design and structural setup of the large language model. The output of blocks 1610 may flow into the pretraining block 1604.

The sampling block 1610A may include cleaning and tokenizing input data. In some aspects, tokenization includes splitting text into smaller units like words or subwords. Further preprocessing steps may include lowercasing, removing special characters, and creating vocabulary lists. In some aspects, the sampling block 1610A may tokenize video using visual patches, which are spacetime patches extracted from a compressed latent space of video data. These patches may be provided as training data along with positional information. The patches may be processed by an encoder-decoder 1608A and/or diffusion model 1608B, in some aspects. The encoder-decoder 1608A may be part of a transformer model, in some aspects. In general, the LLM architecture block 1610C may include a plurality of multi-head attention blocks, addition and normalization blocks and feed-forward artificial neural networks. The LLM architecture block 1610C may include an encoder that receive inputs and input embeddings and perform positional encoding before processing the positional encodings using the multi-head attention blocks, addition and normalization blocks and feed-forward neural networks. The LLM architecture block 1610C may include a decoder having further masked multi-head attention blocks that receive output embeddings and perform positional encodings. These encodings may be further processed by the LLM architecture block 1610C, such as by linear and softmax output layers.

The sampling block 1610A may also include collecting a large dataset of videos including associated textual data like captions, descriptions, or subtitles. The sampling block 1610A may further include generating textual features by processing the collected dataset of videos. For example, one or more sub-models (e.g., one or more CNNs) may be used to process video frames of the videos to capture visual features. Additional models may be used to capture audio features and/or temporal features such as frequences of frames. In some aspects, these features may be combined, such that the attention mechanism block 1610B may be trained on the features.

The encoder-decoder blocks 1608A may utilize a latent video space for efficient video generation. This may improve the model's ability to understand and translate complex cinematographic descriptions into high-quality video content. The latent space may include a diffusion model 1608B. The diffusion model 1608B may include conditional generation that enables the 1608B to generate video frames from noise. Specifically, the encoder-decoder 1608A may encode individual video frames into patches using the encoder block of the encoder-decoder 1608A. The diffusion model 1608B may progressively add noise to these patches and train the trained model 1620, in the training loop block 1612A, to predict the added noise. The training loop block 1612A may receive as input the patches with added noise and conditions (e.g., textual descriptors, such as cinematographic attributes). In some aspects, the building block 1602 may vectorize the noised patches and conditions. The building block 1602 may include instructions for sampling the latent space to generate video based on latent representations, using decoder layers of the encoder-decoder 1608A.

The finetuning block 1606 may include finetuning the model 1620. For example, in some aspects, the trained model 1620 may be trained with a dataset with class labels leading to the creation of a classifier. In some aspects, the trained model 1620 may be finetuned with an instruction dataset. The finetuning processes at block 1606 may further specialize the foundation model for specific tasks as indicated by the outputs.

The trained model 1620 may be trained to receive text prompts specifying cinematographic attributes and to generate corresponding video content that exhibits those attributes. The training process is designed to imbue the LLM with a deep understanding of filmmaking techniques, enabling it to interpret complex prompts and translate them into specific video generation tasks that adhere to professional filmmaking standards.

In the building block 1602, the data preparation & sampling block 1610A may collect video data, including associated textual data like captions, descriptions, or subtitles that describe cinematographic attributes such as camera angles, lighting conditions, and scene composition. This data may be then tokenized, creating a structured format that the LLM can process. Specifically, video data may be tokenized using visual patches, which represent spacetime patches extracted from the compressed latent space of video data, capturing both spatial and temporal information. This tokenization process enables the LLM to understand the relationship between textual descriptions of cinematographic attributes and their visual representations in video content.

The attention mechanism block 1610B is trained on the features extracted from the video data, allowing the LLM to focus on relevant parts of the input data when generating video content. This mechanism enables the LLM to prioritize and weigh technical tokens more heavily, which allows the LLM to interpret text prompts that specify cinematographic attributes. This ensures that the generated video content closely aligns with the user's creative intent as expressed in the text prompts. The attention mechanism block 1610B may be included within the LLM architecture block 1610C, in some aspects.

The LLM architecture block 1610C, the structural setup of the LLM, incorporates layers and mechanisms designed to process the complex interplay between textual prompts and video data. This architecture supports the LLM's ability to understand and replicate the nuanced effects of different filmmaking techniques, translating textual descriptions into visual content that exhibits the specified cinematographic attributes.

During the pretraining block 1604, the LLM undergoes training on a large dataset to learn general patterns in the data, including the relationship between text prompts and corresponding video content. The training loop block 1612A involves iterative training that adjusts the model's parameters to improve its ability to generate video content based on text prompts. Model evaluation block 1612B assesses the trained model's performance, ensuring it can accurately interpret prompts and generate video content that reflects the specified cinematographic attributes.

The finetuning block 1606 may further specialize the foundation model for the specific task of generating video content from text prompts specifying cinematographic attributes. For example, the finetuning block 1606 may further train the model 1620 with a dataset enriched with detailed filmmaking metadata and examples of text prompts paired with corresponding video content. This finetuning process may enable the LLM to refine its understanding of how textual descriptions of cinematographic attributes translate into visual content, enhancing its capability to produce video that adheres to professional filmmaking standards.

In some aspects, the architecture 1600 may include a feedback mechanism, which allows for the iterative improvement of the model based on real-world performance and user feedback. This feedback mechanism can be part of the finetuning block 1606, enabling the model to adapt and refine its outputs according to specific user needs or preferences. The feedback mechanism may collect data on the model's performance in generating video content, identify areas where the model may not meet the expected standards of professional filmmaking, and adjust the training process accordingly. This ensures that the model remains aligned with the evolving standards and practices of the film industry, enhancing its ability to generate high-quality, professional-grade video content.

Exemplary Shooting Phases

In some aspects, a shoot may be broken up into two distinct phases, each targeting specific visual training parameters requisite for cinematic storytelling with the various emerging AI tools. In a camera and lens phase, the present techniques may gather foundational visual lens/camera components in a way that offers maximum data collection within a multi-point motion control move that visits several targeted "scenes," each exhibiting specific imaging features. Each scene setup may be iterated on with clear, single changing variables. These visual fundamentals may cover discrete lens/camera imaging properties to establish a benchmark of: what a focal length is, the effects of a various f/stop settings, different motion blur incurred via movement with varying shutter exposure intervals, shifts in lens/camera/subject perspective, etc. This phase may utilize a single camera fitted to a motion control rig photographing various charts, a static scene composed of 3 different depth planes—intra-focus, the focal plane and extra-focus—of LED-enmeshed balls, a light inducing flares and a battery of foundational camera moves that will also illustrate motion blur.

An objective of the camera and lens phase is to enable directing AI as in a real world film shoot. The phase may enable prompting a model as in conventional filmography (e.g., "I want a two-shot, over-the-shoulder with an Alexa LF set at ISO 800 and a 90-degree shutter with a 50 mm Ultra Prime set at T2."). This degree of control over generated video AI is not currently possible. Thus, in order for generative AI to create predictable and repeatable imagery as used in the lexicon of cinematic storytelling, the present techniques may train the model to understand the language of cinema that filmmakers use. The camera and lens phase may include acquiring an array of fundamental visual elements to train the AI to understand the qualities and behaviors of cameras and lenses: what focal lengths are, how the iris or shutter affects exposure, fundamental camera moves, how the exposure interval influences motion blur, etc. In this manner, the present techniques may train the model to recognize patterns of how lenses and cameras react at any given setting to be able to dictate the qualities and mood the end user is seeking for the AI to invoke. This may include providing film-specific styles of camera movements: lateral moves, crane downs, handheld, etc. to train the model to respond to prompts like, "A cinematic push-in on Indiana Jones as he raises his head up from a tilted down position, ending in a closeup as the camera meets his face." To have that degree of specific control via textual prompts, the present techniques may first establish the meaning of one or more moves and terms.

Following are a list of parameters that may be used in the film language phase. These parameters may be referenced in shot scripts, as discussed herein.

Lens Parameters:
  Focal Length (angle of view)
    15 mm-200 mm?
  Focus Distance (Rack through focus range)
  T-stop (f/stop?)
    ½ stop increments?
  Depth of Field (focus planes of interest)
    Intra-Focus—BLUE
    In-Focus—GREEN
    Extra-Focus—RED
    LED volume b.g. grid in WHITE
  Bokeh
    Bokeh intra-focus (Inverted)
    Bokeh extra-focus
    Occluded
    Iris Shapes
    Anamorphic
  Resolving Power (Resolution Chart?)
  Distortion (Lens Grid)
    Edge vs Center
  Flare
    Veiling Flare/Glare
    Spot Flare
    Ghost Flare
    Eyelash/Rainbow Flare
    Anamorphic Flare
Camera Movement:
  Push in/out
  Lateral Parallax
  Boom Up/Down
  Crane Swoop
  Hinge/Arc Around
  Hand Held
Camera Parameters:
  Imager Size
    Sensor & sensel dimensions.
  Shutter
    Showing Motion Blur (exposure compensated)
    Affecting Exposure
  ISO/Noise
    As a function of Noise (FPN) vs. Film Grain Using the above parameters, a motion control camera may move through differently staged zones for designed to test different lens/camera parameters. Some of these potential tableaus include:

Test Charts (Lens Grid, Resolution, Exposure Wedge).
  Depth of Field/Bokeh setup.
  Foundational Camera Moves (Boom Up/Down, Track Right/Left, Push, Pull) and also show Parallax and Motion Blur.
  A Light to induce Lens Flares with a motion controlled pan through the light.

These "scenes" may be positioned on an LED volume and the motion control crane programed to repeat the same move—push-in/pull-out, track left/right, boom up/down, as well execute the same focus/iris changes—from one changed parameter to the next. In some aspects, the present techniques may include shooting many (e.g., thousands) of passes of this camera move, where each pass will have a single setting adjusted.

The images generated via this process may include metadata. Systems used in this process may be genlocked with common timecode and metadata will be collected from the camera, the intelligent lenses, the motion control rig, Unreal Engine, the tracking systems, witness cameras, and/or any other device/system that can yield information about the setup and the devices capturing the scene. The management of this data and the entire I/O pipeline may be used as context by one or more AI models.

Depth of Field/Bokeh Tableau:
  For example, the setup including static Balls and Charts may be staged on an LED volume and a motion control crane programed to repeat the same move—push-in/pull-out, track left/right, boom up/down, as well as the same focus/iris changes—from one changed parameter to the next. We will shoot thousands of passes of this camera move, each pass will have a single setting adjusted.

The scene may include a series of three gray spheres/lens charts, staged at different depths in frame and occupying different portions of the frame. The idea of separate depths may demonstrate each z-axis plane's depth of field behavior (bokeh), as well as illustrate the performance characteristics of each specific lens at their image periphery. The foreground intrafocus plane may be placed between the moco camera and the middle, in-focus, subject plane, in some aspects. The intrafocus sphere will be dotted with a grid of BLUE LED lights, and the central in-focus sphere will be dotted with GREEN LEDs. And finally, the back extrafocus plane will be placed on the right of frame and dotted with RED LEDs. Additionally, the LED Volume's back wall will display a bespoke black & white lens grid (to differentiate it from the three other depth colors) and will serve as a final depth of field indicator.

Lens Grid (Field of View/Distortion/Shading) Tableau:
  In some aspects, two bespoke lens grids will be created—one for spherical lenses and a 1.78:1 aspect ratio, the other for anamorphic and a 2.39:1 aspect ratio—that will visually illustrate distortion, field flatness (focus fall-off at the image periphery) and shading characteristics of the lenses. A chart is a visual compliment and verification of the extended metadata obtained from the intelligent lenses.

Focal Length:
  This section may teach the model how each focal length looks with a specific sensor size. A motion control rig may move to a lens grid on the LED wall that each time a lens is changed.

Resolving Power:
  Part of profiling just what various lenses, focal lengths, iris settings, etc. do to an image is determining how well a given lens resolves fine detail. For example, whether the results of such image capture are uniform, and/or how that changes with the varying of the lens. In some aspects, the present techniques may include photographing a resolution chart to quantify these properties across parameter permutations.

ISO/Noise:
  Profiling the effect of varying ISO and as a result, the perception of scene brightness that biases exposure choices may be linked to the noise characteristics of the captured image. Understanding the dynamic range capabilities of the lens/camera system as a function of this sliding scale placement weighted by the ISO may be an another important factor. Digital noise is generally different from organic silver halide film grain. The isotropic fixed pattern noise of an underexposed digital imager is generally very different from the non-linear distribution of film grain. Stepping through a complete range of exposures at varying ISO settings may provide a wealth of information across the 20-stops of dynamic range the DSC Labs XYLA chart we will utilize for this test.

Camera Movement/Parallax/Motion Blur

Using the motion control rig, the present techniques may shoot a catalog of fundamental camera moves—pan, tilt, boom, track, handheld, etc. These shots may provide tools of camera movement for the AI to utilize, for example, to learn the effects of parallax. This setup may also be used to teach the model motion blur (separate from rolling shutter artifacts) as part of profiling the effects of varying the exposure intervals (shutter angle) on our motion control move. Specifically, the motion control rig may shoot checkerboard cubes.

Flare Tableau:

Lens artifacts may be an important component to the imaging systems used in visual storytelling. Often, the imperfections bring dynamic response to the lens/camera photographing a real scene that AI needs to understand.

Flare types may include:
 Veiling Flare/Glare
 Spot Flare
 Ghost Flare
 Eyelash/Rainbow Flare
 Anamorphic Flare As discussed, in phase one, the present techniques may include using motion control to provide exact, repeatable moves that can be juxtaposed/aligned to specifically-timed beats within the test. A push-in or specific rack-focus event are examples of these movements. There may be many (e.g., hundreds or more) of iteration takes as a single variable is changed, and this may be repeated for every lens in the series—as well as from multiple perspective positions. Thus, a repeatable system may be highly beneficial. In order to avoid any deleterious effects a rolling shutter sensor could introduce to the footage, a camera with a global shutter may be used. Additionally, in order to best express depth of field across the range of lenses, a full frame sensor may be used, in some aspects. These two configurations may greatly narrow down the choice of digital camera platforms that satisfy the shoot as designed.

For lenses, when possible, lenses with built-in extended data communication may be selected; e.g., newer generation lenses that add in distortion and shading information as part of its metadata package that includes the standard information of focal length, focus, iris and zoom (when applicable) settings. Both Primes and Zooms may be tested, though zooms may only be illustrative to train the smoothness of the zoom effect compared to interpolated blends between all of the focal lengths captured. Additionally, spherical lenses and anamorphic primes may be will be included as part of the imaging profile library. The present techniques may also include a centralized data ingest software, or organizational hub, to ingest, manage and organize all of the acquired data from each phase of the shoot.

In a second phase, a film language phase, the present techniques may expand upon the learnings achieved in the prior round of tests and introduce more complex cinematic ideas of composition, character staging, lighting, contrast ratios, color and various forms of cinematographic camera movements. This phase may be designed to teach AI the standards and nomenclature of filmmakers.

Goals of the second phase of shooting may include adding in more of the art of cinema to the scenes presented. These tableaus may be intended to add to the film language we are building up within the datasets captured. In this phase, the present techniques may include descriptions of aspects like framing and composition, a range of lighting styles—starting from basic single sources from various directions and evolving to more complex combinations of these varied lighting forms—as well as hard light vs. soft light In some aspects, shooting motion picture film iterations to distinguish emulsion-based image rendering from digital imagers may be performed. Film grain profiles relative to exposure (and various lab developing techniques) may be included as a series of tests. Legacy motion picture film stock emulsion and lab processes may be an "X factor" that can be quantified in terms of the effect of shooting on film negative as opposed to digitally-acquired imagery.

This shooting may include cinematic parameters, such as the following:

Cinematic Parameters:
 Staging/Blocking:
  The "Dance" of the actors and the camera.
  Movement with Movement.
 Composition Fundamentals:
  Wide
  Cowboy
  Medium
  Close
  ECU
  Insert
  Master
  Single
  Two Shot
  Three Shot
  OTS
   French Over
 Lighting Styles: (Programmed Lighting Board)
  Top Light
  Front Light
  Side Light
   Fill Light (Ratios)
  Back Light
  Hard Light
  Soft Light
  Color
  Color Contrast
 Film Cameras:
  Film Stocks
   Various ISO Stocks
    Exposure Range?
     Film Grain Profiles
  Film Lab Processes:
   Silver Retention (ENR, CCE, ACE, LTC, Bleach Bypass)
   Push/Pull To train the generative AI to think like a filmmaker, the AI model may need to have the basic building blocks of cinematics at hand. Thus, the present techniques may start from the ground up and teach the model what a wide shot is, what an over the shoulder is, etc. For this phase of the shoot, the present techniques may utilize both static mannequin as our subjects, as well as live actors to eventually include the "human" element to the model teaching. The present techniques may run motion control camera through an array of camera positions and composition sizes, changing both the physical relationship between the two, as well as changing focal lengths for a comparable composition, but with the perspective affected due to the relative proximity of the camera. The present techniques may apply a Stype Follower tracking system (in conjunction with witness cameras placed to capture all of the contributing components on the stage) to provide additional information to be gleaned from this set of data inputs.

Training the AI model may include providing training examples of different shot compositions. These may include a wide, cowboy, medium or closeup; an over the shoulder or an insert shot. Each of these standard shot types may be illustrated in terms of camera and lenses and typical examples of them. Relatedly, blocking and staging may be conveyed to AI. Movement with movement may be used as a mechanism to convey staging, including when to move the camera to track an actor or object, and how the "dance" of actors affects the shot choice as well as editorial options.

Lighting is an influential factor in crafting mood in visual storytelling. Thus, the present techniques may include training the AI on an array of lighting angles and qualities to help lay that bedrock aspect of cinematography to its repertoire. Now, by its design, this phase will utilize many more moving parts and therefore changing variables than the first part of our data collection. This may include moving mannequins, lights, cameras, markers, and the random human factor, etc. But this is the phase that introduces the more subjective and creative aspects of filmmaking to the training process.

Lighting:

Part of training the AI model to think like a filmmaker or a cinematographer is to teach it about the various angles and qualities of light and its terminology. The present techniques may program a series of lights on a dimmer board to illustrate the various types of lighting used in cinematic storytelling (e.g., front light, back light, side light, top light, back light) as well as changing the quality of those sources, hard vs. soft.

In addition to (or alternative to) human subjects, phase two may use three or more different painted mannequins (though often only two in shot may be used for a given composition setup). The mannequins may be fixed, rigid to the stage floor to assure there is no possibility of them being moved between iterations. Then, in additional to the motion control platform and varied lens choices for the camera, phase two may require a broader range of grip and lighting tools to realize the various designed inputs used to train the AI model.

Exemplary Aspects

The various embodiments described above can be combined to provide further embodiments. All U.S. patents, U.S. patent application publications, U.S. patent application, foreign patents, foreign patent application and non-patent publications referred to in this specification and/or listed in the Application Data Sheet are incorporated herein by reference, in their entirety. Aspects of the embodiments can be modified if necessary to employ concepts of the various patents, applications, and publications to provide yet further embodiments.

These and other changes can be made to the embodiments in light of the above-detailed description. In general, in the following claims, the terms used should not be construed to limit the claims to the specific embodiments disclosed in the specification and the claims but should be construed to include all possible embodiments along with the full scope of equivalents to which such claims are entitled. Accordingly, the claims are not limited by the disclosure.

Aspects of the techniques described in the present disclosure may include any of the following aspects, either alone or in combination:

1. A computing system comprising a processor and a memory having stored thereon computer-executable instructions that, when executed, cause the computing system to: receive metadata related to filmmaking techniques, including camera settings, shot composition, and lighting setups; process the received metadata to generate video content that simulates professional filmmaking techniques; and integrate Lidar data with the processed metadata to enhance the generated video content with a three-dimensional understanding of space and object relationships.

2. The computing system of aspect 1, further comprising instructions that cause the computing system to adjust the generated video content based on dynamic scene changes documented in the metadata.

3. The computing system of any of aspects 1-2, further comprising instructions that cause the computing system to systematically alter key filmmaking variables in the metadata to simulate the impact of each element on the final video output.

4. The computing system of any of aspects 1-3, further comprising instructions that cause the computing system to simulate camera movements within the generated video content based on the processed metadata.

5. The computing system of any of aspects 1-4, further comprising instructions that cause the computing system to adjust lighting within the generated video content in post-production based on the processed metadata.

6. The computing system of any of aspects 1-5, further comprising instructions that cause the computing system to ensure narrative coherence across generated scenes based on the processed metadata.

7. The computing system of any of aspects 1-6, further comprising instructions that cause the computing system to interface with existing large language models for video processing to enhance the generated video content with advanced filmmaking capabilities.

8. A computer-implemented method comprising: receiving metadata related to filmmaking techniques, including camera settings, shot composition, and lighting setups; processing the received metadata to generate video content that simulates professional filmmaking techniques; and integrating Lidar data with the processed metadata to enhance the generated video content with a three-dimensional understanding of space and object relationships.

9. The method of aspect 8, further comprising adjusting the generated video content based on dynamic scene changes documented in the metadata.

10. The method of any of aspects 8-9, further comprising systematically altering key filmmaking variables in the metadata to simulate the impact of each element on the final video output.

11. The method of any of aspects 8-10, further comprising simulating camera movements within the generated video content based on the processed metadata.

12. The method of any of aspects 8-11, further comprising adjusting lighting within the generated video content in post-production based on the processed metadata.

13. The method of any of aspects 8-12, further comprising ensuring narrative coherence across generated scenes based on the processed metadata.

14. The method of any of aspects 8-13, further comprising interfacing with existing large language models for video processing to enhance the generated video content with advanced filmmaking capabilities.

15. A computer-readable medium having stored thereon instructions that when executed cause a computer to perform: receiving metadata related to filmmaking techniques, including camera settings, shot composition, and lighting setups; processing the received metadata to generate video content that simulates professional filmmaking techniques; and integrating Lidar data with the processed metadata to enhance the generated video content with a three-dimensional understanding of space and object relationships.

16. The computer-readable medium of aspect 15, further comprising instructions that cause the computer to adjust the generated video content based on dynamic scene changes documented in the metadata.

17. The computer-readable medium of any of aspects 15-16, further comprising instructions that cause the computer to systematically alter key filmmaking variables in the metadata to simulate the impact of each element on the final video output.

18. The computer-readable medium of any of aspects 15-17, further comprising instructions that cause the computer to simulate camera movements within the generated video content based on the processed metadata.

19. The computer-readable medium of any of aspects 15-18, further comprising instructions that cause the computer to adjust lighting within the generated video content in post-production based on the processed metadata.

20. The computer-readable medium of any of aspects 15-19, further comprising instructions that cause the computer to ensure narrative coherence across generated scenes based on the processed metadata.

21. A computer-implemented method for generating video content that simulates professional filmmaking techniques, the method comprising: receiving metadata related to filmmaking techniques, including camera settings, shot composition, and lighting setups; processing the received metadata to generate video content that simulates professional filmmaking techniques; integrating Lidar data with the processed metadata to enhance the generated video content with a three-dimensional understanding of space and object relationships; adjusting the generated video content based on dynamic scene changes documented in the metadata; systematically altering key filmmaking variables in the metadata to simulate the impact of each element on the final video output; simulating camera movements within the generated video content based on the processed metadata; adjusting lighting within the generated video content in post-production based on the processed metadata; and determining narrative coherence across generated scenes based on the processed metadata.

22. The method of any of aspects 21, wherein the receiving metadata step includes collecting detailed metadata that describes various aspects of professional filmmaking, including specifics about lens types, camera settings such as focal length and depth of field, and the composition of shots.

23. The method of any of aspects 21-22, wherein the processing step involves custom AI algorithms specifically designed to interpret the detailed metadata, enabling the AI to replicate or innovate on professional filmmaking techniques in its generated content.

24. The method of any of aspects 21-23, wherein the integrating Lidar data step includes accurately simulating professional camera techniques and enhancing the realism and quality of the generated video content by correlating two-dimensional video data with three-dimensional spatial data.

25. The method of any of aspects 21-24, wherein the adjusting the generated video content step involves dynamically adjusting the generated video content to reflect changes in the scene, as documented in the metadata, thereby maintaining narrative coherence and ensuring that the generated video content accurately reflects the intended filmmaking techniques.

26. The method of any of aspects 21-25, wherein the systematically altering key filmmaking variables step includes automatically training the AI models with different filmmaking variables to understand their impact on the final video output, thereby enabling the trained AI models to generate video content that adheres to professional filmmaking standards.

27. The method of any of aspects 21-26, further comprising interfacing with existing large language models for video processing to enhance the generated video content with advanced filmmaking capabilities, including transfer learning and fine-tuning of existing models to incorporate the detailed metadata and Lidar data.

28. A system for generating video content that simulates professional filmmaking techniques, the system comprising: one or more processors; and one or more memories having stored thereon instructions that when executed by the one or more processors, cause the system to: receive metadata related to filmmaking techniques, including camera settings, shot composition, and lighting setups; process the received metadata to generate video content that simulates professional filmmaking techniques; integrate Lidar data with the processed metadata to enhance the generated video content with a three-dimensional understanding of space and object relationships; adjust the generated video content based on dynamic scene changes documented in the metadata; systematically alter key filmmaking variables in the metadata to simulate the impact of each element on the final video output; simulate camera movements within the generated video content based on the processed metadata; adjust lighting within the generated video content in post-production based on the processed metadata; determine narrative coherence across generated scenes based on the processed metadata; and interface with existing large language models for video processing to enhance the generated video content with advanced filmmaking capabilities.

29. The system of aspect 28, wherein the instructions further cause the system to collect detailed metadata that describes various aspects of professional filmmaking, including specifics about lens types, camera settings such as focal length and depth of field, and the composition of shots.

30. The system of any of aspects 28-29, wherein the instructions further cause the system to use custom AI algorithms specifically designed to interpret the detailed metadata, enabling the AI to replicate or innovate on professional filmmaking techniques in its generated content.

31. The system of any of aspects 28-30, wherein the instructions further cause the system to accurately simulate professional camera techniques and enhance the realism and quality of the generated video content by correlating two-dimensional video data with three-dimensional spatial data.

32. The system of any of aspects 28-31, wherein the instructions further cause the system to dynamically adjust the generated video content to reflect changes in the scene, as documented in the metadata, to maintain narrative coherence and ensure that the generated video content accurately reflects the intended filmmaking techniques.

33. The system of any of aspects 28-32, wherein the instructions further cause the system to automatically train the AI models with different filmmaking variables to understand their impact on the final video output, enabling the trained AI models to generate video content that adheres to professional filmmaking standards.

34. The system of any of aspects 28-33, wherein the instructions further cause the system to use the strengths of LMs through specialized interface protocols to produce content that adheres to professional filmmaking standards, including transfer learning and fine-tuning of existing models to incorporate the detailed metadata and Lidar data.

35. A non-transitory computer-readable medium having stored thereon instructions that when executed by one or more processors of a system, cause the system to perform a method for generating video content that simulates professional filmmaking techniques, the method comprising: receiving metadata related to filmmaking techniques, including camera settings, shot composition, and lighting setups; processing the received metadata to generate video content that simulates professional filmmaking techniques; integrating Lidar data with the processed metadata to enhance the generated video content with a three-dimensional understanding of space and object relationships; adjusting the generated video content based on dynamic scene changes documented in the metadata; systematically altering key filmmaking variables in the metadata to simulate the impact of each element on the final video output; simulating camera movements within the generated video content based on the processed metadata; adjusting lighting within the generated video content in post-production based on the processed metadata; determining narrative coherence across generated scenes based on the processed metadata; and interfacing with existing large language models for video processing to enhance the generated video content with advanced filmmaking capabilities.

36. The computer-readable medium of aspect 35, wherein the instructions further cause the system to collect detailed metadata that describes various aspects of professional filmmaking.

37. The computer-readable medium of any of aspects 35-36, wherein the instructions further cause the system to use custom AI algorithms for processing the collected metadata.

38. The computer-readable medium of any of aspects 35-37, wherein the instructions further cause the system to simulate professional camera techniques by integrating Lidar data with the processed metadata.

39. The computer-readable medium of any of aspects 35-38, wherein the instructions further cause the system to dynamically adjust the generated video content based on documented scene changes.

40. The computer-readable medium of any of aspects 35-39, wherein the instructions further cause the system to interface with existing large language models to enhance the generated video content with filmmaking capabilities.

41. A computer-implemented method for generating synthetic data for training machine learning models to simulate professional filmmaking techniques, the method comprising: generating an exhaustive list of all tasks and shots required, including lens type, camera settings, and shot types; configuring a studio with controlled lighting and equipping cameras with locators for precise spatial mapping; performing metadata encoding and weighting, including encoding each piece of metadata into a format that the AI model can process and generating weights corresponding to the importance of each type of metadata; managing metadata and data, including embedding video files with metadata and establishing a data management system for organizing video and sensor data; causing a user interface to be displayed that accepts prompts specifying video characteristics and using metadata-driven weights to influence the generation process; performing integrative training with one or more models, including integrating encoded metadata into training datasets for the AI models and implementing specialized artificial neural network layers for metadata interpretation; developing and training AI models, including feeding collected data into the foundational model and using AI training techniques; performing quality control and iteration, including continuously reviewing generated video against professional standards and adjusting training parameters based on output quality; and implementing and scaling, including deploying the model in test environments.

42. The method of any of aspects 41, wherein the generating an exhaustive list step is performed by the filmmaking variable simulation module.

43. The method of any of aspects 41-42, wherein the configuring a studio step is executed by the metadata processing module and includes receiving data from both hardware and software components for environment control and data capture.

44. The method of any of aspects 41-43, wherein the performing metadata encoding and weighting step is managed by the metadata processing module, which includes software instructions and algorithms for encoding and weighting.

45. The method of any of aspects 41-44, wherein the managing metadata and data step includes storing the video files on one or more electronic databases.

46. The method of any of aspects 41-45, wherein the displaying a user interface step is performed by the prompt processing module in conjunction with the user interface, which interprets user inputs and generates synthetic data accordingly.

47. The method of any of aspects 41-46, wherein the performing integrative training step is performed by the language model training module and language model operation module, and includes incorporating synthetic data into the learning process.

48. A computing system for generating synthetic data to train machine learning models for simulating professional filmmaking techniques, the system comprising: one or more processors; and one or more memories having stored thereon instructions that when executed by the one or more processors, cause the system to: generate an exhaustive list of all tasks and shots required, including lens type, camera settings, and shot types; configure a studio with controlled lighting and equip cameras with locators for precise spatial mapping; perform metadata encoding and weighting, including encoding each piece of metadata into a format that the AI model can process and generating weights corresponding to the importance of each type of metadata; manage metadata and data, including embedding video files with metadata and establishing a data management system for organizing video and sensor data; cause a user interface to be displayed that accepts prompts specifying video characteristics and use metadata-driven weights to influence the generation process; perform integrative training with one or more AI models, including integrating encoded metadata into training datasets for the AI models and implementing specialized artificial neural network layers for metadata interpretation; develop and train AI models, including feeding collected data into the foundational model and using AI training techniques; perform quality control and iteration, including continuously reviewing generated video against professional standards and adjusting training parameters based on output quality; and implement and scale, including deploying the model in test environments.

49. The system of aspect 48, wherein the instructions further cause the system to perform the generating an exhaustive list step by the filmmaking variable simulation module.

50. The system of any of aspects 48-49, wherein the instructions further cause the system to execute the configuring a studio step by the metadata processing module and include receiving data from both hardware and software components for environment control and data capture.

51. The system of any of aspects 48-50, wherein the instructions further cause the system to manage the performing metadata encoding and weighting step by the metadata processing module, which includes software instructions and algorithms for encoding and weighting.

52. The system of any of aspects 48-51, wherein the instructions further cause the system to include storing the video files on one or more electronic databases in the managing metadata and data step.

53. The system of any of aspects 48-52, wherein the instructions further cause the system to perform the displaying a user interface step by the prompt processing module in conjunction with the user interface, which interprets user inputs and generates synthetic data accordingly.

54. The system of any of aspects 48-53, wherein the instructions further cause the system to perform the performing integrative training step by the language model training module and language model operation module, and include incorporating synthetic data into the learning process.

55. A non-transitory computer-readable medium having stored thereon instructions that when executed by one or more processors of a system, cause the system to perform a method for generating and utilizing synthetic data to train machine learning models for simulating professional filmmaking techniques, the method comprising: generating a detailed list of filmmaking tasks and shots, including specifications on lens type, camera settings, and shot types; configuring a controlled studio environment with precise spatial mapping capabilities; encoding filmmaking metadata for AI model processing and assigning significance weights to each metadata type; organizing and managing video files embedded with metadata within a comprehensive data management system; causing a user interface to be displayed for inputting video characteristic prompts influenced by metadata-driven weights; integrating encoded metadata with one or more AI models for enhanced training, including the use of specialized neural network layers for metadata interpretation; developing and refining AI models through advanced training techniques and collected data ingestion; conducting ongoing quality assessments of generated video content against professional standards and adjusting training parameters as needed; and deploying the trained models in test environments and gather user feedback for continuous improvement.

56. The computer-readable medium of aspect 55, wherein the instructions further cause the system to execute the generating a detailed list of filmmaking tasks and shots by a filmmaking variable simulation module, ensuring comprehensive coverage of professional filmmaking requirements.

57. The computer-readable medium of any of aspects 55-56, wherein the instructions further cause the system to execute the configuring a controlled studio environment by the metadata processing module, facilitating precise data capture from both hardware and software components for environment control.

58. The computer-readable medium of any of aspects 55-57, wherein the instructions further cause the system to manage the encoding filmmaking metadata and assigning significance weights by the metadata processing module, utilizing specific algorithms and software instructions for accurate metadata handling.

59. The computer-readable medium of any of aspects 55-58, wherein the instructions further cause the system to include utilizing electronic databases capable of efficiently handling extensive video and sensor data volumes in the organizing and managing video files within a data management system.

60. The computer-readable medium of any of aspects 55-59, wherein the instructions further cause the system to perform the displaying a user interface for video characteristic prompts and integrating encoded metadata with one or more AI models for training by the prompt processing module and the language model training module, respectively, ensuring direct influence of user inputs on synthetic data generation and AI model training processes.

61. A computer-implemented method for performing single-parameter variation to train machine learning models for simulating professional filmmaking techniques, comprising: configuring a multi-camera environment to capture a scene from various angles and perspectives, ensuring comprehensive coverage and data diversity; selecting a single camera parameter to vary across a sequence of shots while maintaining all other camera parameters constant to isolate the effects of the varied parameter; capturing a series of shots with incremental changes to the selected parameter; generating metadata for each shot, detailing the camera settings and the specific parameter variation; processing the captured shots to understand the impact of the varied parameter on the scene; and adjusting the AI model based on the processing to enhance the AI model's understanding of the parameter's impact.

62. The method of aspect 61, wherein configuring a multi-camera environment is executed by the metadata processing module, facilitating precise data capture from multiple perspectives for environment control.

63. The method of any of aspects 61-62, wherein selecting a single camera parameter to vary and maintaining all other camera parameters constant are managed by the dynamic scene adjustment module, ensuring focused analysis on the impact of the single varied parameter.

64. The method of any of aspects 61-63, wherein capturing a series of shots with incremental changes to the selected parameter is performed by the metadata processing module, which includes instructions for data capture and storage for each shot in the sequence.

65. The method of any of aspects 61-64, wherein generating metadata for each shot is executed by the metadata processing module, ensuring detailed documentation of camera settings and parameter variations for each captured shot.

66. The method of any of aspects 61-65, wherein processing the captured shots to understand the impact of the varied parameter and adjusting the AI model based on the processing are facilitated by the language model training module, utilizing generated metadata to correlate changes in the parameter with changes in the captured shots and refine the AI model's understanding accordingly.

67. The method of any of aspects 61-66, wherein adjusting the AI model based on the processing of the captured shots includes implementing a feedback mechanism that dynamically refines the AI model's training parameters based on structured feedback mechanisms to improve the AI model's ability to generate video content that closely mimics professional filmmaking techniques, with the feedback mechanism utilizing real-world application insights and user feedback to align the AI model with current filmmaking practices and technologies.

68. A computing system for performing single-parameter variation to train machine learning models for simulating professional filmmaking techniques, the system comprising: one or more processors; and one or more memories having stored thereon instructions that when executed by the one or more processors, cause the system to: configure a multi-camera environment to capture a scene from various angles and perspectives, ensuring comprehensive coverage and data diversity; select a single camera parameter to vary across a sequence of shots while maintaining all other camera parameters constant to isolate the effects of the varied parameter; capture a series of shots with incremental changes to the selected parameter; generate metadata for each shot, detailing the camera settings and the specific parameter variation; process the captured shots to understand the impact of the varied parameter on the scene; and adjust the AI model based on the processing to enhance the AI model's understanding of the parameter's impact.

69. The computing system of aspect 68, wherein the instructions further cause the system to execute the configuring a multi-camera environment by the metadata processing module, facilitating precise data capture from multiple perspectives for environment control.

70. The computing system of any of aspects 68-69, wherein the instructions further cause the system to manage the selecting a single camera parameter to vary and maintaining all other camera parameters constant by the dynamic scene adjustment module, ensuring focused analysis on the impact of the single varied parameter.

71. The computing system of any of aspects 68-70, wherein the instructions further cause the system to perform the capturing a series of shots with incremental changes to the selected parameter by the metadata processing module, which includes instructions for data capture and storage for each shot in the sequence.

72. The computing system of any of aspects 68-71, wherein the instructions further cause the system to execute the generating metadata for each shot by the metadata processing module, ensuring detailed documentation of camera settings and parameter variations for each captured shot.

73. The computing system of any of aspects 68-72, wherein the instructions further cause the system to facilitate the processing the captured shots to understand the impact of the varied parameter and adjusting the AI model based on the processing by the language model training module, utilizing generated metadata to correlate changes in the parameter with changes in the captured shots and refine the AI model's understanding accordingly.

74. A non-transitory computer-readable medium having stored thereon computer-executable instructions that, when executed, cause a computer to: configure a multi-camera environment to capture a scene from various angles and perspectives, ensuring comprehensive coverage and data diversity; select a single camera parameter to vary across a sequence of shots while maintaining all other camera parameters constant to isolate one or more effects of the varied parameter; capture a series of shots with incremental changes to the selected parameter; generate metadata for each shot, detailing one or more camera settings and specific parameter variation; process the captured shots to understand an impact of the varied parameter on the scene; and adjust an AI model based on the processing of the captured shots to enhance the AI model's understanding of the parameter's impact.

75. The non-transitory computer-readable medium of aspect 74, having stored thereon further computer-executable instructions that, when executed, cause a computer to: cause the system to capture data from multiple perspectives for environment control.

76. The non-transitory computer-readable medium of any of aspects 74-75, having stored thereon further computer-executable instructions that, when executed, cause a computer to: analyze the impact of the single varied parameter.

77. The non-transitory computer-readable medium of any of aspects 74-76, having stored thereon further computer-executable instructions that, when executed, cause a computer to: capture detailed documentation of camera settings and parameter variations for each captured shot in the sequence.

78. The non-transitory computer-readable medium of any of aspects 74-77, having stored thereon further computer-executable instructions that, when executed, cause a computer to: capture detailed documentation of camera settings and parameter variations for each captured shot.

79. The non-transitory computer-readable medium of any of aspects 74-78, having stored thereon further computer-executable instructions that, when executed, cause a computer to: correlate changes in the parameter with changes in the captured shots and refine an AI model's training parameters accordingly.

80. The non-transitory computer-readable medium of any of aspects 74-79, having stored thereon further computer-executable instructions that, when executed, cause a computer to: implementing a feedback mechanism that dynamically refines the AI model's training parameters based on structured feedback mechanisms to improve the AI model's ability to generate video content that closely mimics professional filmmaking techniques, with the feedback mechanism utilizing real-world application insights and user feedback to align the AI model with current filmmaking practices and technologies.

81. A computer-implemented method for generating video content with a predetermined style using artificial intelligence, the method comprising: capturing one or more control images corresponding to a scene using standard digital video as a baseline; capturing one or more test images of the scene using different film formats to document visual effects; applying post-production alterations to the captured footage; constructing a training dataset that includes a variety of shots captured under varied lighting conditions; training an AI model with paired comparisons to enable it to learn specific visual signatures; reviewing footage generated by the AI model to assess its authenticity and using feedback to refine the model; and optimizing learning cycles to enhance an efficiency of the training.

82. The method of aspect 81, wherein capturing the test images using different film formats includes using formats such as 35 mm, 16 mm, 8 mm, and Super 8 mm.

83. The method of any of aspects 81-82, wherein applying post-production alterations includes techniques like push processing and bleach bypass.

84. The method of any of aspects 81-83, wherein constructing the training dataset includes shots such as tight face shots, medium shots, and wide shots.

85. The method of any of aspects 81-84, wherein training the AI model involves using control versus modified footage for paired comparisons.

86. The method of any of aspects 81-85, wherein reviewing the footage includes assessing adherence to expected filmic qualities.

87. The method of any of aspects 81-86, wherein optimizing learning cycles involves scaling down data acquisition as the AI shows proficiency.

88. A computing system for generating video content with a predetermined style using artificial intelligence, the system comprising: one or more processors; and one or more memories having stored thereon instructions that when executed by the one or more processors, cause the system to: capture one or more control images corresponding to a scene using standard digital video as a baseline; capture one or more test images of the scene using different film formats to document visual effects; apply post-production alterations to the captured footage; construct a training dataset that includes a variety of shots captured under varied lighting conditions; train an AI model with paired comparisons to enable it to learn specific visual signatures; review footage generate by the AI model to assess its authenticity and use feedback to refine the model; and optimize learning cycles to enhance an efficiency of the training.

89. The system of aspect 88, wherein the instructions further cause the system to capture the test images using film formats such as 35 mm, 16 mm, 8 mm, and Super 8 mm.

90. The system of any of aspects 88-89, wherein the instructions further cause the system to apply post-production alterations including techniques like push processing and bleach bypass.

91. The system of any of aspects 88-90, wherein the instructions further cause the system to construct a training dataset including shots such as tight face shots, medium shots, and wide shots.

92. The system of aspect 8, wherein the instructions further cause the system to train the AI using control versus modified footage for paired comparisons.

93. The system of any of aspects 88-92, wherein the instructions further cause the system to review the footage to assess adherence to expected filmic qualities.

94. The system of any of aspects 88-93, wherein the instructions further cause the system to optimize learning cycles by scaling down data acquisition as the AI shows proficiency.

95. A non-transitory computer-readable medium having stored thereon instructions that when executed by one or more processors of a system, cause the system to perform a method for generating video content with a predetermined style using artificial intelligence, the method comprising: capturing one or more control images corresponding to a scene using standard digital video as a baseline; capturing one or more test images using different film formats to document visual effects; applying post-production alterations to the captured footage; constructing a training dataset that includes a variety of shots captured under varied lighting conditions; training an AI model with paired comparisons to enable it to learn specific visual signatures; reviewing footage generated by the AI model to assess its authenticity and using feedback to refine the model; and optimizing learning cycles to enhance an efficiency of the training.

96. The computer-readable medium of aspect 95, wherein the instructions further cause the system to capture scenes using film formats such as 35 mm, 16 mm, 8 mm, and Super 8 mm.

97. The computer-readable medium of any of aspects 95-96, wherein the instructions further cause the system to apply post-production alterations including techniques like push processing and bleach bypass.

98. The computer-readable medium of any of aspects 95-97, wherein the instructions further cause the system to construct a training dataset including shots such as tight face shots, medium shots, and wide shots.

99. The computer-readable medium of any of aspects 95-98, wherein the instructions further cause the system to train the AI using control versus modified footage for paired comparisons.

100. The computer-readable medium of any of aspects 95-99, wherein the instructions further cause the system to review the AI-generated footage to assess adherence to expected filmic qualities.

101. A computer-implemented method for generating video content adhering to professional film standards using artificial intelligence, the method comprising: identifying and prioritizing essential components of a training dataset; selectively sampling data that is most representative for foundational learning of an AI model; generating simulations and synthetic data to expand a range of scenarios for AI learning; implementing active learning and feedback loops to iteratively improve the model; conducting quality control and iteration to ensure high standards of quality; implementing the AI model in real-world filmmaking environments; and monitoring, evaluating, and projecting future applications of the AI model.

102. The method of aspect 101, wherein focusing on core elements includes prioritizing data based on focal lengths, camera settings, and shot types.

103. The method of any of aspects 101-102, wherein selectively sampling data focuses on common filmmaking scenarios and standard camera configurations.

104. The method of any of aspects 101-103, wherein generating simulations and synthetic data includes creating virtual environments and actors.

105. The method of any of aspects 101-104, wherein implementing active learning and feedback loops includes querying users and incorporating their responses into the learning process.

106. The method of any of aspects 101-105, wherein conducting quality control and iteration ensures the AI model meets film industry standards.

107. The method of any of aspects 101-106, wherein implementing and scaling focuses on deploying the AI model for broader applications.

108. The method of any of aspects 101-107, wherein monitoring, evaluating, and projecting future applications sustains the AI model's relevance in filmmaking.

109. A computing system for generating video content adhering to professional film standards using artificial intelligence, the system comprising: one or more processors; and one or more memories having stored thereon instructions that when executed by the one or more processors, cause the system to: identify and prioritize essential components of a training dataset; selectively sample data that is most representative for foundational learning of an AI model; generate simulations and synthetic data to expand a range of scenarios for AI learning; implement active learning and feedback loops to iteratively improve the model; conduct quality control and iteration to ensure high standards of quality; implement the AI model in real-world filmmaking environments; and monitor, evaluate, and project future applications of the AI model.

110. The system of aspect 109, wherein the instructions further cause the system to prioritize data based on focal lengths, camera settings, and shot types when focusing on core elements.

111. The system of any of aspects 109-110, wherein the instructions further cause the system to focus on common filmmaking scenarios and standard camera configurations when selectively sampling data.

112. The system of any of aspects 109-111, wherein the instructions further cause the system to create virtual environments and actors when generating simulations and synthetic data.

113. The system of any of aspects 109-112, wherein the instructions further cause the system to query users and incorporate their responses into the learning process when implementing active learning and feedback loops.

114. The system of any of aspects 109-113, wherein the instructions further cause the system to ensure the AI model meets film industry standards when conducting quality control and iteration.

115. The system of any of aspects 109-114, wherein the instructions further cause the system to focus on deploying the AI model for broader applications when implementing and scaling.

116. The system of any of aspects 109-115, wherein the instructions further cause the system to sustain the AI model's relevance in filmmaking when monitoring, evaluating, and projecting future applications.

117. A non-transitory computer-readable medium having stored thereon instructions that when executed by one or more processors of a system, cause the system to perform a method for generating video content adhering to professional film standards using artificial intelligence, the method comprising: identifying and prioritizing essential components of a training dataset; selectively sampling data that is most representative for foundational learning of an AI model; generating simulations and synthetic data to expand a range of scenarios for AI learning; implementing active learning and feedback loops to iteratively improve the model; conducting quality control and iteration to ensure high standards of quality; implementing and scaling the AI model in real-world filmmaking environments; and monitoring, evaluating, and projecting future applications of the AI model.

118. The computer-readable medium of aspect 117, wherein the instructions further cause the system to prioritize data based on focal lengths, camera settings, and shot types when focusing on core elements.

119. The computer-readable medium of any of aspects 117-118, wherein the instructions further cause the system to focus on common filmmaking scenarios and standard camera configurations when selectively sampling data.

120. The computer-readable medium of any of aspects 117-119, wherein the instructions further cause the system to create virtual environments and actors when generating simulations and synthetic data.

121. A computer-implemented method for delivering AI-based filmmaking tools to one or more users, the method comprising: capturing a control image of a scene using standard digital video as a baseline for comparison; capturing a test image of the scene using one or more different film formats to document visual effects; using notable film stocks within each format for their distinctive looks; causing footage to be shot with the intention of processing it with specific techniques to affect the visual outcome; applying film processing techniques to see their impact on color and texture; and leveraging integration techniques for existing video large language models and simulation-driven learning environments.

122. The method of aspect 121-121, wherein capturing the same scenes using different film formats includes formats such as 35 mm, 16 mm, 8 mm, and Super 8 mm.

123. The method of aspect 121-122, wherein using notable film stocks includes Kodak Portra for color rendition and Ilford Delta for black and white photography.

124. The method of any of aspects 121-123, wherein causing footage to be shot with the intention of processing it includes techniques like pushing the film one stop.

125. The method of any of aspects 121-124, wherein applying film processing techniques includes bleach bypass.

126. The method of any of aspects 121-125, wherein leveraging integration techniques includes seamless integration with existing large language models for video processing.

127. The method of any of aspects 121-126, further comprising training a video large language model using the captured scenes, processed footage, and applied film processing techniques as training data, wherein the training includes adjusting the model to recognize and replicate the visual effects associated with different film formats, stocks, and processing techniques, thereby enhancing the model's capability to generate video content that mimics professional film production standards.

128. A computing system for delivering AI-based filmmaking tools to one or more users, the system comprising: one or more processors; and one or more memories having stored thereon instructions that when executed by the one or more processors, cause the system to: capture a control image of a scene using standard digital video as a baseline for comparison; capture a test image of the scene using one or more different film formats to document visual effects; use notable film stocks within each format for their distinctive looks; cause footage to be shot with the intention of processing it with specific techniques to affect the visual outcome; apply film processing techniques to see their impact on color and texture; and apply integration techniques for existing video large language models and simulation-driven learning environments.

129. The system of aspect 128, wherein the instructions further cause the system to capture scenes using film formats such as 35 mm, 16 mm, 8 mm, and Super 8 mm.

130. The system of any of aspects 128-129, wherein the instructions further cause the system to use notable film stocks including Kodak Portra for color rendition and Ilford Delta for black and white photography.

131. The system of any of aspects 128-130, wherein the instructions further cause the system to cause footage to be shot with techniques like pushing the film one stop.

132. The system of any of aspects 128-131, wherein the instructions further cause the system to apply film processing techniques including bleach bypass.

133. The system of any of aspects 128-132, wherein the instructions further cause the system to apply integration techniques with existing large language models for video processing.

134. A non-transitory computer-readable medium having stored thereon instructions that when executed by one or more processors of a system, cause the system to perform a method for delivering AI-based filmmaking tools to one or more users, the method comprising: capturing a control image of a scene using standard digital video as a baseline for comparison; capturing a test image of the scene using one or more different film formats to document visual effects; using notable film stocks within each format for their distinctive looks; causing footage to be shot with the intention of processing it with specific techniques to affect the visual outcome; applying film processing techniques to see their impact on color and texture; and leveraging integration techniques for existing video large language models and simulation-driven learning environments.

135. The computer-readable medium of aspect 134, wherein the instructions further cause the system to capture scenes using film formats such as 35 mm, 16 mm, 8 mm, and Super 8 mm.

136. The computer-readable medium of any of aspects 134-135, wherein the instructions further cause the system to use notable film stocks including Kodak Portra for color rendition and Ilford Delta for black and white photography.

137. The computer-readable medium of any of aspects 134-136, wherein the instructions further cause the system to cause footage to be shot with techniques like pushing the film one stop.

138. The computer-readable medium of any of aspects 134-137, wherein the instructions further cause the system to apply film processing techniques including bleach bypass.

139. The computer-readable medium of any of aspects 134-138, wherein the instructions further cause the system to apply integration techniques with existing large language models for video processing.

140. The computer-readable medium of any of aspects 134-139, wherein the instructions further cause the system to train a video large language model using the captured scenes, processed footage, and applied film processing techniques as training data, wherein the training includes adjusting the model to recognize and replicate the visual effects associated with different film formats, stocks, and processing techniques, thereby enhancing the model's capability to generate video content that mimics professional film production standards.

141. A method for advanced cinematic data collection and processing for artificial intelligence (AI)-driven video production, the method comprising: generating a metadata framework that injects detail about filmmaking techniques directly into a learning process of an AI model, including information on camera settings, shot composition, lighting setups, and dynamic scene changes; systematically altering key variables to teach the AI model an impact of each filmmaking element on video output; and training the AI model with detailed metadata, including spatial information from Lidar data and filmmaking variables, to generate video content to match technical and/or creative criteria.

142. The method of aspect 141, further comprising simulating camera movements within the generated video content based on the processed metadata.

143. The method of any of aspects 141-142, further comprising enabling the AI to replicate or innovate on professional filmmaking techniques in the generated content.

144. The method of any of aspects 141-143, further comprising adjusting lighting within the generated video content in post-production based on the processed metadata.

145. The method of any of aspects 141-144, further comprising generating content narrative having coherence across generated scenes based on the processed metadata.

146. The method of any of aspects 141-145, further comprising employing a feedback mechanism that dynamically refines one or more training parameters of the AI model based on structured feedback mechanisms, enabling iterative improvements in the AI model to produce video content that aligns with the criteria.

147. The method of any of aspects 141-146, further comprising utilizing a simulation-driven learning environment to generate virtual scenes with adjustable parameters, allowing the AI model to learn from a wide range of hypothetical filmmaking scenarios without the need for continuous acquisition of new real-world video data.

148. A system for advanced cinematic data collection and processing for AI-driven video production, the system comprising: one or more processors; and one or more memories having stored thereon instructions that when executed by the one or more processors, cause the system to: develop a metadata framework that injects detail about filmmaking techniques directly into a learning process of an AI model, including information on camera settings, shot composition, lighting setups, and dynamic scene changes; systematically alter key variables to teach the AI model an impact of each filmmaking element on a video output; and train the AI model with detailed metadata, including spatial information from Lidar data and filmmaking variables, to generate video content that matches technical and/or creative criteria.

149. The system of aspect 148, wherein the instructions further cause the system to simulate camera movements within the generated video content based on the processed metadata.

150. The system of any of aspects 148-149, wherein the metadata framework enables the AI to replicate or innovate on professional filmmaking techniques in the generated content.

151. The system of any of aspects 148-150, wherein the instructions further cause the system to adjust lighting within the generated video content in post-production based on the processed metadata.

152. The system of any of aspects 148-151, wherein the instructions further cause the system to ensure narrative coherence across generated scenes based on the processed metadata.

153. The system of any of aspects 148-152, wherein the instructions further cause the system to employ a feedback mechanism that dynamically refines one or more training parameters of the AI model based on structured feedback mechanisms, enabling iterative improvements in the AI model to produce video content that aligns with the criteria.

154. A non-transitory computer-readable medium having stored thereon instructions that when executed by one or more processors of a system, cause the system to perform a method for advanced cinematic data collection and processing for AI-driven video production, the method comprising: developing a metadata framework that injects detail about filmmaking techniques directly into a learning process of an AI model, including information on camera settings, shot composition, lighting setups, and dynamic scene changes; systematically altering key variables to teach the AI model an impact of each filmmaking element on a video output; and training the AI model with detailed metadata, including spatial information from Lidar data and filmmaking variables, to generate video content that matches technical and/or creative criteria.

155. The computer-readable medium of aspect 154, wherein the instructions further cause the system to simulate camera movements within the generated video content based on the processed metadata.

156. The computer-readable medium of any of aspects 154-155, wherein the metadata framework enables the AI to replicate or innovate on professional filmmaking techniques in the generated content.

157. The computer-readable medium of any of aspects 154-156, wherein the instructions further cause the system to adjust lighting within the generated video content in post-production based on the processed metadata.

158. The computer-readable medium of any of aspects 154-157, wherein the instructions further cause the system to ensure narrative coherence across generated scenes based on the processed metadata.

159. The computer-readable medium of any of aspects 154-158, wherein the instructions further cause the system to dynamically refine one or more training parameters of the AI model based on structured feedback mechanisms, enabling iterative improvements in the AI model to produce video content that aligns with the criteria.

160. The computer-readable medium of any of aspects 154-159, wherein the instructions further cause the system to use a simulation-driven learning environment to generate virtual scenes with adjustable parameters, allowing the AI model to learn from a wide range of hypothetical filmmaking scenarios without the need for continuous acquisition of new real-world video data.

161. A computer-implemented method for integrating one or more existing video large language models (LLMs) with custom AI algorithms for filmmaking, the method comprising: interfacing with an existing video LLM; receiving detailed metadata related to professional filmmaking techniques, including camera settings, shot composition, and lighting setups; processing the received metadata to adapt the existing video LLM to generate video content that simulates professional filmmaking techniques; and integrating Lidar data with the processed metadata to enhance the generated video content with a three-dimensional understanding of space and object relationships.

162. The method of aspect 161, further comprising applying transfer learning techniques to the existing video LLM based on the processed metadata and Lidar data to refine its video content generation capabilities.

163. The method of any of aspects 161-162, further comprising fine-tuning the existing video LLM with a dataset enriched with detailed filmmaking metadata and Lidar data to match criteria associated with professional filmmaking criteria.

164. The method of any of aspects 161-163, further comprising utilizing specialized interface protocols to enable efficient knowledge transfer between the custom AI algorithms and the existing video LLM.

165. The method of any of aspects 161-164, further comprising simulating professional filmmaking techniques within the generated video content based on the processed metadata and integrated Lidar data.

166. The method of any of aspects 161-165, further comprising dynamically adjusting the generated video content based on scene changes documented in the metadata to maintain narrative coherence and adhere to professional filmmaking standards.

167. The method of any of aspects 161-166, further comprising systematically altering key filmmaking variables in the metadata to simulate an impact of each element on a video output, thereby teaching the existing video LLM to apply these variables effectively.

168. A computing system for enhancing existing video large language models (LLMs) with advanced filmmaking capabilities, the system comprising: one or more processors; and one or more memories having stored thereon computer-executable instructions that, when executed, cause the system to: receive and process metadata related to professional filmmaking techniques; integrate Lidar data with the processed metadata; and interface with an existing video LLM.

169. The system of aspect 168, further comprising instructions to apply transfer learning techniques to the existing video LLM based on the processed metadata and integrated Lidar data.

170. The system of any of aspects 161-169, further comprising instructions to fine-tune the existing video LLM with a dataset enriched with detailed filmmaking metadata and Lidar data.

171. The system of any of aspects 161-170, further comprising instructions to utilize specialized interface protocols to enable efficient knowledge transfer between one or more custom AI algorithms and the existing video LLM.

172. The system of any of aspects 161-171, further comprising instructions to simulate professional filmmaking techniques within generated video content based on the processed metadata and integrated Lidar data.

173. The system of any of aspects 161-172, further comprising instructions to adjusting generated video content based on scene changes documented in the metadata to maintain narrative coherence and adhere to filmmaking criteria.

174. The system of any of aspects 161-173, further comprising instructions to systematically altering key filmmaking variables in the metadata to simulate an impact of each element on a video output, thereby teaching the existing video LLM to apply these variables effectively.

175. A computer-readable medium having stored thereon instructions that when executed by a processor cause a system to perform: interfacing with an existing video large language model (LLM); receiving detailed metadata related to professional filmmaking techniques; processing the received metadata to adapt the existing video LLM to generate video content that simulates professional filmmaking techniques; and integrating Lidar data with the processed metadata to enhance the generated video content.

176. The computer-readable medium of aspect 175, further comprising instructions that cause the system to fine-tune the existing video LLM with a dataset enriched with detailed filmmaking metadata and Lidar data.

177. The computer-readable medium of any of aspects 161-176, further comprising instructions that cause the system to simulate professional filmmaking techniques within the generated video content based on the processed metadata and integrated Lidar data.

178. The computer-readable medium of any of aspects 161-177, further comprising instructions that cause the system to dynamically adjust the generated video content based on scene changes documented in the metadata to maintain narrative coherence and adhere to professional filmmaking standards.

179. The computer-readable medium of any of aspects 161-178, further comprising instructions that cause the system to systematically alter key filmmaking variables in the metadata to simulate an impact of each element on a video output, thereby teaching the existing video LLM to apply these variables effectively.

180. The computer-readable medium of any of aspects 161-179, further comprising instructions that cause the system to utilize specialized interface protocols to enable efficient knowledge transfer to the existing video LLM.

181. A computer-implemented method for training one or more artificial intelligence (AI) models using both synthetic and real-world filmmaking data, the method comprising: receiving detailed metadata related to professional filmmaking techniques, including camera settings, shot composition, and lighting setups; integrating Lidar data with the received metadata to provide a three-dimensional understanding of space and object relationships; generating synthetic data based on the integrated metadata and Lidar data to simulate professional filmmaking techniques; incorporating feedback from actual film production use to adjust model parameters to align with filmmaking practices and technologies; and training the one or more AI models using a combination of the synthetic data and real-world filmmaking data to enhance their video content generation capabilities.

182. The method of aspect 181, further comprising leveraging dailies as a source of real-world filmmaking data, wherein the dailies are annotated with detailed metadata and used to refine the AI models' understanding of professional filmmaking standards.

183. The method of any of aspects 181-182, further comprising implementing continuous learning mechanisms that dynamically adjust the AI models based on structured feedback mechanisms, enabling iterative improvements in video content generation.

184. The method of any of aspects 181-183, further comprising simulating dynamic scene changes and systematically altering key filmmaking variables in the metadata to teach the AI models the impact of each filmmaking element on a video output.

185. The method of any of aspects 181-184, further comprising employing a quality control process to evaluate the generated video content against predefined criteria for technical and creative filmmaking standards.

186. The method of any of aspects 181-185, further comprising using one or more convolutional neural networks (CNNs) to analyze visual patterns in the synthetic and real-world filmmaking data, to train the AI models to generate output including a cinematographic technique or visual styles.

187. The method of any of aspects 181-186, further comprising integrating the trained AI models with user interfaces that allow users to specify video characteristics using metadata language, facilitating the generation of customized video content that adheres to specific filmmaking preferences and requirements.

188. A computing system for training artificial intelligence (AI) models using both synthetic and real-world filmmaking data, the system comprising: one or more processors; and one or more memories having stored thereon computer-executable instructions that, when executed, cause the system to: receive and process metadata related to professional filmmaking techniques; integrate Lidar data with the processed metadata; generate synthetic data based on the integrated metadata and Lidar data; incorporate feedback from actual film production use to adjust model parameters; and train the AI models using a combination of the synthetic data and real-world filmmaking data.

189. The system of aspect 188, further comprising instructions to use dailies as a source of real-world filmmaking data, wherein the dailies are annotated with detailed metadata and used to refine the ability of the AI models to generate content meeting professional filmmaking standards.

190. The system of any of aspects 181-189, further comprising instructions to implement continuous learning mechanisms that dynamically adjust the AI models based on structured feedback mechanisms, enabling iterative improvements in video content generation.

191. The system of any of aspects 181-190, further comprising instructions to simulate dynamic scene changes and systematically alter key filmmaking variables in the metadata to teach the AI models the impact of each filmmaking element on a video output.

192. The system of any of aspects 181-191, further comprising instructions to employ a quality control process to evaluate the generated video content against predefined criteria for technical and creative filmmaking standards.

193. The system of any of aspects 181-192, further comprising instructions to use one or more convolutional neural networks (CNNs) to analyze visual patterns in the synthetic and real-world filmmaking data, to train the AI models to generate output including a cinematographic technique or visual styles.

194. The system of any of aspects 181-193, further comprising instructions to integrate the trained AI models with user interfaces that allow users to specify video characteristics using metadata language, facilitating the generation of customized video content that adheres to specific filmmaking preferences and requirements.

195. A computer-readable medium having stored thereon instructions that when executed by a processor cause a system to perform: receiving detailed metadata related to professional filmmaking techniques; integrating Lidar data with the received metadata; generating synthetic data based on the integrated metadata and Lidar data; incorporating feedback from actual film production use to adjust model parameters; and training artificial intelligence (AI) models using a combination of the synthetic data and real-world filmmaking data to enhance their video content generation capabilities.

196. The computer-readable medium of aspect 195, further comprising instructions that cause the system to use dailies as a source of real-world filmmaking data, wherein the dailies are annotated with detailed metadata and used to refine the ability of the AI models to generate content meeting professional filmmaking standards.

197. The computer-readable medium of any of aspects 181-196, further comprising instructions that cause the system to implement continuous learning mechanisms that dynamically adjust the AI models based on structured feedback mechanisms, enabling iterative improvements in video content generation.

198. The computer-readable medium of any of aspects 181-197, further comprising instructions that cause the system to simulate dynamic scene changes and systematically alter key filmmaking variables in the metadata to teach the AI models the impact of each filmmaking element on a video output.

199. The computer-readable medium of any of aspects 181-198, further comprising instructions that cause the system to use one or more convolutional neural networks (CNNs) to analyze visual patterns in the synthetic and real-world filmmaking data, to train the AI models to generate output including a cinematographic technique or visual styles.

200. The computer-readable medium of any of aspects 181-199, further comprising instructions that cause the system to integrate the trained AI models with user interfaces that allow users to specify video characteristics using metadata language, facilitating the generation of customized video content that adheres to specific filmmaking preferences and requirements.

201. A computer-implemented method for employing a simulation-driven learning environment for artificial intelligence (AI) model training in filmmaking, the method comprising: generating virtual scenes with adjustable parameters to simulate a wide range of hypothetical filmmaking scenarios; receiving detailed metadata related to professional filmmaking techniques, including camera settings, shot composition, and lighting setups; integrating Lidar data with the received metadata to provide a three-dimensional understanding of space and object relationships within the virtual scenes; and training one or more AI models using the generated virtual scenes and integrated data to enhance their video content generation capabilities without the need for constant new real-world video data.

202. The method of aspect 201, further comprising adjusting the virtual scenes based on dynamic scene changes documented in the metadata to maintain narrative coherence and adhere to professional filmmaking standards.

203. The method of any of aspects 201-202, further comprising systematically altering key filmmaking variables in the metadata within the virtual scenes to teach the AI models an impact of each filmmaking element on video output.

204. The method of any of aspects 201-203, further comprising employing a feedback loop that utilizes structured critiques from film professionals to refine an ability of the AI models to replicate professional filmmaking techniques.

205. The method of any of aspects 201-204, further comprising utilizing a distributed computing environment to parallelize the training of the AI models across multiple instances to accelerate learning and enable the AI models to process and learn from a larger dataset of virtual scenes and filmmaking metadata.

206. The method of any of aspects 201-205, further comprising implementing a mechanism for the AI models to interpret and apply cinematographic details provided via text prompts, enabling users to generate video content with specific visual styles and techniques by describing desired cinematographic attributes in natural language.

207. The method of any of aspects 201-206, further comprising integrating the trained AI models with existing large language models (LLMs) for video processing, enhancing an ability of the trained AI models to generate video content that not only simulates professional filmmaking techniques but also aligns with narrative and thematic elements of the content, as specified by users through text prompts.

208. A computing system for employing a simulation-driven learning environment for artificial intelligence (AI) model training in filmmaking, the system comprising: one or more processors; and one or more memories having stored thereon computer-executable instructions that, when executed, cause the system to: generate virtual scenes with adjustable parameters; receive and process metadata related to professional filmmaking techniques; integrate Lidar data with the processed metadata; and train one or more AI models using the generated virtual scenes and integrated data.

209. The system of any of aspects 201-208, comprising further instructions that when executed, cause the system to adjust the virtual scenes based on dynamic scene changes documented in the metadata.

210. The system of any of aspects 201-209, comprising further instructions that when executed, cause the system to systematically alter key filmmaking variables in the metadata within the virtual scenes to teach the AI models an impact of each filmmaking element on video output.

211. The system of any of aspects 201-210, comprising further instructions that when executed, cause the system to employ a feedback loop that utilizes structured critiques from film professionals to refine an ability of the AI models to replicate professional filmmaking techniques.

212. The system of any of aspects 201-211, comprising further instructions that when executed, cause the system to implement a mechanism for the AI models to use a distributed computing environment to parallelize the training of the AI models across multiple instances to accelerate learning and enable the AI models to process and learn from a larger dataset of virtual scenes and filmmaking metadata.

213. The system of any of aspects 201-213, comprising further instructions that when executed, cause the system to implement a mechanism for the AI models to interpret and apply cinematographic details provided via text prompts, enabling users to generate video content with specific visual styles and techniques by describing desired cinematographic attributes in natural language.

214. The system of any of aspects 201-214, comprising further instructions that when executed, cause the system to integrate the trained AI models with existing large language models (LLMs) for video processing, enhancing an ability of the trained AI models to generate video content that not only simulates professional filmmaking techniques but also aligns with narrative and thematic elements of the content, as specified by users through text prompts.

215. A computer-readable medium having stored thereon instructions that when executed by a processor cause a system to perform: generating virtual scenes with adjustable parameters to simulate a wide range of hypothetical filmmaking scenarios; receiving detailed metadata related to professional filmmaking techniques; integrating Lidar data with the received metadata; and training one or more artificial intelligence (AI) models using the generated virtual scenes and integrated data to enhance their video content generation capabilities.

216. The computer-readable medium of any of aspects 201-215, further comprising instructions that cause the system to adjust the virtual scenes based on dynamic scene changes documented in the metadata to maintain narrative coherence and adhere to professional filmmaking standards.

217. The computer-readable medium of any of aspects 201-216, further comprising instructions that cause the system to systematically alter key filmmaking variables in the metadata within the virtual scenes to teach the AI models the impact of each filmmaking element on video output.

218. The computer-readable medium of any of aspects 201-217, further comprising instructions that cause the system to employ a feedback loop that utilizes structured critiques from film professionals to refine an ability of the AI models to replicate professional filmmaking techniques.

219. The computer-readable medium of any of aspects 201-218, further comprising instructions that cause the system to implement a mechanism for the AI models to interpret and apply cinematographic details provided via text prompts, enabling users to generate video content with specific visual styles and techniques by describing desired cinematographic attributes in natural language.

220. The computer-readable medium of any of aspects 201-219, further comprising instructions that cause the system to utilize a distributed computing environment to parallelize the training of the AI models across multiple instances to accelerate learning and enable the AI models to process and learn from a larger dataset of virtual scenes and filmmaking metadata.

221. A computer-implemented method for enhancing artificial intelligence (AI) model training in filmmaking through a use of Lidar data, the method comprising: correlating two-dimensional video data with three-dimensional spatial data obtained from Lidar to simulate professional camera techniques; receiving detailed metadata related to professional filmmaking techniques, including camera settings, shot composition, and lighting setups; processing the received metadata alongside the Lidar data to provide one or more AI models with a granular understanding of spatial relationships and the physics of camera movement; and training the AI models using the processed metadata and Lidar data to accurately simulate professional filmmaking techniques, thereby enhancing realism and quality of generated video content.

222. The method of aspect 221, further comprising generating synthetic data based on the processed metadata and Lidar data to provide the AI models with diverse scenarios for training without the need for new real-world video data.

223. The method of any of aspects 221-222, further comprising implementing continuous learning mechanisms that dynamically adjust the AI models based on structured feedback mechanisms, enabling iterative improvements in video content generation.

224. The method of any of aspects 221-223, further comprising utilizing machine learning techniques to analyze the correlation between the two-dimensional video data and the three-dimensional spatial data from Lidar, enabling the AI models to predict and replicate the impact of camera movements and positioning on a perceived depth and dimensionality of the scene.

225. The method of any of aspects 221-224, further comprising employing a data augmentation process that manipulates the Lidar data to simulate various environmental conditions and physical constraints encountered in real-world filmmaking, thereby broadening exposure of the AI models to different filming scenarios.

226. The method of any of aspects 221-225, further comprising integrating the trained AI models with a user interface that allows filmmakers to input specific filmmaking requirements and preferences, facilitating the generation of video content that closely aligns with individual creative visions and technical specifications.

227. The method of aspect any of aspects 221-226, further comprising deploying the trained AI models in a cloud-based platform.

228. A computing system for enhancing artificial intelligence (AI) model training in filmmaking through use of Lidar data, the system comprising: one or more processors; and one or more memories having stored thereon computer-executable instructions that, when executed, cause the system to: receive and process metadata related to professional filmmaking techniques; correlate two-dimensional video data with three-dimensional spatial data obtained from Lidar; and train one or more AI models using the processed metadata and Lidar data to accurately simulate professional filmmaking techniques.

229. The system of aspect 228, further comprising instructions that when executed, cause the system to generate synthetic data based on the processed metadata and Lidar data, providing the AI with diverse scenarios for training.

230. The system of any of aspects 228-229, further comprising instructions that when executed, cause the system to implement continuous learning mechanisms that dynamically adjust the AI models based on structured feedback mechanisms, enabling iterative improvements in video content generation.

231. The system of any of aspects 228-230, further comprising instructions that when executed, cause the system to use machine learning to analyze the correlation between the two-dimensional video data and the three-dimensional spatial data from Lidar, enabling the AI models to predict and replicate an impact of camera movements and positioning on a perceived depth and dimensionality of a scene.

232. The system of any of aspects 228-231, further comprising instructions that when executed, cause the system to employ a data augmentation process that manipulates the Lidar data to simulate various environmental conditions and physical constraints encountered in real-world filmmaking, thereby broadening exposure of the AI models to different filming scenarios.

233. The system of any of aspects 228-232, further comprising instructions that when executed, cause the system to integrate the trained AI models with a user interface that allows filmmakers to input specific filmmaking requirements and preferences, facilitating generation of video content that closely aligns with individual creative visions and technical specifications.

234. The system of aspect any of aspects 228-233, further comprising instructions that when executed, cause the system to deploy the trained AI models in a cloud-based platform.

235. A computer-readable medium having stored thereon instructions that when executed by a processor cause a system to perform: correlating two-dimensional video data with three-dimensional spatial data obtained from Lidar; receiving detailed metadata related to professional filmmaking techniques; processing the received metadata alongside the Lidar data; and training one or more artificial intelligence (AI) models using the processed metadata and Lidar data to accurately simulate professional filmmaking techniques, thereby enhancing the realism and quality of generated video content.

236. The computer-readable medium of aspect 235, further comprising instructions that cause the system to generate synthetic data based on the processed metadata and Lidar data, providing the AI with diverse scenarios for training.

237. The computer-readable medium of any of aspects 235-236, further comprising instructions that cause the system to implement continuous learning mechanisms that dynamically adjust the AI models based on structured feedback mechanisms, enabling iterative improvements in video content generation.

238. The computer-readable medium of any of aspects 235-237, further comprising instructions that cause the system to employ a data augmentation process that manipulates the Lidar data to simulate various environmental conditions and physical constraints encountered in real-world filmmaking, thereby broadening the exposure of the AI models to different filming scenarios.

239. The computer-readable medium of any of aspects 235-238, further comprising instructions that cause the system to integrate the trained AI models with a user interface that allows filmmakers to input specific filmmaking requirements and preferences, facilitating the generation of video content that closely aligns with individual creative visions and technical specifications.

240. The computer-readable medium of any of aspects 235-239, further comprising instructions that cause the system to deploy the trained AI models in a cloud-based platform.

ADDITIONAL CONSIDERATIONS

The following considerations also apply to the foregoing discussion. Throughout this specification, plural instances may implement operations or structures described as a single instance. Although individual operations of one or more methods are illustrated and described as separate operations, one or more of the individual operations may be performed concurrently, and nothing requires that the operations be performed in the order illustrated. These and other variations, modifications, additions, and improvements fall within the scope of the subject matter herein.

It should also be understood that, unless a term is expressly defined in this patent using the sentence "As used herein, the term" "is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112(f).

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" is employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for implementing the concepts disclosed herein, through the principles disclosed herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A computer-implemented method for integrating one or more existing video large language models (LLMs) with custom AI algorithms for filmmaking, the method comprising:
    interfacing with an existing video LLM;
    receiving detailed metadata related to professional filmmaking techniques, including camera settings, shot composition, and lighting setups;
    processing the received metadata to adapt the existing video LLM to generate video content that simulates professional filmmaking techniques;
    receiving Lidar data captured from a lidar sensor, the Lidar data including spatial coordinates, distance measurements and relative positional information of objects within a scene; and
    integrating the Lidar data with the processed metadata by combining the spatial coordinates and distance measurements from the Lidar data with the filmmaking metadata to enhance the generated video content by providing a three-dimensional spatial understanding of the scene indicating depths and positional relationships among objects; and
    applying transfer learning techniques to the existing video LLM based on the processed metadata and Lidar data to refine its video content generation capabilities.

2. The method of claim 1, further comprising fine-tuning the existing video LLM with a dataset enriched with detailed filmmaking metadata and Lidar data to match criteria associated with professional filmmaking criteria.

3. The method of claim 1, further comprising utilizing specialized interface protocols to enable efficient knowledge transfer between the custom AI algorithms and the existing video LLM.

4. The method of claim 1, further comprising simulating professional filmmaking techniques within the generated video content based on the processed metadata and integrated Lidar data.

5. The method of claim 1, further comprising dynamically adjusting the generated video content based on scene changes documented in the metadata to maintain narrative coherence and adhere to professional filmmaking standards.

6. The method of claim 1, further comprising systematically altering key filmmaking variables in the metadata to simulate an impact of each element on a video output, thereby teaching the existing video LLM to apply these variables effectively.

7. A computing system for enhancing existing video large language models (LLMs) with advanced filmmaking capabilities, the system comprising:
    one or more processors; and
    one or more memories having stored thereon computer-executable instructions that, when executed, cause the system to:
        receive and process metadata related to professional filmmaking techniques including camera settings, shot composition and lighting setups;
        receive and integrate Lidar data including three-dimensional positional and distance information of objects within a scene;
        interface with an existing video LLM by transmitting the processed metadata and integrated Lidar data as input to the existing video LLM via one or more interface protocols to enable the video LLM to generate video content that includes three-dimensional spatial information and object-position relationships derived from the Lidar data and filmmaking metadata; and apply transfer learning techniques to the existing video LLM based on the processed metadata and Lidar data to refine its video content generation capabilities.

8. The system of claim 7, further comprising instructions to apply transfer learning techniques to the existing video LLM based on the processed metadata and integrated Lidar data.

9. The system of claim 7, further comprising instructions to fine-tune the existing video LLM with a dataset enriched with detailed filmmaking metadata and Lidar data.

10. The system of claim 7, further comprising instructions to utilize specialized interface protocols to enable efficient knowledge transfer between one or more custom AI algorithms and the existing video LLM.

11. The system of claim 7, further comprising instructions to simulate professional filmmaking techniques within generated video content based on the processed metadata and integrated Lidar data.

12. The system of claim 7, further comprising instructions to adjusting generated video content based on scene changes documented in the metadata to maintain narrative coherence and adhere to filmmaking criteria.

13. The system of claim 7, further comprising instructions to systematically altering key filmmaking variables in the metadata to simulate an impact of each element on a video output, thereby teaching the existing video LLM to apply these variables effectively.

14. A computer-readable medium having stored thereon instructions that when executed by a processor cause a system to perform:

interfacing with an existing video large language model (LLM) by transmitting filmmaking data processed by AI algorithms to the existing video LLM via interface protocols;

receiving detailed metadata related to professional filmmaking techniques including camera settings, shot composition and lighting setups;

processing the received metadata to adapt the existing video LLM to generate video content that simulates professional filmmaking techniques;

receiving Lidar data from a Lidar sensor capturing spatial coordinates and depth information for objects in a scene;

integrating the Lidar data with the processed metadata by combining information from the Lidar data and metadata to provide a three-dimensional representation of object positions and spatial relationships within the generated video content to enhance the generated video content; and applying transfer learning techniques to the existing video LLM based on the processed metadata and Lidar data to refine its video content generation capabilities.

15. The computer-readable medium of claim 14, further comprising instructions that cause the system to fine-tune the existing video LLM with a dataset enriched with detailed filmmaking metadata and Lidar data.

16. The computer-readable medium of claim 14, further comprising instructions that cause the system to simulate professional filmmaking techniques within the generated video content based on the processed metadata and integrated Lidar data.

17. The computer-readable medium of claim 14, further comprising instructions that cause the system to dynamically adjust the generated video content based on scene changes documented in the metadata to maintain narrative coherence and adhere to professional filmmaking standards.

18. The computer-readable medium of claim 14, further comprising instructions that cause the system to systematically alter key filmmaking variables in the metadata to simulate an impact of each element on a video output, thereby teaching the existing video LLM to apply these variables effectively.

19. The computer-readable medium of claim 14, further comprising instructions that cause the system to utilize specialized interface protocols to enable efficient knowledge transfer to the existing video LLM.

* * * * *